US010114526B2

(12) United States Patent
Muto et al.

(10) Patent No.: US 10,114,526 B2
(45) Date of Patent: Oct. 30, 2018

(54) DISPLAYING AN ELECTRONIC DOCUMENT

(71) Applicant: International Business Machines Corporation, Armonk, NY (US)

(72) Inventors: Satoshi Muto, Tokyo (JP); Satoshi Yokoyama, Chiba (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 579 days.

(21) Appl. No.: 13/673,997

(22) Filed: Nov. 10, 2012

(65) Prior Publication Data
US 2013/0151958 A1 Jun. 13, 2013

(30) Foreign Application Priority Data

Dec. 7, 2011 (JP) .................................. 2011-267709

(51) Int. Cl.
*G06F 3/048* (2013.01)
*G06F 3/0483* (2013.01)
*G06F 3/0482* (2013.01)

(52) U.S. Cl.
CPC .......... *G06F 3/0483* (2013.01); *G06F 3/0482* (2013.01)

(58) Field of Classification Search
CPC ....... G06F 3/483; G06F 3/125; G06F 12/0882
USPC ........................................ 715/776, 277, 909
See application file for complete search history.

(56) References Cited

U.S. PATENT DOCUMENTS

| 5,696,982 | A  | * | 12/1997 | Tanigawa et al. ............ 715/236 |
| 5,805,163 | A  | * | 9/1998  | Bagnas ......................... 715/768 |
| 6,163,623 | A  | * | 12/2000 | Ohta ............................. 382/176 |
| 6,253,218 | B1 | * | 6/2001  | Aoki et al. .................... 715/201 |
| 6,266,684 | B1 | * | 7/2001  | Kraus et al. .................. 715/209 |
| 6,529,645 | B2 | * | 3/2003  | Fåhraeus et al. ............. 382/313 |
| 6,587,128 | B2 | * | 7/2003  | Kanevsky et al. ............ 715/768 |
| 6,727,924 | B1 | * | 4/2004  | Anderson ..................... 715/851 |
| 6,765,559 | B2 |   | 7/2004  | Hayakawa |
| 7,768,516 | B1 | * | 8/2010  | Bourdev et al. .............. 345/501 |
| 8,627,195 | B1 | * | 1/2014  | Hayden ......................... 715/229 |
| 8,686,966 | B2 |   | 4/2014  | Homma et al. |

(Continued)

FOREIGN PATENT DOCUMENTS

| CN | 101751219 A | 6/2010 |
| CN | 101938666 A | 1/2011 |

(Continued)

OTHER PUBLICATIONS

Author Unknown, Examiner/Authorized Officer, International Searching Authority, PCT International Search Report for Application No. PCT/JP2012/073465, dated Dec. 4, 2012, pp. 1-2, Japan.

(Continued)

*Primary Examiner* — Jeffrey A Gaffin
*Assistant Examiner* — Mohamed Abou El Seoud
(74) *Attorney, Agent, or Firm* — Lee Law, PLLC; Christopher B. Lee

(57) ABSTRACT

An electronic document includes a set of pages. A display is used that is configured to sense movement of a movable object in a vertical direction relative to a screen. In response to sensing movement using the display, a page corresponding to the electronic document is displayed on the screen in accordance with the sensed movement.

18 Claims, 33 Drawing Sheets

(56) References Cited

U.S. PATENT DOCUMENTS

| | | | |
|---|---|---|---|
| 2004/0205623 A1 | 10/2004 | Weil et al. | |
| 2005/0091596 A1* | 4/2005 | Anthony et al. | 715/712 |
| 2005/0134945 A1* | 6/2005 | Gallagher | 358/527 |
| 2007/0211286 A1* | 9/2007 | Hoel et al. | 358/1.15 |
| 2007/0220437 A1* | 9/2007 | Boillot | 715/762 |
| 2007/0254722 A1* | 11/2007 | Kim | G06F 3/0485 455/566 |
| 2007/0260996 A1 | 11/2007 | Jakobson | |
| 2007/0273667 A1* | 11/2007 | Shin et al. | 345/173 |
| 2008/0158172 A1* | 7/2008 | Hotelling et al. | 345/173 |
| 2009/0040177 A1* | 2/2009 | Qiu | 345/157 |
| 2009/0150821 A1* | 6/2009 | Mathan | 715/781 |
| 2009/0244020 A1* | 10/2009 | Sjolin | G06F 3/0483 345/173 |
| 2010/0107101 A1* | 4/2010 | Shaw | G06F 3/0481 715/766 |
| 2010/0182248 A1* | 7/2010 | Chun | 345/173 |
| 2010/0195134 A1* | 8/2010 | Miyata | 358/1.14 |
| 2010/0318928 A1* | 12/2010 | Neuman et al. | 715/769 |
| 2010/0328438 A1* | 12/2010 | Ohyama et al. | 348/51 |
| 2011/0035759 A1* | 2/2011 | Williams et al. | 719/328 |
| 2011/0039603 A1* | 2/2011 | Kim et al. | 455/566 |
| 2011/0167380 A1* | 7/2011 | Stallings et al. | 715/784 |
| 2011/0210932 A1* | 9/2011 | Ryu et al. | 345/173 |
| 2011/0296334 A1 | 12/2011 | Ryu et al. | |
| 2012/0005617 A1* | 1/2012 | Lee et al. | 715/776 |
| 2012/0005624 A1* | 1/2012 | Vesely | 715/808 |
| 2012/0071208 A1* | 3/2012 | Lee et al. | 455/566 |
| 2012/0166987 A1* | 6/2012 | Kang et al. | 715/765 |
| 2013/0016381 A1* | 1/2013 | Shimizu et al. | 358/1.13 |
| 2013/0044066 A1* | 2/2013 | Monteux et al. | 345/173 |
| 2013/0151958 A1* | 6/2013 | Muto et al. | 715/273 |
| 2013/0300698 A1* | 11/2013 | Hashimoto | 345/173 |
| 2013/0332871 A1* | 12/2013 | Bucur et al. | 715/768 |
| 2015/0052425 A1* | 2/2015 | Kim et al. | 715/251 |
| 2015/0067526 A1* | 3/2015 | Kim | 715/739 |

FOREIGN PATENT DOCUMENTS

| | | |
|---|---|---|
| EP | 0494106 A1 | 7/1992 |
| EP | 2104026 A2 | 9/2009 |
| EP | 2458487 A1 | 5/2012 |
| JP | 03-105412 U | 7/1993 |
| JP | 04-188703 A | 1/1994 |
| JP | 07-116886 A | 11/1996 |
| JP | 08-025461 A | 8/1997 |
| JP | 08-169757 A | 1/1998 |
| JP | 09-067699 A | 9/1998 |
| JP | 09-077622 A | 10/1998 |
| JP | 11-110379 A | 11/2000 |
| JP | 12-078220 A | 9/2001 |
| JP | 15-071386 A | 10/2004 |
| JP | 15-305087 A | 3/2005 |
| JP | 16-189387 A | 1/2006 |
| JP | 17-031379 A | 2/2006 |
| JP | 19-153433 A | 9/2007 |
| JP | 20-310672 A | 6/2010 |
| JP | 20-530481 A | 1/2011 |
| JP | 21-202956 A | 3/2011 |
| JP | 21-255530 A | 5/2011 |
| WO | 2006103830 A1 | 10/2006 |
| WO | 2011027611 A1 | 3/2011 |
| WO | 2011028944 A1 | 3/2011 |

OTHER PUBLICATIONS

Author Unknown, Examiner/Authorized Officer, International Searching Authority, PCT International Search Report and Written Opinion for Application No. PCT/JP2012/073465 (translation not available), dated Dec. 4, 2012, pp. 1-7, Japan.

Author Unknown, Special Edition: Sensor Technology—Optical Proximity Sensor LSI (English translation not available), Denpa Shimbun, Oct. 24, 2010, pp. 1-3, Rohm Company, Ltd., Published online at: http://www.rohm.co.jp/articles/101014_02_denpa/index.html.

European Patent Office, Supplementary European Search Report for Application No. EP12856280.8, dated Mar. 20, 2015, pp. 1-7, Munich, Germany.

European Patent Office, Examination Report for Application No. EP12856280.8, dated Jan. 12, 2017, pp. 1-10, Munich, Germany.

* cited by examiner

Increase in Number of Pages

Increase in Number of Pages

Increase in Number of Pages

Increase in Number of Pages

DISPLAYING AN ELECTRONIC DOCUMENT

RELATED APPLICATIONS

This application claims priority to and claims the benefit of Japanese Patent Application Serial No. JP2011-267709 titled "METHOD FOR DISPLAYING ELECTRONIC DOCUMENT, AND DEVICE AND COMPUTER PROGRAM THEREFOR," which was filed in the Japan Patent Office on Dec. 7, 2011, and which is incorporated herein by reference in its entirety.

BACKGROUND

Generally, the present invention relates to a technique for displaying an electronic document. More specifically, the present invention relates to a method, device, computer program and computer program product for displaying an electronic document with a plurality of pages using a display able to sense vertical movement relative to a screen.

Portable information processing terminals such as smart phones, cell phones, e-book terminals, personal digital assistants (PDAs), hand-held computers, tablet terminals, netbooks, tablet/personal computers and mobile notebook computers have proliferated in recent years. These portable terminals have small, built-in screens.

Some portable terminals have a display incorporating a touch panel function, and this touch panel function is intended to improve operability. The touch panel function is achieved by incorporating a pressure sensor, proximity sensor or a combination of the two into the display.

Because these terminals are portable, they have a wide variety of uses in business activities, sales activities, sales promotion activities, and activities at construction sites, worksites, manufacturing plants and medical facilities. In these fields, electronic documents with a large amount of information on a single page or electronic documents with a plurality of pages often have to be displayed on a portable terminal.

For example, a portable terminal may be used to check the blueprints or instruction manual of a device at a construction site or worksite, consult product pamphlets, sales manuals or sales promotion manuals during a business activity, sales activity or sales promotion activity, check a process chart for a manufacturing process or a manufacturing instruction manual at a manufacturing plant, or consult a diagnostic image, manual for a device, drug information or pathology information at a medical facility.

BRIEF SUMMARY

A method for displaying an electronic document that comprises a plurality of pages includes using a display configured to sense movement of a movable object in a vertical direction relative to a screen; and displaying on the screen, in response to sensing movement via the display, a page corresponding to the electronic document in accordance with the sensed movement.

A system for displaying an electronic document that comprises a plurality of pages includes a display configured to sense movement of a movable object in a vertical direction relative to a screen; a memory configured to store the electronic document; and a processor programmed to: use the display configured to sense movement of the movable object in the vertical direction relative to the screen; and display on the screen, in response to sensing movement via the display, a page corresponding to the electronic document in accordance with the sensed movement.

A computer program product for displaying an electronic document that comprises a plurality of pages includes a computer readable storage medium having computer readable program code embodied therewith, the computer readable program code comprising computer readable program code configured to: use a display configured to sense movement of a movable object in a vertical direction relative to a screen; and display on the screen, in response to sensing movement via the display, a page corresponding to the electronic document in accordance with the sensed movement.

BRIEF DESCRIPTION OF THE SEVERAL VIEWS OF THE DRAWINGS

FIG. 3I is an example of an electronic document with a plurality of pages (PDF file of a manual) that may be used in an embodiment of the present invention showing the initial page of each section of the electronic document.

DETAILED DESCRIPTION

Figure 1:
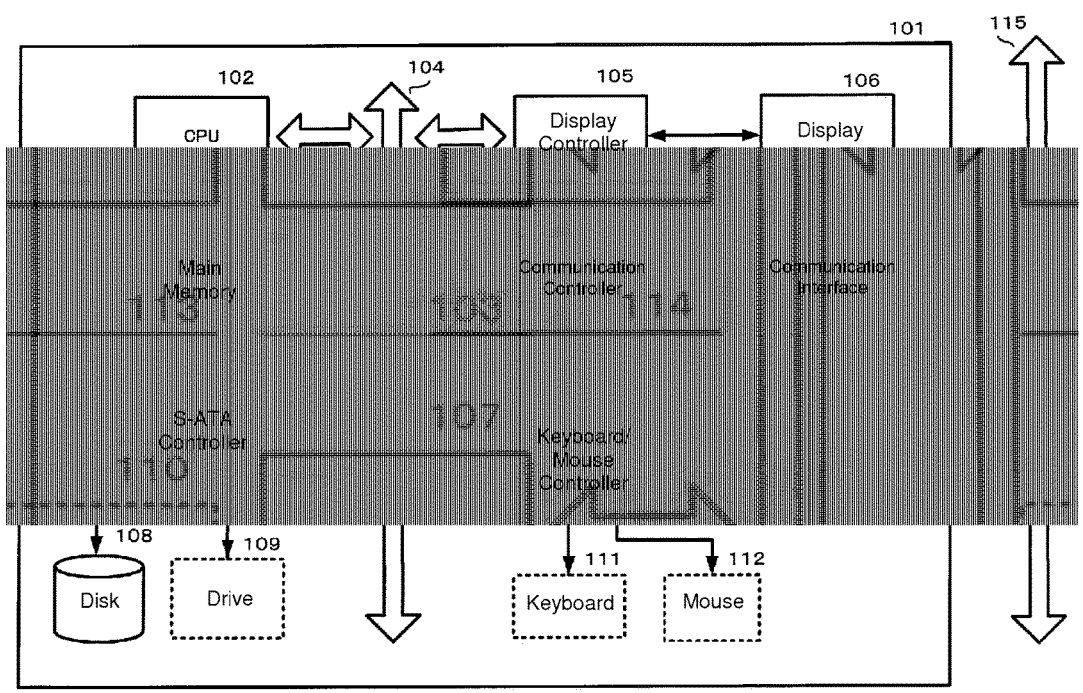
FIG. 1 is a diagram showing an example of a hardware configuration for an information processing terminal used to realize a device in accordance with an embodiment of the present invention.

The following is a detailed explanation of the present invention with reference to preferred embodiments. However, these embodiments do not limit the present invention in the scope of the claims, and all combinations of characteristics explained in the embodiments are not necessarily required in the technical solution of the present invention. Also, it is possible to embody the present invention in many different ways, and it should be clear to a person of skill in the art that various modifications and improvements may be added to the embodiments below.

In all of the explanation of embodiments, the same elements are denoted by the same reference numbers unless otherwise noted.

The present subject matter provides a technique for displaying an electronic document with a plurality of pages using a display able to sense movement of a movable object in the vertical direction relative to a screen. The electronic document with a plurality of pages includes a single unit of display data, which is divided into a plurality of paginated units. Several options/embodiments of the present subject matter are possible.

First, the present subject matter provides a method for displaying an electronic document with a plurality of pages using the aforementioned display. This method includes a step in which a page corresponding to the electronic document is displayed on the screen in accordance with the sensed movement.

In the embodiment of the present subject matter described below, the sensing of movement in the vertical direction relative to the screen is performed by a sensor able to detect movement of a movable object in the vertical direction relative to the screen (referred to below as a moving distance-detecting sensor). In this embodiment of the present subject matter, if the sensing of movement in the vertical direction is performed by a sensor able to detect movement of a movable object in the vertical direction relative to the screen, the step for displaying a page on the screen includes a step for displaying a page corresponding to the electronic document on the screen in accordance with the moving distance of an object in the vertical direction when an object is within the detection range of the moving distance-detecting sensor.

In this embodiment of the present subject matter, the point in the vertical direction farthest from the detection range or within the detection range at which an object may be present at a predetermined distance from the screen is set as the initial page, and pages with a larger page number are displayed as the object approaches the screen. In this embodiment of the present subject matter, the display step may further include a step for fixing display of the page corresponding to the electronic document being displayed on the screen in accordance with the sliding of the object in a predetermined direction within the detection range of the moving distance-detecting sensor.

In this embodiment of the present subject matter, sensing of movement in the vertical direction is performed by a sensor able to detect movement in the vertical direction in close proximity to the screen, the electronic document includes a plurality of sections, the method further includes the execution of a step for detecting the presence of an object in the detection range of the sensor, and the step for displaying a page on the screen includes a step for displaying on the screen the initial page of a section corresponding to the electronic document in accordance with the moving distance in the vertical direction of the object when the object is within the detection range of the sensor. In this embodiment of the present subject matter, the display step may further include a step for displaying the initial page of a section displayed on the screen immediately before sliding of the object in a predetermined direction within the detection range of the moving distance-detecting sensor. This embodiment of the present subject matter further includes, after the step for displaying the initial page of a section, a step for displaying on the screen pages subsequent to the initial page of the section in accordance with the moving distance of the object in the vertical direction.

In the embodiment of the present subject matter described below, the sensing of movement in the vertical direction relative to the screen is performed by a sensor able to detect the pressure applied by an object touching the screen (referred to hereafter as a pressure sensor). This pressure sensor is incorporated into the display. In this embodiment, the step for displaying a page on the screen further includes a step for displaying a page according to the electronic document on the screen in response to pressure applied to the screen by the object when the sensing of movement in the vertical direction relative to the screen is performed by a pressure sensor.

In this embodiment, the point at which zero pressure is applied to the screen by the object may be set as the initial page, and pages with a larger page number may be displayed as the pressure increases. In this embodiment, the display step may further include a step for fixing display of the page corresponding to the electronic document being displayed on the screen in accordance with detection of the object sliding in a predetermined direction by the pressure sensor. In this embodiment, the display step may further include a step for displaying on the screen the initial page of a section corresponding to an electronic document in accordance with the amount of pressure applied to the screen by the object when the sensing of movement in the vertical direction is performed by a pressure sensor and the electronic document is composed of sections. In this embodiment, the display step may further include a step for displaying the initial page of a section displayed on the screen immediately before sliding in accordance with detection of the object sliding in a predetermined direction by the pressure sensor. This embodiment further includes, after the step for displaying the initial page of a section, a step for displaying on the screen pages subsequent to the initial page of the section in accordance with the amount of pressure applied to the screen by the object.

In the embodiment of the present subject matter described below, the method senses movement in the vertical direction using either a moving distance-detecting sensor or a pressure sensor. In this embodiment, the display step may further include a step for the transparent display on top of the fixed page of one or more pages prior to the page number of the fixed page, one or more pages subsequent to the page number of the fixed page, or a plurality of pages including a combination of these pages. Also, the display step in this embodiment further includes a step for the transparent display of the fixed page on top of one or more pages prior to the page number of the fixed page, one or more pages subsequent to the page number of the fixed page, or a plurality of pages including a combination of these pages. In this embodiment, the display step further includes, after the fixing step, a step for transparently displaying a bookmarked page in the electronic document on top of the fixed page, or transparently displaying the fixed page on top of the bookmarked page. Also, the display step in this embodiment further includes, after the fixing step, a step for releasing a fixed page when the object has been slid in a predetermined horizontal direction relative to the screen. In this embodiment, pages corresponding to the electronic document may be displayed so as to gradually accelerate at a constant rate (ease in) or gradually decelerate at a constant rate (ease out) while advancing through the page numbers in the step for displaying a page on the screen. In this embodiment, the method may further include execution of a step for dividing a single unit of display data into a plurality of data sets on the basis of the display size of the screen in accordance with the reception of an instruction to divide the single unit of display data, and a step for assigning page numbers to the plurality of divided data sets.

Second, the present subject matter provides a device for displaying an electronic document with a plurality of pages. This device includes a step in which a page corresponding to the electronic document is displayed on the screen in accordance with the sensed movement.

In the device of the embodiment of the present subject matter described below, the sensing of movement in the vertical direction relative to the screen is performed by a sensor able to detect movement in the vertical direction of an object in close proximity to the screen (referred to below as a moving distance-detecting sensor). In this embodiment, a detecting means connected to the moving distance-detecting sensor may detect the presence of an object in the detection range of the sensor when an object is in the detection range of the moving distance-detecting sensor, and a display control means may display on the screen a page corresponding to the electronic document in accordance with the moving distance of the object in the vertical direction. In this embodiment, the display control means may set as the initial page the farthest point in the detection range in the vertical direction or a point at a predetermined distance from the surface within the detection range in the vertical direction at which the object may be present, and display pages with a larger page number as the object approaches the screen.

In this embodiment, the display control means may fix display of the page corresponding to the electronic document being displayed on the screen in accordance with detection of the object sliding in a predetermined direction within the range of the moving distance-detecting sensor. In this embodiment, a detecting means may detect the presence of an object in the detection range of the sensor when movement in the vertical direction is sensed by a moving distance-detecting sensor and the electronic document is composed of sections, and a display control means may display on the screen the first page of a section corresponding to the electronic document in accordance with the moving distance of the object in the vertical direction when the object is present in the detection range of the sensor.

In this embodiment, the display control means may display the initial page of a section on the screen immediately before sliding of the object in a predetermined direction within the detection range of the moving distance-detecting sensor. In this embodiment, the display control means, after the step for displaying the initial page of a section, may display on the screen pages subsequent to the initial page of the section in accordance with the moving distance of the object in the vertical direction. In the device of the embodiment of the present subject matter described below, the sensing of movement in the vertical direction is performed by a sensor able to detect the pressure applied by an object touching the screen (referred to hereafter as a pressure sensor). This pressure sensor is incorporated into the display.

In this embodiment, the display control means may display on the screen a page corresponding to the electronic document in accordance with the amount of pressure applied by the object to the screen when the sensing of movement in the vertical direction is performed by a pressure sensor. In this embodiment, the display control means may set the point at which zero pressure is applied to the screen by the object as the initial page, and pages with a larger page number may be displayed as the pressure increases. In this embodiment, the display control means may fix display of the page corresponding to the electronic document being displayed on the screen in accordance with detection of the object sliding in a predetermined direction by the pressure sensor. In this embodiment, the display control means may display on the screen the initial page of a section corresponding to an electronic document in accordance with the amount of pressure applied to the screen by the object when the sensing of movement in the vertical direction is performed by a pressure sensor and the electronic document is composed of sections.

In this embodiment, the display control means may display the initial page of a section on the screen immediately before sliding of the object in a predetermined direction within the detection range of the pressure sensor. In this embodiment, the display control means, after the step for displaying the initial page of a section, may display on the screen pages subsequent to the initial page of the section in accordance with the amount of pressure applied to the screen by the object.

In the embodiment of the present subject matter described below, the device uses either a moving distance-detecting sensor or a pressure sensor depending on the situation. In this embodiment, the display control means may transparently display on top of the fixed page of one or more pages prior to the page number of the fixed page, one or more pages subsequent to the page number of the fixed page, or a plurality of pages including a combination of these pages, or the display control means may transparently display the fixed page on top of one or more pages prior to the page number of the fixed page, one or more pages subsequent to the page number of the fixed page, or a plurality of pages including a combination of these pages.

In this embodiment, the display control means may, after the fixing, transparently display a bookmarked page in the electronic document on top of the fixed page, or transparently display the fixed page on top of the bookmarked page. Also, the display control means may, after the fixing, release a fixed page when the object has been slid in a predetermined horizontal direction relative to the screen. In this embodiment, pages corresponding to the electronic document may be displayed so as to gradually accelerate or decelerate at a constant rate while advancing through the page numbers in the step for displaying a page on the screen. In this embodiment, the device may further include a dividing means for dividing a single unit of display data into a plurality of data sets on the basis of the display size of the screen in accordance with the reception of an instruction to divide the single unit of display data, and an assigning means for assigning page numbers to the plurality of divided data sets.

Third, the present subject matter provides a device for displaying an electronic document with a plurality of pages. This device includes a display able to sense the movement of a movable object in the vertical direction relative to a screen, memory able to store the electronic document, and a CPU connected to the memory. In this embodiment, each step of a method described above is executed by the CPU. In this embodiment, the CPU reads from the memory and executes a computer program for performing each step of a method described above.

Fourth, the present subject matter provides a computer program for displaying an electronic document with a plurality of pages using a display described above. This computer program is executed by a device to perform each step of a method described above and in more detail below.

The present subject matter improves the operability of page display by using a display able to sense vertical movement of a movable object relative to a screen, and displaying on the screen a page corresponding to an electronic document with a plurality of pages in accordance with the sensed movement.

The present subject matter also makes page display operations easier by using a moving distance-detecting sensor to display a page corresponding to an electronic document on the screen in accordance with the moving distance of the object in the vertical direction. The present subject matter may also make display operations easier by using a pressure sensor to display a page corresponding to an electric document on the screen in accordance with the pressure applied to the screen by an object.

When the present subject matter may not display a single unit of display data on the screen, the single unit of display data is divided into a plurality of units and paginated for display. This improves the browsability of a single unit of display data.

In the present subject matter, a specific page may be fixed, and another page may be transparently displayed on top of the fixed page or the fixed page transparently displayed on top of another page. This makes it easier to compare the content of a fixed page to the content of another page for reference purposes.

It should be noted that conception of the present subject matter resulted from a recognition of certain limitations associated with the small size of handheld device displays. For example it was determined that these portable terminals have small, built-in screens. As a result, the amount of content that may be visibly displayed on the screens of these portable terminals is limited by the size of these screens. It was further determined that because the screen on a portable terminal is small, portable terminals are not good at allowing a user to display an electronic document with a large amount of information on a single page or to display and simultaneously browse through the pages of an electronic document with a large number of pages.

When an electronic document has a plurality of pages, for example, it may be difficult and time consuming to check the content on a portable terminal because a page turning function has to be used. It is also difficult and time consuming to compare the content of the current page to the content of another page in the electronic document or to recall the content on a previously referenced page because the screen has to be switched or a scrolling operation has to be performed to reference another page and compare the content. It is also difficult and time consuming to reference an electronic document on a portable terminal when the data to be referenced does not fit on the display device of a portable terminal, because screen navigation is required.

Therefore, the purpose of the present subject matter is to improve or enhance the operability of the aforementioned operations on a portable terminal.

FIG. 1 is a diagram showing an example of a hardware configuration for an information processing terminal used to realize a device in accordance with an embodiment of the present subject matter. There are no particular restrictions on the device (101) as long as it is an information processing terminal with a display able to sense vertical movement of a movable object relative to a screen. More specifically, the device (101) is a portable information processing terminal. The portable information processing terminal may be a smart phone, cell phone, e-book terminal, PDA, hand-held computer, tablet terminal, netbook, tablet/personal computer or mobile notebook computer. However, the terminal is not limited to these examples.

This device (101) includes a computer processing unit (CPU) (102) and a main memory (103), and these are connected to a bus (104). The CPU (102) is preferably based on a 32-bit or 64-bit architecture. A display (106) such as a liquid crystal display (LCD) is connected to the bus (104) via a display controller (105). The display (106) is used to display information using the appropriate graphic interface from a computer connected to the network via a communication network and information from software being executed by the computer in order to control the computer. A disk (108) such as a silicon disk or hard disk may also be connected to the bus (104) via a serial advanced technology attachment (SATA) or integrated drive electronics (IDE) controller (107). Optionally, another drive (109) such as a compact disc (CD), digital video disk (DVD) or Blu-Ray Disc® (BD) drive may be connected to the bus (104) via a SATA or IDE controller (107). Optionally, a keyboard (111) and mouse (112) may be connected to the bus (104) via a keyboard/mouse controller (110) or universal serial bus (USB) bus (not shown), but these are not required in the embodiment of the present invention.

Programs, such as the operating system, a Java® processing environment such as J2EE®, Java™ programming language applications, Java™ virtual machines (JVM®), and Java® just-in-time (JIT) compilers, as well as data, are stored on the disk (108) for download to the main memory. Software allowing for the input and editing of text, and character conversion software such as a front end processor (FEP) may also be stored in the disk (108) for download to the main memory. The operation system may be an operating system that supports a graphical user interface (GUI) multi-window environment.

If necessary, the drive (109) may be used to install a program on the disk (108) from a CD-ROM, DVD-ROM or BD.

The communication interface (114) may use, for example, an Ethernet (registered trademark) protocol. The communication interface (114) is connected to a bus (104) via a communication controller (113), and functions to physically connect the device (101) to the communication network (115). This provides a network interface layer for the TCP/IP communication protocol in the communication function of the operating system of the device (101). The communication line may be based on a wired LAN environment, or based on a wireless LAN environment, for example, a Wi-Fi standard such as IEEE802.11a/b/g/n.

It should be clear from the above that devices used to embody the present invention are not restricted to a particular operating system environment.

Figure 2A:
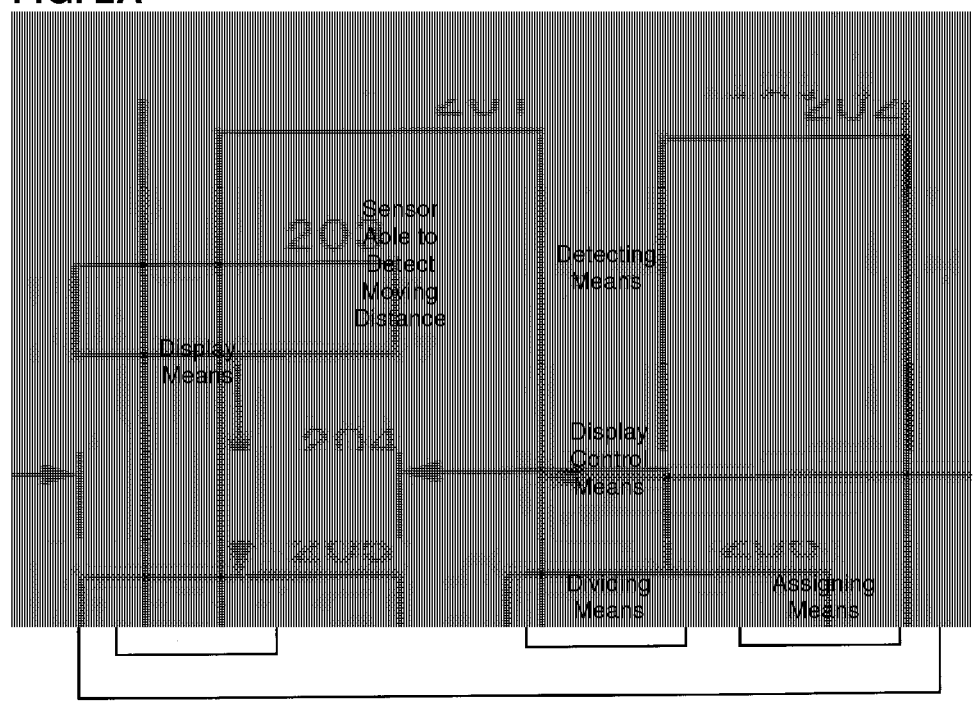
FIG. 2A is a functional block diagram of a device preferably having a hardware configuration according to FIG. 1 and also including a moving distance-detecting sensor in the vertical direction of an object touching the screen according to an embodiment of the present invention.

FIG. 2A is a functional block diagram of a device (101-1) preferably having a hardware configuration according to FIG. 1 and also including a moving distance-detecting sensor in the vertical direction of an object touching the screen according to an embodiment of the present invention. This device (101-1) has a hardware configuration according to FIG. 1. The device (101-1) is equipped with a display means (201), a moving distance-detecting sensor (202), a detecting means (203), a display control means (204), a dividing means (205) and an assigning means (206). Alternatively, the device (101-1) may be equipped with a display means (201), a detecting means (203), a display control means (204), a dividing means (205) and an assigning means (206), and the device (101-1) connected to a moving distance-detecting sensor (202) that is external to the device (101-1). When the moving distance-detecting sensor (202) is external to the device (101-1), the moving distance-detecting sensor (202) may be connected to the device (101-1) via a wire or wirelessly.

A display means (201) may be built into the device (101-1), or a display means (201) may be connected via a wire or wireless. The display means (201) is preferably built into the device (101-1).

The display means (201) is typically a liquid crystal display device, and a touch panel function is built in.

The display means (201) displays an electronic document. In this embodiment of the present invention, the electronic document may have a plurality of pages. The plurality of pages may be original to the electronic document, or a single unit of display data in the original electronic document may be automatically divided by the dividing means (205) described below and the divided units paginated.

Here, a "single unit of data" is display data displayed as a single page on the screen. Whether or not the data fits on the screen depends on the size and resolution of the display region of the screen. The display data may be image data, video data or text data. Examples of "single units of data" are shown in FIG. 3A through FIG. 3E below.

The moving distance-detecting sensor (202) is a sensor able to sense movement of a movable object in the vertical direction relative to the screen. The sensor may be a proximity sensor, or a sensor with a built-in RGB camera, depth sensor and multi-array microphone. A proximity sensor is a sensor able to detect distance and the moving direction of an object. Any proximity sensor available to persons skilled in the art may be used. The proximity sensors may be an optical proximity sensor LSI. The sensor with a built-in RGB camera, depth sensor and multi-array microphone may also be used.

The "movable object" may be the user's operating finger, an operating pen or an operating rod. The user's operating finger may be the left or right index finger. However, a plurality of fingers may also be used, such as a thumb and index finger. The pen may be a pointing device for a touch panel (for example, a stylus). The operating rod may be a remote control device.

The detecting means (203) may be connected to the moving distance-detecting sensor (202). The detecting means (203) is able to detect the presence of an object within the detection range of the sensor (202) via the moving distance-detecting sensor (202). The detecting means (203) is also able to determine the distance between the object and the screen, or the moving distance of the object in the vertical direction (in the z-axis direction or along the axis passing through the screen). The moving distance in the vertical direction may be either along the axis passing through the screen from above (left-handed coordinates) or along the axis passing through the screen from behind (right-handed coordinates). In the left-handed coordinates, the positive direction is the movable object moving towards the screen. In the right-handed coordinates, the positive direction is the movable object moving away from the screen. The detecting means (203) may be set so that the moving distance is the distance within the detection range of the moving distance-detecting sensor (202). The display control means (204) described below may set the distance from the total number of pages in the electronic document and the fixed distance, and associate the displayed page to correspond with the distance.

The display control means (204) may display a page corresponding to the electronic document on the screen in accordance with the movement of the movable object in the vertical direction with respect to the screen. Also, the display control means (204) may display pages according to the page number order of the electronic document in accordance with the moving distance of the object in the vertical direction. The display control means (204) may also use the farthest point in the detection range in the vertical direction or a point at a predetermined distance from the surface within the detection range in the vertical direction at which the object may be present as the point for displaying the initial page. The farthest distance within the detection range is the greatest distance from the screen that may be detected by the moving distance-detecting sensor (202). The display control means (204) may also use a point touching the screen or a point immediately above the screen as the point for displaying the final page. The display control means (204). The display control means (204) may display pages with a larger page as the object approaches the screen, and the distance for switching pages may be set according to the total number of pages to be displayed (corresponding to the distance between the user's operating finger and the screen).

The display control means (204) fixes the display of the page corresponding to the electronic document that is displayed on the screen in accordance with the sliding of the object in a predetermined direction within the detection range of the moving distance-detecting sensor (202), for example, horizontally to the right. The fixed page may be set as a bookmarked page. After fixing the page, the display control means (204) may transparently display a bookmarked page in the electronic document over the fixed page, or transparently display the fixed page over the bookmarked page. This allows the bookmarked page to be compared to a page before or after the bookmarked page (referred to hereafter as the comparison page). This will be explained in greater detail below.

A bookmarked page may be compared to a page before or after the bookmarked page (a comparison page) by displaying the comparison page and then displaying the bookmarked page on the back screen (along the axis passing through the screen from above). In other words, the display control means (204) is able to transparently display on top of the fixed page one or more pages prior to the page number of the fixed page, one or more pages subsequent to the page number of the fixed page, or a plurality of pages including a combination of these pages. Alternatively, a bookmarked page may be compared to a page before or after the bookmarked page (a comparison page) by displaying the bookmarked page and then displaying the comparison page on the back screen (along the axis passing through the screen from above). In other words, the display control means (204) is able to transparently display the fixed page on top of one or more pages prior to the page number of the fixed page, one or more pages subsequent to the page number of the fixed page, or a plurality of pages including a combination of these pages. In other words, the display control means (204) is able to transparently display the fixed page on top of one or more pages prior to the page number of the fixed page, one or more pages subsequent to the page number of the fixed page, or a plurality of pages including a combination of these pages.

After the fixing, the display control means (204) releases the fixed page when the object is slid, for example, in a predetermined horizontal direction relative to the screen.

The display control means (204) displays pages corresponding to the electronic document gradually at an accelerating rate or gradually at a decelerating rate while advancing through the page numbers. The display control means (204) may perform the page display transition, for example, so that it gradually accelerates at a constant rate as the operating finger reaches the mid-point in the fixed range, and so that it gradually decelerates at a constant rate as the operating finger approaches the screen from the mid-point in the fixed range.

When the electronic document is composed of sections, the display control means (204) displays on the screen the initial page of a section corresponding to the electronic document in accordance with the moving distance of the object in the vertical direction. Also, the display control means (204) may display the initial page of a section displayed on the screen immediately before the sliding of the object in a predetermined direction within the detection range of the moving distance-detecting sensor (202), for example, horizontally to the left. After the initial page of a section has been displayed, the display control means (204) may display on the screen a page subsequent to the initial page of a section in accordance with the moving distance of the object in the vertical direction.

Here, "section" refers to a unit of an electronic document. In a book, these sections include the front matter (cover, frontispiece, dedication, preface, legend, table of contents, table of contents for drawings), the body matter (chapter cover pages, text), and the back matter (appendix, index, afterword, colophon). In a patent, the sections are the bibliographic information, specification, claims, abstract, and drawings. In XML data, they are tag units. In a PDF file, they are the table of contents, etc. In a Word file, they are the headers, etc.

The dividing means (205) automatically divide a single unit of display data into a plurality of data sets on the basis of the display size of the screen in the device (101-1) in accordance with the reception of an instruction to divide the single unit of display data. Examples of divided single units of display data are shown in FIG. 3A through FIG. 3E below. The number of divisions depends on the single unit of display data and the display size of the screen. It may be divided, for example, by two, four, six or nine.

When an electronic document is composed of sections, the dividing means (205) extracts the initial page of a section and sends the extracted initial page to the assigning means (206) for pagination.

The assigning means (206) assigns page numbers to (paginates) the plurality of data sets divided by the dividing means (205). The method for assigning page numbers may be set by the user. For example, as shown in FIG. 3A through FIG. 3E below, the divided data is assigned numbers (numbered) in sequential order from the upper left to the upper right and then from the lower left to the lower right. Alternatively, the method for assigning page numbers may be preset.

When an electronic document is composed of sections, the assigning means (206) paginates (or numbers) the initial pages of the sections extracted by the dividing means (205) in ascending order in accordance with their original (pre-extraction) page numbers.

Figure 2B:
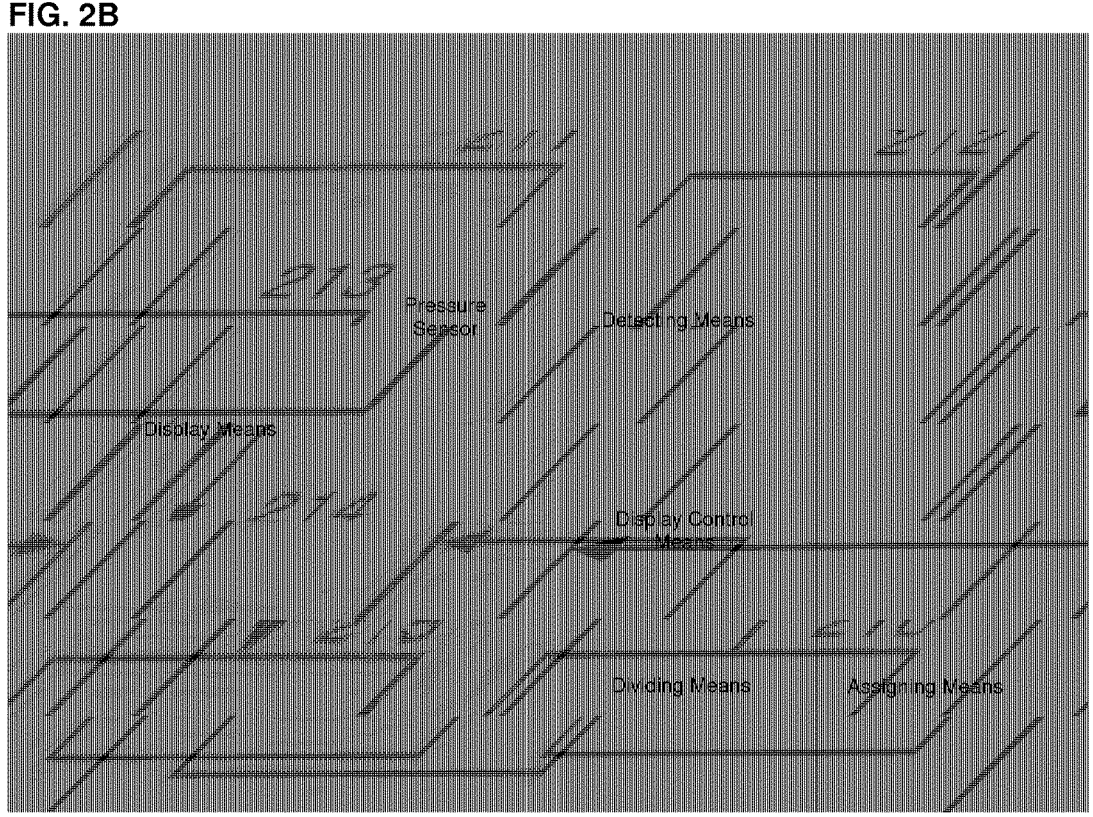
FIG. 2B is a functional block diagram of a device preferably having a hardware configuration according to FIG. 1 and also including a pressure sensor able to detect the pressure applied by an object touching the screen according to an embodiment of the present invention.

FIG. 2B is a functional block diagram of a device (101-2) preferably having a hardware configuration according to FIG. 1 and also including a pressure sensor able to detect the pressure applied by an object touching the screen according to an embodiment of the present invention. The device in FIG. 2B has a hardware configuration according to FIG. 1. The device (101-2) is equipped with a display means (211), a pressure sensor (212), a detecting means (213), a display control means (214), a dividing means (215) and an assigning means (216).

A display means (211) may be built into the device (101-2), or a display means (211) may be connected via a wire or wireless. The display means (211) is preferably built into the device (101-1).

The display means (211) has the same functions as the display means (201) shown in FIG. 2A. Therefore, further explanation of the display means (211) has been omitted.

The pressure sensor (212) is a pressure sensor able to detect pressure applied by an object touching the screen. The pressure sensor (212), for example, may be a sensor able to sense pressure applied by a movable object moving in the vertical direction and coming into contact with the screen. Any pressure sensor (212) available to persons skilled in the art may be used. The pressure sensor array shown in Patent Literature 1 may be used, but the present invention is not limited to this example.

The detecting means (213) may be connected to the pressure sensor (212). The detecting means (213) may detect an object touching the screen via the pressure sensor (212). Also, the detecting means (213) may quantify the pressure applied by an object touching the screen.

The display control means (214) may display a page corresponding to the electronic document on the screen in accordance with the pressure applied by the object on the screen. Also, the display control means (214) may display the initial page where the pressure applied by the object to the screen is zero. The display control means (214) may display the final page where the pressure is at the maximum value, where the maximum value is the value when the pressure applied to the screen exceeds a predetermined value. Also, the display control means (214) may be set to display pages with larger page numbers as the pressure increases, and the page switching pressure may be set in accordance with the total number of displayed pages.

The display control means (214) fixes the display of the page corresponding to the electronic document that is displayed on the screen in accordance with the sliding of the object in a predetermined direction detected by the pressure sensor (212), for example, horizontally to the right. The fixed page may be set as a bookmarked page. After fixing the page, the display control means (214) may transparently display a bookmarked page in the electronic document over the fixed page, or transparently display the fixed page over the bookmarked page. This allows the bookmarked page to be compared to a page before or after the bookmarked page (referred to hereafter as the comparison page). This will be explained in greater detail below.

A bookmarked page may be compared to a page before or after the bookmarked page (a comparison page) by displaying the comparison page and then displaying the bookmarked page on the back screen (along the axis passing through the screen from above). In other words, the display control means (214) is able to transparently display on top of the fixed page one or more pages prior to the page number of the fixed page, one or more pages subsequent to the page number of the fixed page, or a plurality of pages including a combination of these pages. Alternatively, a bookmarked page may be compared to a page before or after the bookmarked page (a comparison page) by displaying the bookmarked page and then displaying the comparison page on the back screen (along the axis passing through the screen from above). In other words, the display control means (214) is able to transparently display the fixed page on top of one or more pages prior to the page number of the fixed page, one or more pages subsequent to the page number of the fixed page, or a plurality of pages including a combination of these pages. In other words, the display control means (214) is able to transparently display the fixed page on top of one or more pages prior to the page number of the fixed page, one or more pages subsequent to the page number of the fixed page, or a plurality of pages including a combination of these pages.

After the fixing, the display control means (214) releases the fixed page when the object is slid, for example, in a predetermined horizontal direction relative to the screen.

The display control means (214) displays pages corresponding to the electronic document gradually at an accelerating rate or gradually at a decelerating rate while advancing through the page numbers. The display control means (214) may perform the page display transition, for example, so that it gradually accelerates as the pressure applied by an operating finger reaches half the maximum value, and so that it gradually decelerates as the pressure applied by the operating finger exceeds half the maximum value and approaches the maximum value.

When the electronic document is composed of sections, the display control means (214) displays on the screen the initial page of a section corresponding to the electronic document in accordance with the amount of pressure applied to the screen by the object. Also, the display control means (214) may display the initial page of a section displayed on the screen immediately before sliding of the object in a predetermined direction as detected by the pressure sensor (212), for example, horizontally to the left. After the initial page of a section has been displayed, the display control means (214) may display on the screen a page subsequent to the initial page of a section in accordance with the amount of pressure applied to the screen by the object.

The dividing means (215) has the same functions as the dividing means (205) shown in FIG. 2A. Therefore, further explanation of the dividing means (215) has been omitted.

The assigning means (216) has the same functions as the assigning means (206) shown in FIG. 2A. Therefore, further explanation of the assigning means (216) has been omitted.

Figure 3A:
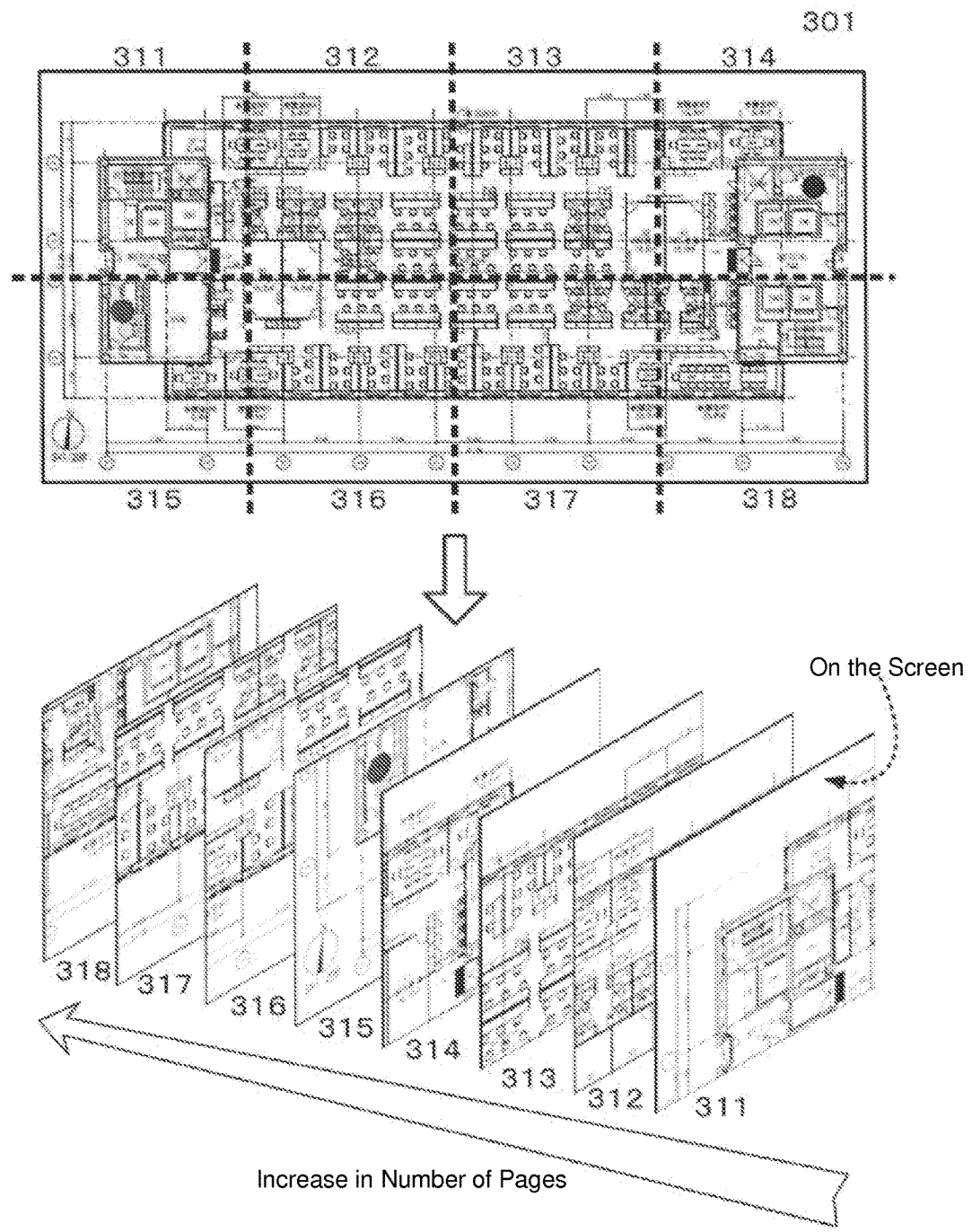
FIG. 3A shows an example of an electronic document with a single unit of display data (office layout diagram) that may be used in an embodiment of the present invention, and an example in which this electronic document is divided into eight units, the divided page data is paginated, and the pages are arranged according to the page number.

FIG. 3A shows an example (upper portion of the drawing) of an electronic document with a single unit of display data (office layout diagram) that may be used in an embodiment of the present invention, and an example (lower portion of the drawing) in which this electronic document is divided into eight units, the divided page data is paginated, and the pages are arranged according to the page number (pages 1-8). The electronic document (301) shown in FIG. 3A (upper portion) is an office layout diagram, and this is a single unit of display data (stored in BMP format). The display size of this electronic document (301) is 1,280 by 4,960 pixels (H×L). The resolution (size) of the screen of the device (101) for displaying electronic documents (301) is 960×640 pixels (H×L). Because the display size of the electronic document (301) is greater than the screen resolution of the device (101), the device (101) maynot display the electronic document (301) on the screen in a way that is visible to the user. Therefore, the dividing means (205, 215) compares the display size of the electronic document (301) to the screen resolution of the device (101), and decides to divide the electronic document (301) by eight so that the divided data is visible to the user on the screen of the data device (101). The dotted lines in FIG. 3A (upper portion) indicate the lines where the electronic document (301) was divided.

The assigning means (205, 215) numbers the divided data (311-318), which has been divided by eight, in sequential order from the upper left to the upper right and then from the lower left to the lower right. Here, divided data (311) is page 1, divided data (312) is page 2, and so on. Last, divided data (318) is page 8.

As shown in FIG. 3A (lower section), the display control means (204, 214) may arrange the divided data (311-318) divided by eight so that divided data (311) is the foremost screen, the page numbers increase as they move inward from the screen, and divided data (318) is last. In this specification, this arrangement of divided data is referred to as a "skewer".

When the divided data (311-318) is displayed by device (101-1), the display control means (204) displays the first page (311) if the user's instruction hand is at or near the farthest point in the detection range of the moving distance-detecting sensor (202). The rest of the divided data (312-317) is displayed so that the page number increases as the instruction hand gets closer to the screen. When the instruction hand touches or is at a point almost touching the screen, divided data (318) is displayed. The display control means (204) may associate divided data (311) with the farthest point in the detection range, associate divided data (318) with the point at which the instruction hand touches the screen, divide the distance traveled by the instruction hand from the farthest point in the detection range to the point at which the hand touches the screen into seven equal intervals, and associate divided data (312-317) with each point (six spots). Alternatively, the display control means (204) may associate divided data (311) with the farthest point in the detection range, associate divided data (318) with the point at which the instruction hand touches the screen, display the divided data so that page numbers increase slowly at first as the user's instruction hand moves from the farthest point in the detection range towards the mid-point between the farthest point in the detection range and the point touching the screen, display the divided data so that page numbers rapidly increase (accelerate) as the user's instruction hand moves closer to the mid-point, display the divided data so that page numbers rapidly decrease (decelerate) as the user's instruction hand moves from the mid-point towards the point touching the screen, and then display the divided data so that page numbers slowly decrease (decelerate) as the user's instruction hand approaches the point at which the screen is touched. The display control means (204) may also adjust the display speed for divided data in accordance with the moving speed of the user's instruction hand.

When the divided data (311-318) divided by eight is displayed by device (101-2), the display control means (214) displays the first page (311) where no pressure (zero pressure) is detected by the pressure sensor (212). The rest of the divided data (312-318) is displayed so that the page number increases as pressure applied to the screen by the user's instruction hand gets stronger. The display control means (214) may display the eighth and final page (318) at the point of maximum pressure, which is when the pressure applied by the user's instruction hand exceeds a predetermined numerical value or reaches a predetermined numerical value set as the maximum pressure. The display control means (214) may associate divided data (311) with a point of zero pressure, associate divided data (318) with the point of maximum pressure, divide the difference between zero pressure and the maximum pressure into seven equal intervals, and associate divided data (312-317) with each point (six spots). Alternatively, the display control means (214) may associate divided data (311) with the point of zero pressure, associate divided data (318) with the point of maximum pressure, display the divided data so that page numbers increase slowly at first as the applied pressure rises from zero to the mid-point between the point of zero pressure and the point of maximum pressure, display the divided data so that page numbers rapidly increase (accelerate) as the pressure approaches the mid-point, display the divided data so that page numbers rapidly decrease (decelerate) as pressure rises from the mid-point towards the point of maximum pressure, and then display the divided data so that page numbers slowly decrease (decelerate) as the pressure approaches the point of maximum pressure. The display control means (214) may also adjust the display speed for divided data in accordance with the pressure load speed.

Figure 3B:
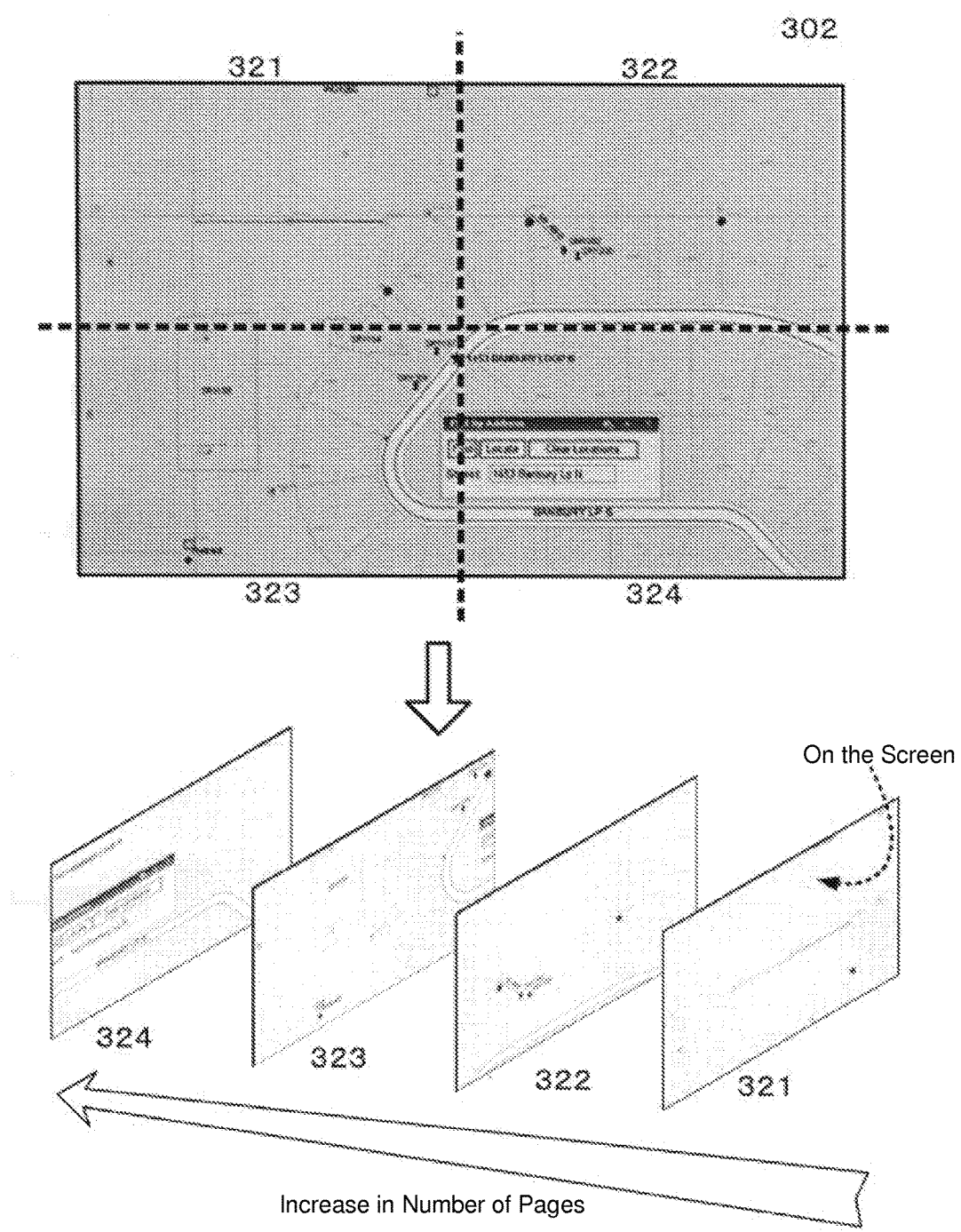
FIG. 3B shows an example of an electronic document with a single unit of display data (map) that may be used in an embodiment of the present invention, and an example in which this electronic document is divided into four units, the divided page data is paginated, and the pages are arranged according to the page number.

FIG. 3B shows an example (upper portion of the drawing) of an electronic document (302) with a single unit of display data (map) that may be used in an embodiment of the present invention, and an example (lower portion of the drawing) in which this electronic document (302) is divided into four units, the divided page data (321-324) is turned into pages, and the pages are arranged according to the page number (pages 1-4).

Figure 3C:
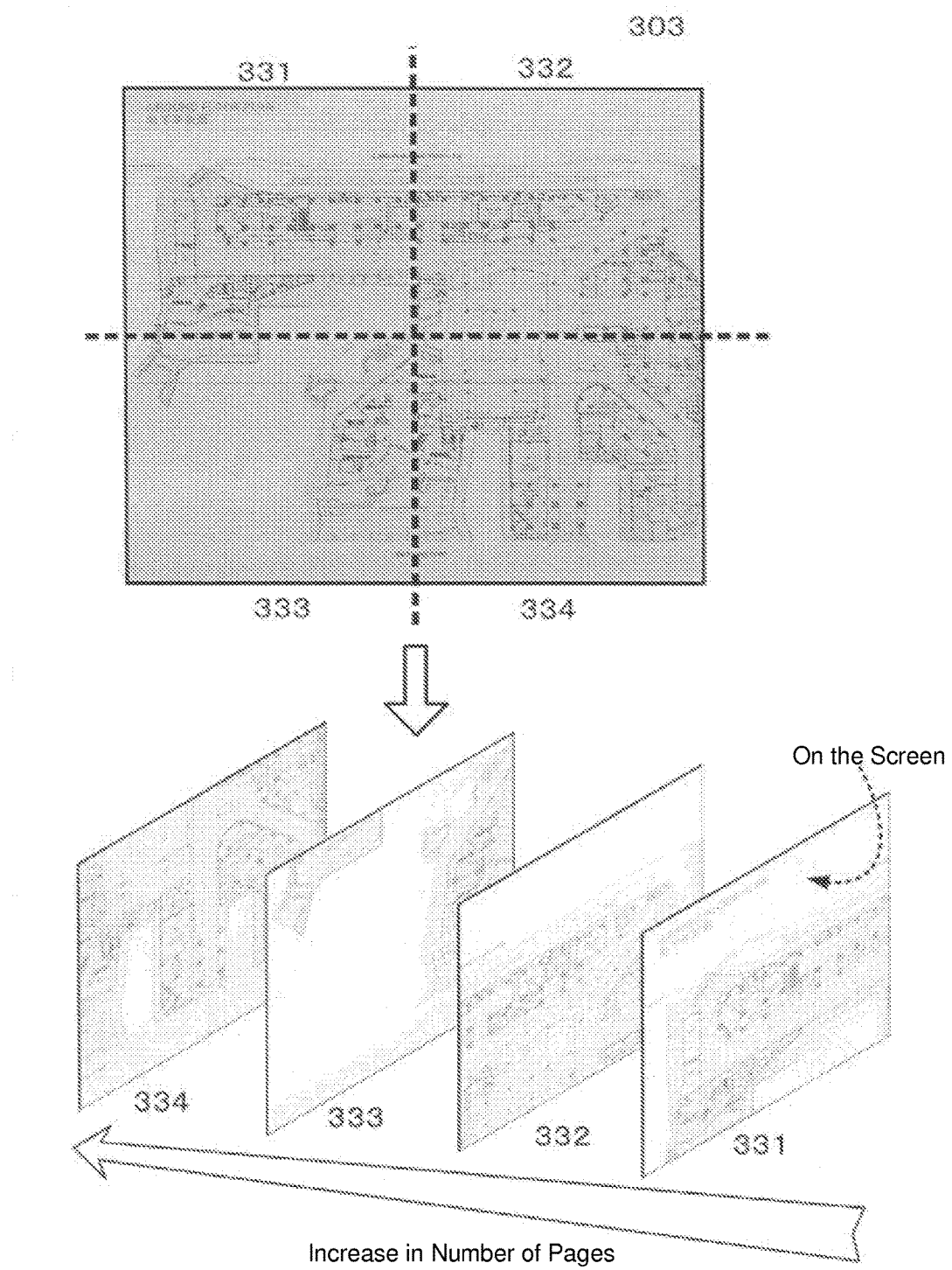
FIG. 3C shows an example of an electronic document with a single unit of display data (blueprint of a building) that may be used in an embodiment of the present invention, and an example in which this electronic document is divided into four units, the divided page data is paginated, and the pages are arranged according to the page number.

FIG. 3C shows an example (upper portion of the drawing) of an electronic document with a single unit of display data (blueprint of a building) (303) that may be used in an embodiment of the present invention, and an example (lower portion of the drawing) in which this electronic document (303) is divided into four units, the divided page data (331-334) is paginated, and the pages are arranged according to the page number (pages 1-4).

Figure 3D:
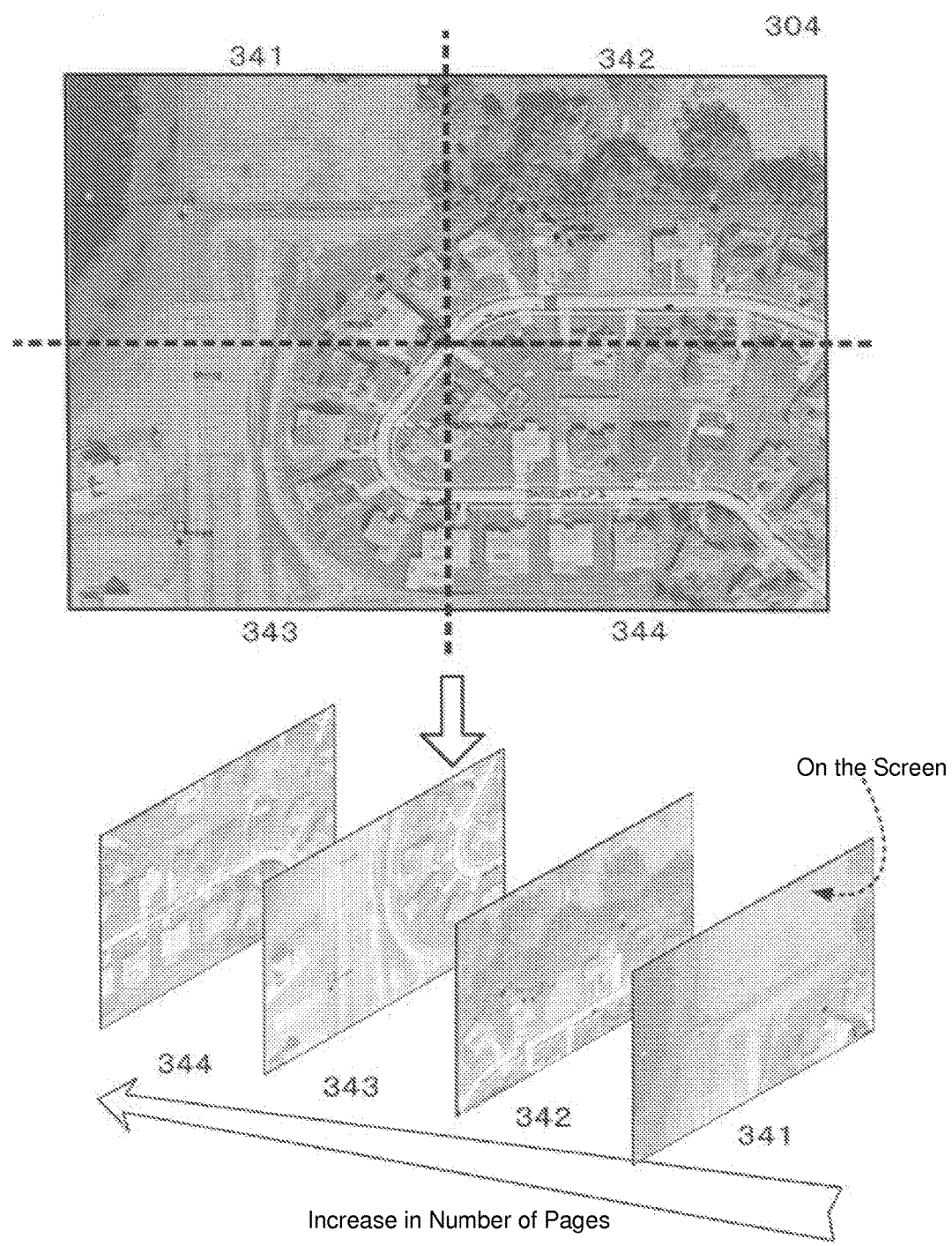
FIG. 3D shows an example of an electronic document with a single unit of display data (aeronautical chart) that may be used in an embodiment of the present invention, and an example in which this electronic document is divided into four units, the divided page data is paginated, and the pages are arranged according to the page number.

FIG. 3D shows an example (upper portion of the drawing) of an electronic document with a single unit of display data (aeronautical chart) (304) that may be used in an embodiment of the present invention, and an example (lower portion of the drawing) in which this electronic document (304) is divided into four units, the divided page data (341-344) is paginated, and the pages are arranged according to the page number (pages 1-4).

Figure 3E:
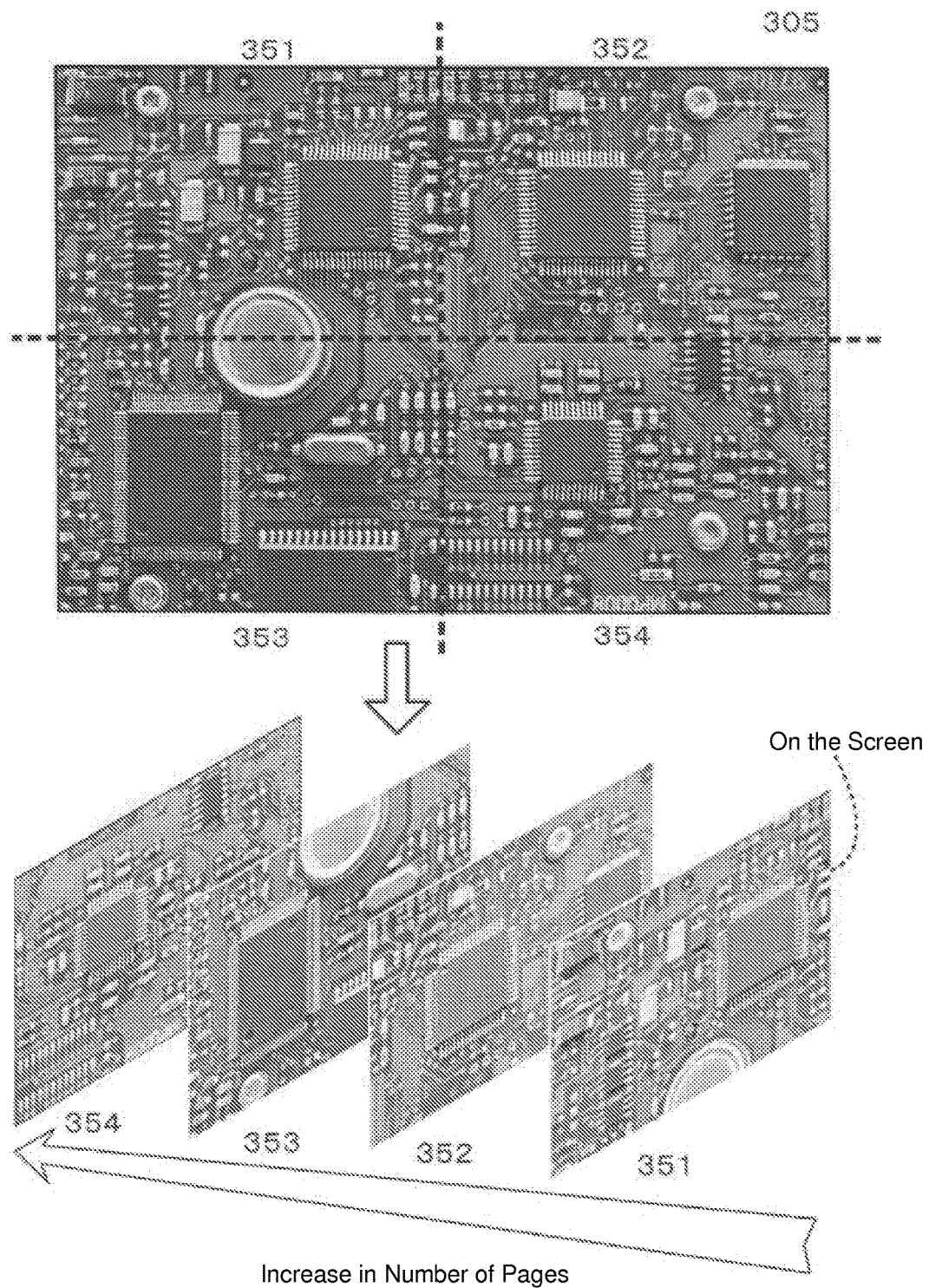
FIG. 3E shows an example of an electronic document with a single unit of display data (image of an electronic circuit board) that may be used in an embodiment of the present invention, and an example in which this electronic document is divided into four units, the divided page data is paginated, and the pages are arranged according to the page number.

FIG. 3E shows an example of an electronic document (upper portion of the drawing) with a single unit of display data (image of an electronic circuit board) (305) that may be used in an embodiment of the present invention, and an example (lower portion of the drawing) in which this electronic document (305) is divided into four units, the divided page data (351-354) is paginated, and the pages are arranged according to the page number (pages 1-4).

Figure 3F:
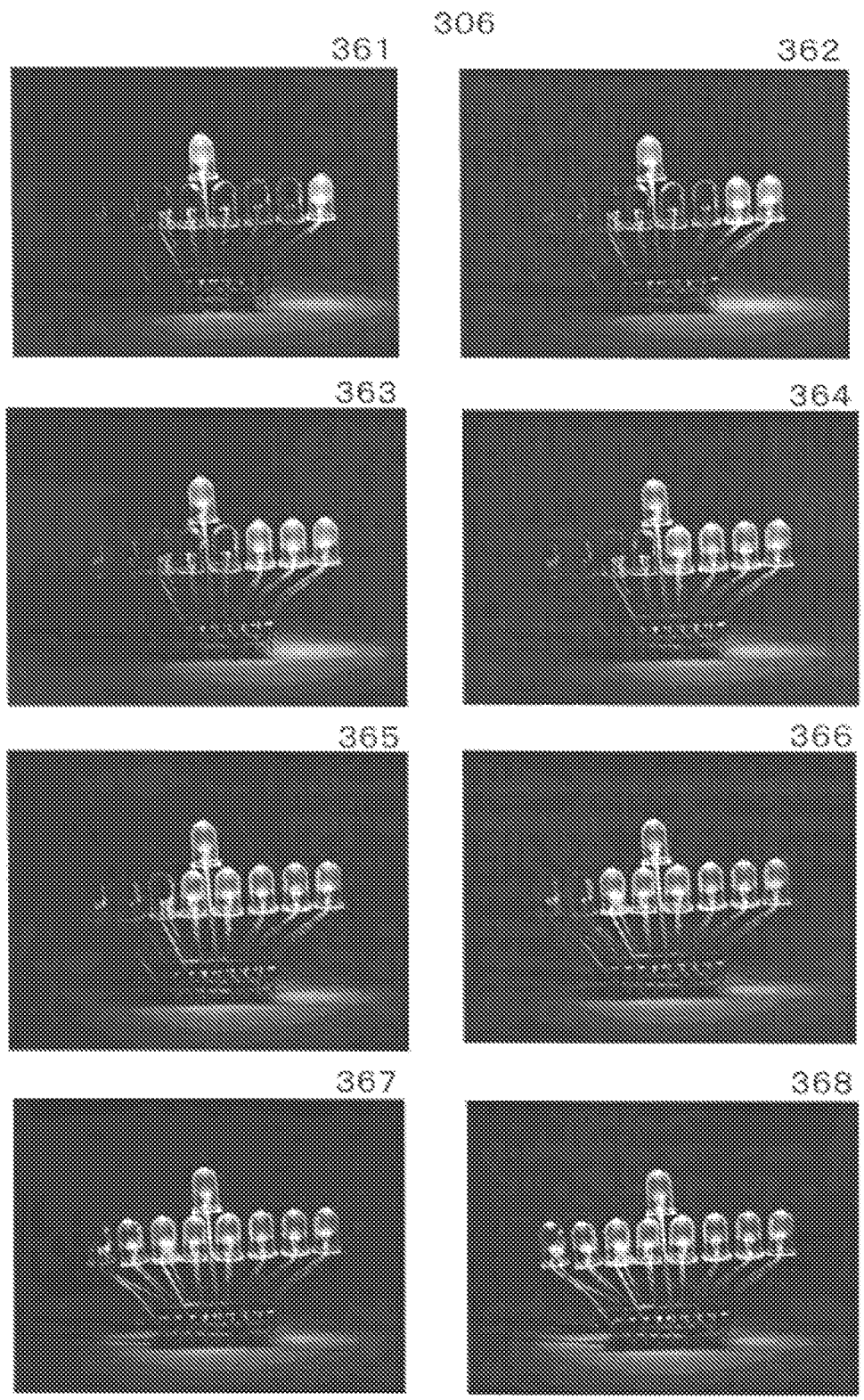
FIG. 3F shows an example of an electronic document with a plurality of pages (presentation images) that may be used in an embodiment of the present invention.

FIG. 3F shows an example of an electronic document with a plurality of pages (presentation images) (306) that may be used in an embodiment of the present invention. The electronic document (306) includes page data (361-368) constituted as pages 1-8. The page data (361-368) is viewed according to page number (pages 1-8) so that the light bulbs appear to turn on from right to left.

Figure 3G:
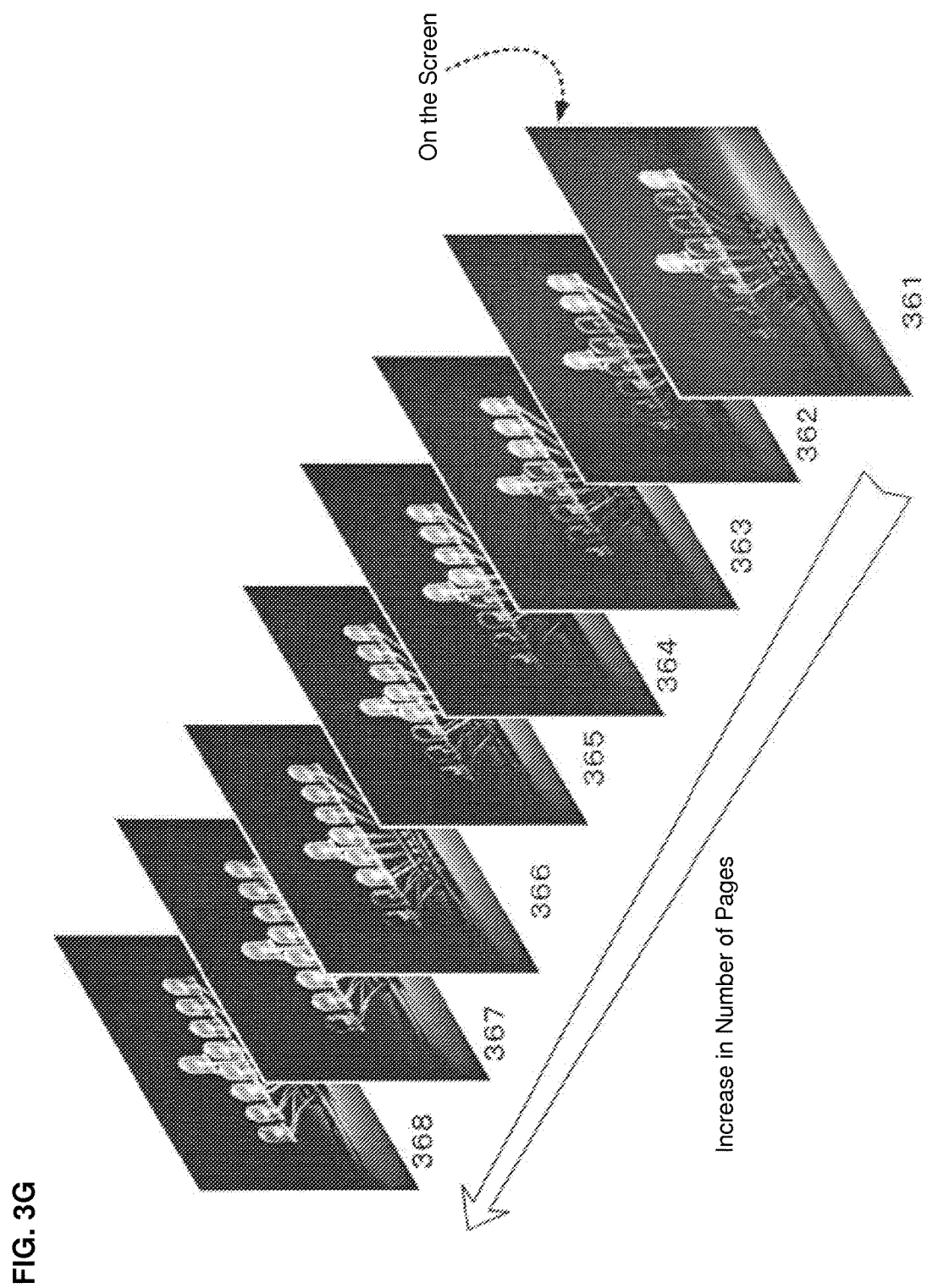
FIG. 3G shows an example of the electronic document with a plurality of pages in FIG. 3F (presentation images) arranged according to the page number.

FIG. 3G shows an example of the electronic document (presentation images) (306) with a plurality of pages (361-368) in FIG. 3F arranged according to page number (pages 1-4).

Figure 3H:
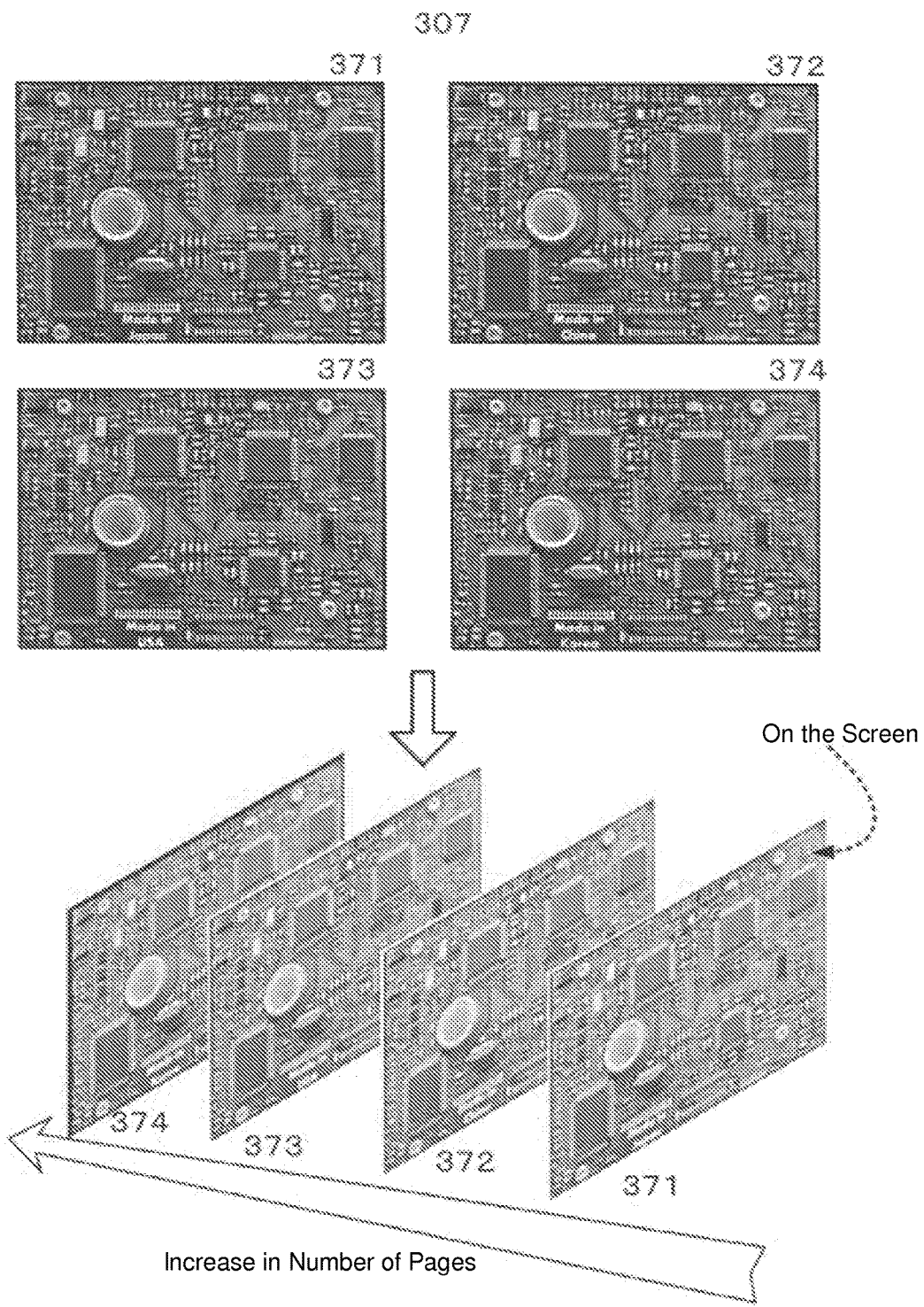
FIG. 3H shows an example of an electronic document with a plurality of pages (image of an electronic circuit board) that may be used in an embodiment of the present invention, and an example of the electronic document arranged according to the page number.
Figure 31:
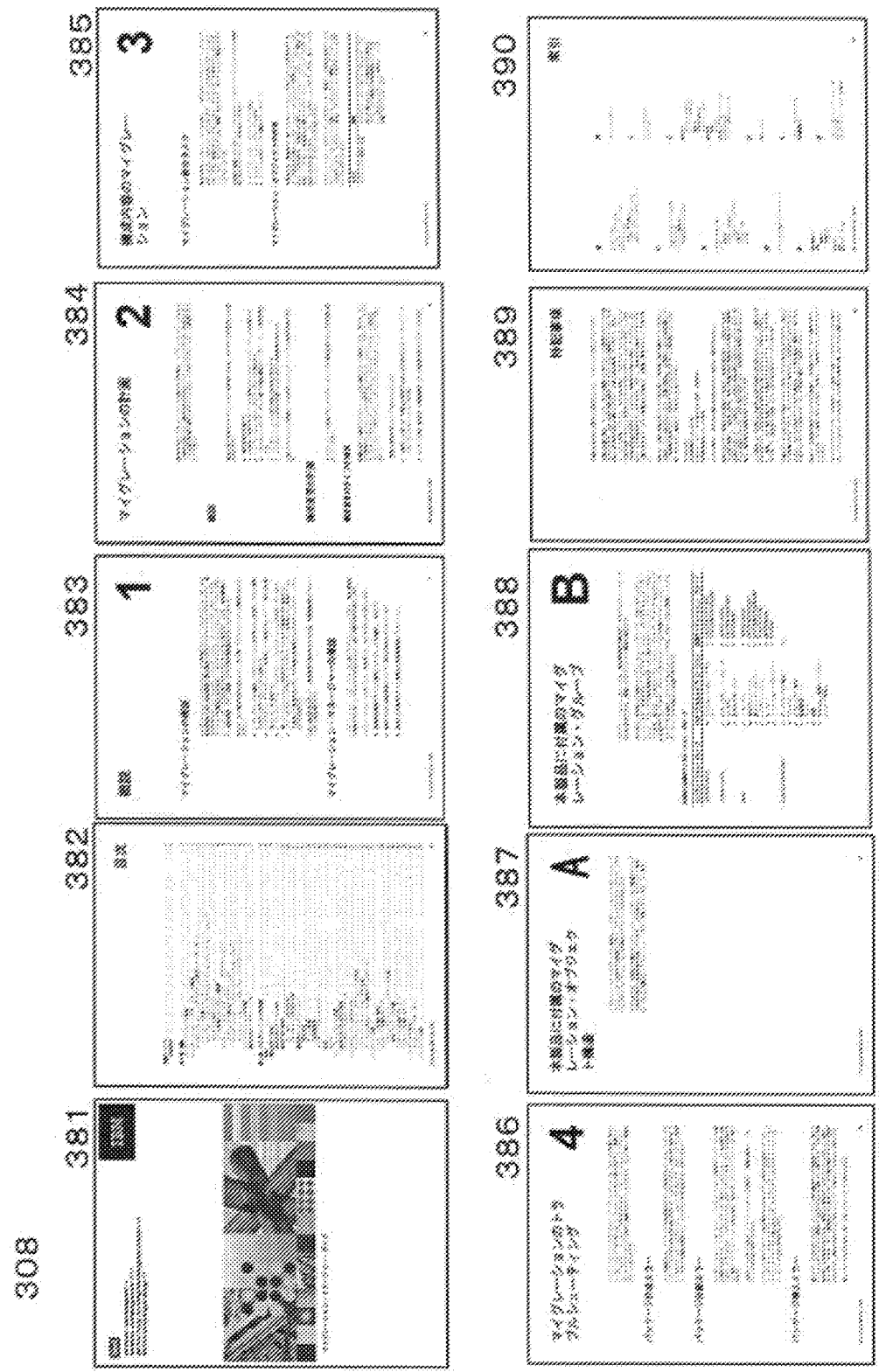

FIG. 3H shows an example (upper portion of the drawing) of an electronic document with a plurality of pages (image of an electronic circuit board) (307) that may be used in an embodiment of the present invention, and an example (lower portion of the drawing) of the electronic document arranged according to the page number. The electronic document (307) includes page data (371-374) constituted as pages 1-4. Each unit of page data (371-374) shows chips manufactured in different countries. Here, the chip in page data (371) is made in Japan, the chip in page data (372) is made in China, the chip in page data (373) is made in the USA, and the chip in page data (374) is made in Korea.

FIG. 3I is an example of an electronic document with a plurality of pages (PDF file of a manual) (308) that may be used in an embodiment of the present invention showing the initial page (381-390) of each section of the electronic document. The sections of the electronic document (308) are cover page (381), table of contents (382), chapter 1 (383), chapter 2 (384), chapter 3 (385), chapter 4 (386), appendix A (387), appendix B (388), disclaimers (389), and the index (390).

Figure 3J:
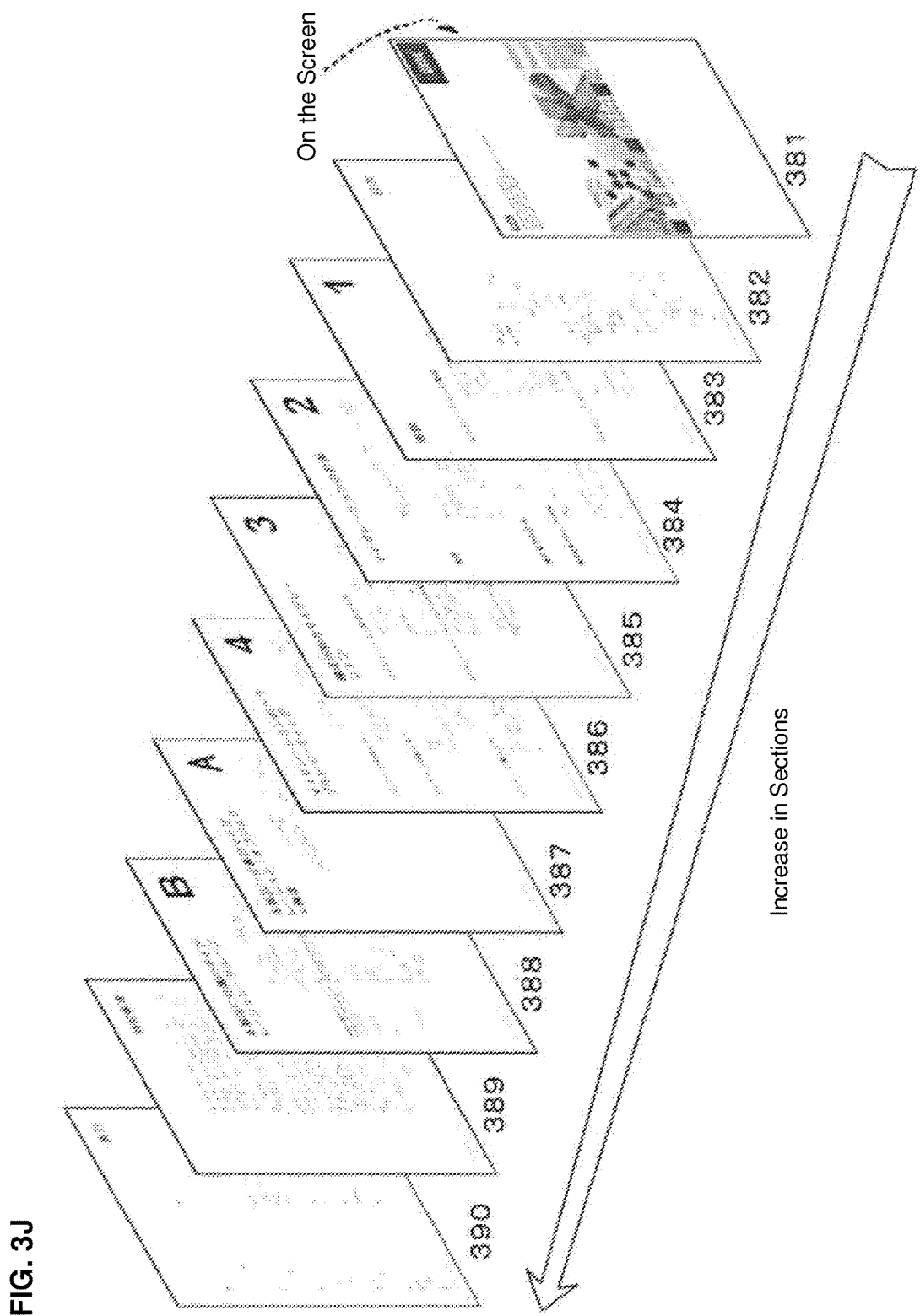
FIG. 3J shows an example in which the initial page of each section of the electronic document with a plurality of pages in FIG. 3I (PDF file of a manual) is paginated, and the initial pages are arranged according to the page number.

FIG. 3J shows an example in which the initial page (381-390) of each section of the electronic document (PDF file of a manual) (308) with a plurality of pages in FIG. 3I is paginated (corresponding to pages 1-10), and the initial pages (381-390) are arranged according to page number (pages 1-10). All of the page data other than the initial pages (381-390) of the sections is stored, for example, in the memory device (108).

Figure 3K:
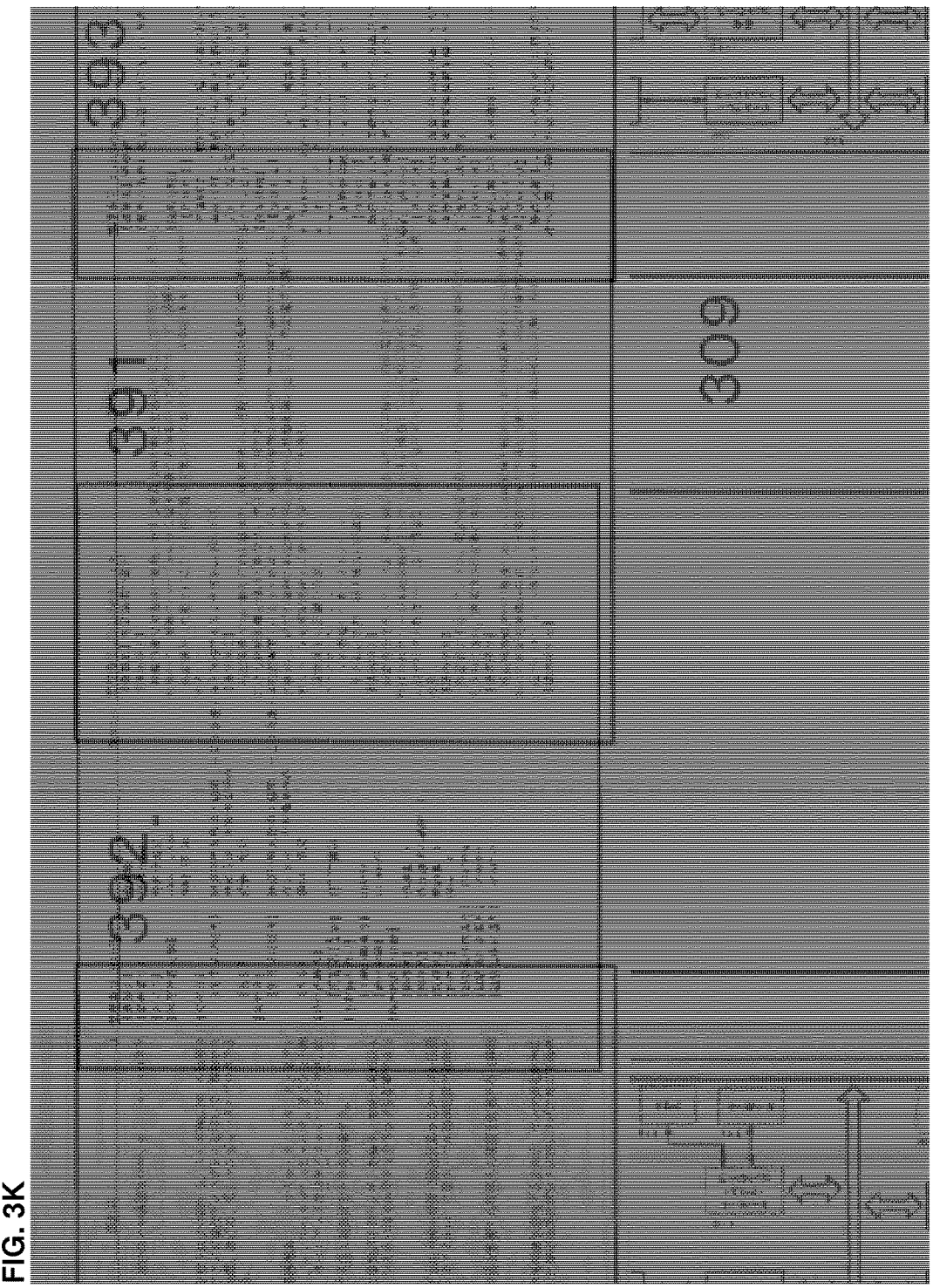
FIG. 3K is an example of an electronic document with a plurality of pages (PDF file of a patent specification) that may be used in an embodiment of the present invention showing the initial page of each section of the electronic document.

FIG. 3K is an example of an electronic document with a plurality of pages (PDF file of a patent specification) (309) that may be used in an embodiment of the present invention showing the initial page (391-395) of each section of the electronic document. The sections of this electronic document (308) are the bibliographic information (391), the specification (392), the claims (393), the abstract (394) and the drawings (395).

Figure 3L:
FIG. 3L shows an example in which the initial page of each section of the electronic document with a plurality of pages in FIG. 3K (PDF file of a patent specification) is paginated, and the pages are arranged according to the page number.

FIG. 3L shows an example in which the initial page (391-395) of each section of the electronic document with a plurality of pages in FIG. 3K (PDF file of a patent specification) (309) is paginated (corresponding to pages 1-5), and the pages (391-395) are arranged according to the page number (page 1-5). All of the page data other than the initial pages (391-395) of the sections is stored, for example, in the memory device (108).

Figure 4A:
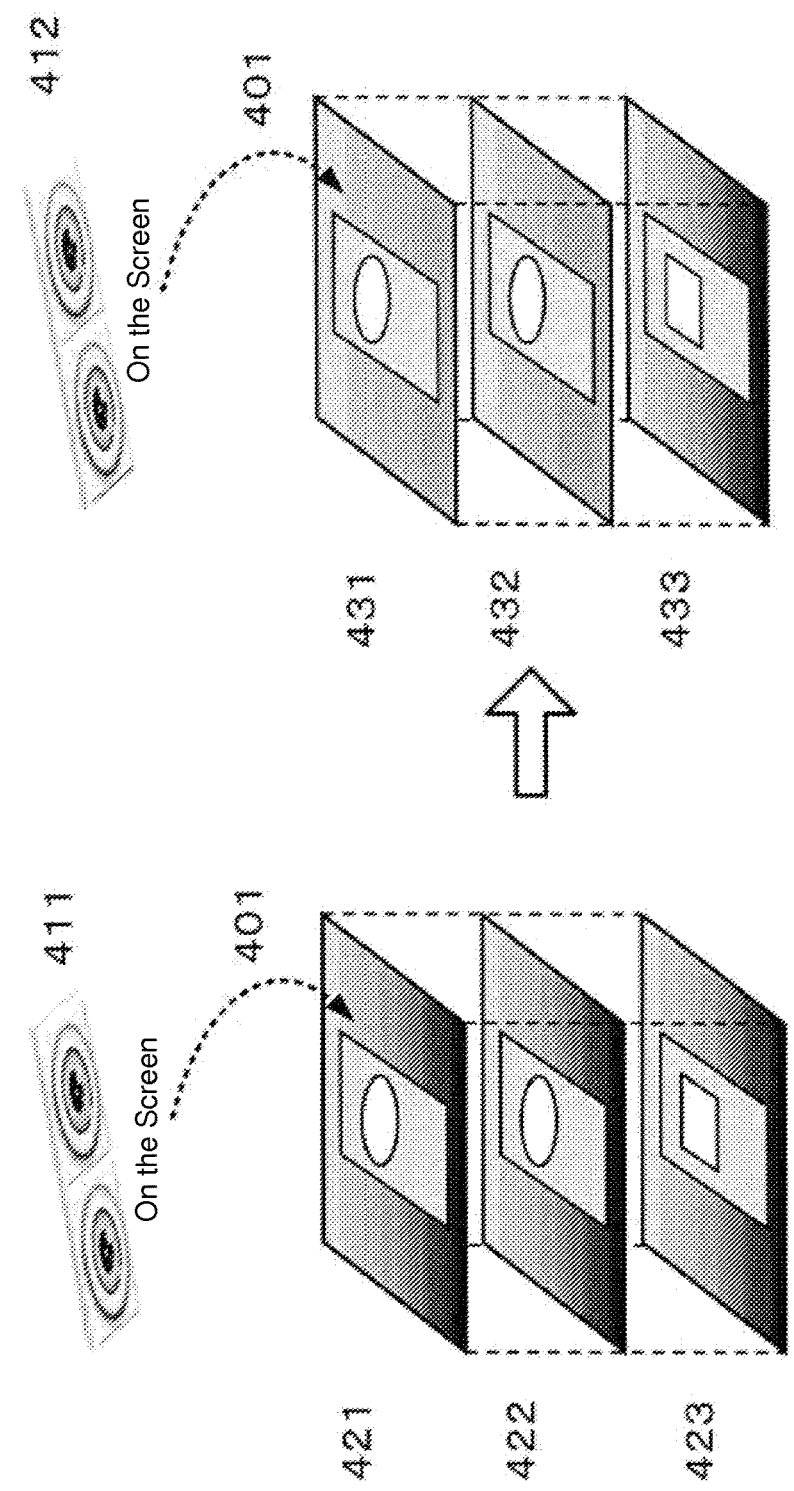
FIG. 4A shows an example of an electronic document (a document including drawings) that may be used in an embodiment of the present invention in which pages are transparently displayed on a screen.

FIG. 4A shows an example of an electronic document (a document including drawings) that may be used in an embodiment of the present invention in which pages are transparently displayed on a screen. The user views the electronic document (401) from above (411). Page data (421), page data (422) and page data (423) are arranged according to page number (pages 1-3) from the foremost screen. Thus, the user may view page data (421), but may not view page data (422) and page data (423).

Therefore, because page data (421) has been bookmarked, the display control means (204, 214) sets page data (421) to the transparency level for the foremost screen (for example, 60%) to become page data (431), sets the next page data (422) to a transparency level (for example, 30%) that is somewhat lower than that of page data (431) to become page data (432), and does not render the final page data (423) transparent (for example, a transparency level of 0%, which is the non-transparent setting) to become page data (433). In other words, the page data on the foremost screen is the most transparent, and the transparency level decreases while moving downward through the screens (see 412).

The user views the electronic document (401) from above (412). Here, the user may view the next page data (432) and the final page data (433) through the page data (431) on the foremost screen. In this way, the user may compare the contents of the page data (431) on the foremost screen to the content of the subsequent page data (432-433) for reference purposes.

In example (412), the content of a bookmarked page was compared to the content of two other pages for reference purposes. The content of the bookmarked page may also be compared to the content of one other page (432 or 433) for reference purposes in the same way. However, the content becomes more difficult to see as the number of pages increases. Therefore, the sets of page data should be minimized, and the background of each set of page data may be given a different color or pattern.

Figure 4B:
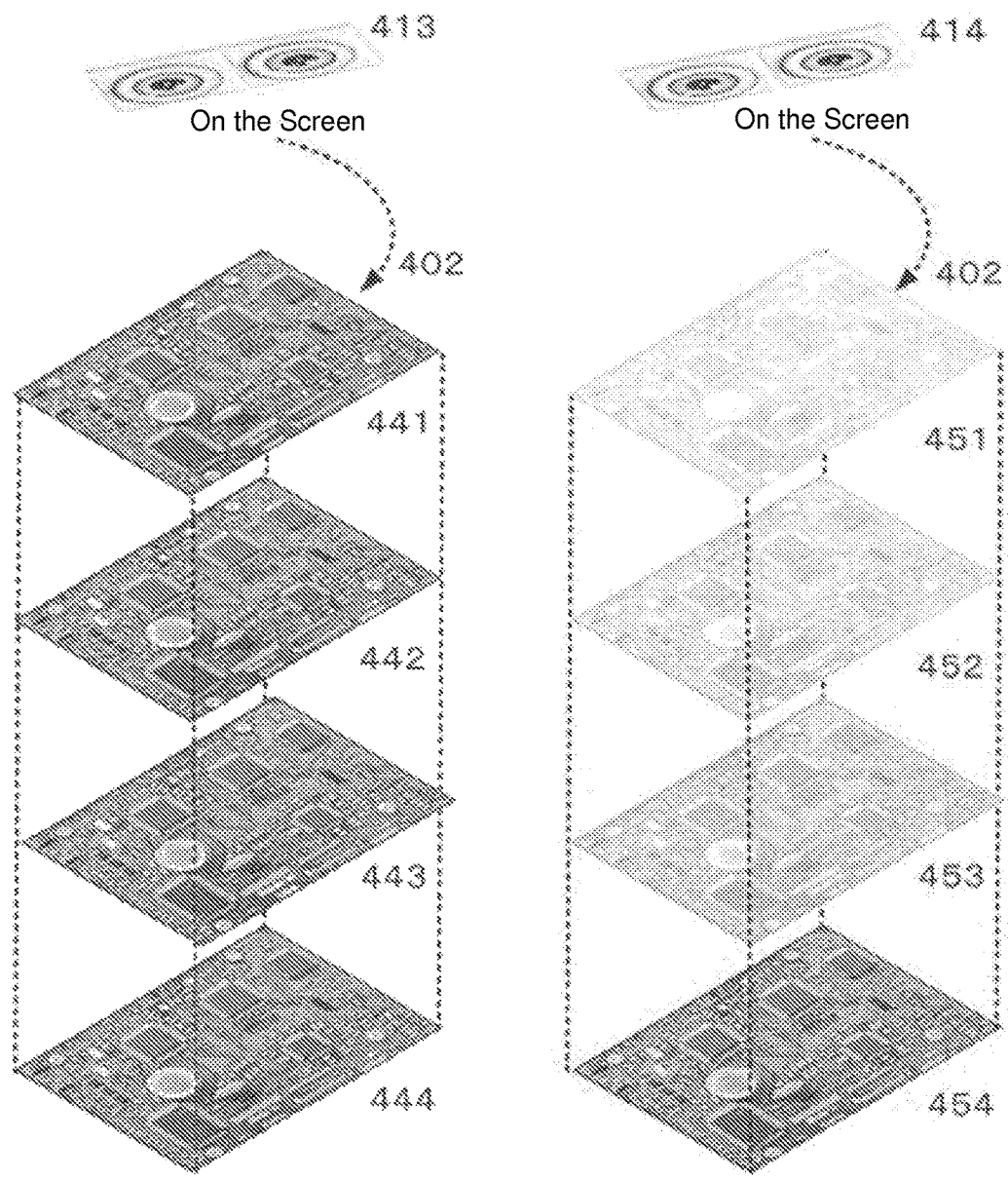
FIG. 4B shows an example of an electronic document (an image of an electronic circuit board) that may be used in an embodiment of the present invention in which pages are transparently displayed on a screen.

FIG. 4B shows an example of an electronic document (an image of an electronic circuit board) that may be used in an embodiment of the present invention in which pages are transparently displayed on a screen. The user views the electronic document (402) from above (413). Page data (441), page data (442), page data (443) and page data (444) are arranged according to page number (pages 1-4) from the foremost screen. Thus, the user may view page data (441), but may not view page data (442), page data (443) and page data (444).

Therefore, because page data (441) has been bookmarked, the display control means (204, 214) sets page data (441) to the transparency level for the foremost screen (for example, 80%) to become page data (451), sets the next page data (442) to a transparency level (for example, 60%) that is somewhat lower than that of page data (451) to become page data (452), sets the next page data (443) to a transparency level (for example, 40%) that is somewhat lower than that of page data (452) to become page data (453), and does not render the final page data (444) transparent (for example, 0%) to become page data (454). In other words, the page data on the foremost screen is the most transparent, and the transparency level decreases while moving downward through the screens (see 414).

The user views the electronic document (401) from above (414). Here, the user may view the next page data (452), the subsequent page data (453), and the final page data (454) through the page data (451) on the foremost screen. In this way, the user may compare the contents of the page data (451) on the foremost screen to the content of the subsequent page data (452-454) for reference purposes. In the example shown in FIG. 4B, the user compares the chips on electronic circuit boards manufactured in different countries using the transparency function.

In example (414), the content of a bookmarked page was compared to the content of three other pages for reference purposes. The content of the bookmarked page may also be compared to the content of one other page (452-454) or to the content of any combination of two other pages (452-454) for reference purposes in the same way.

Figure 5A:
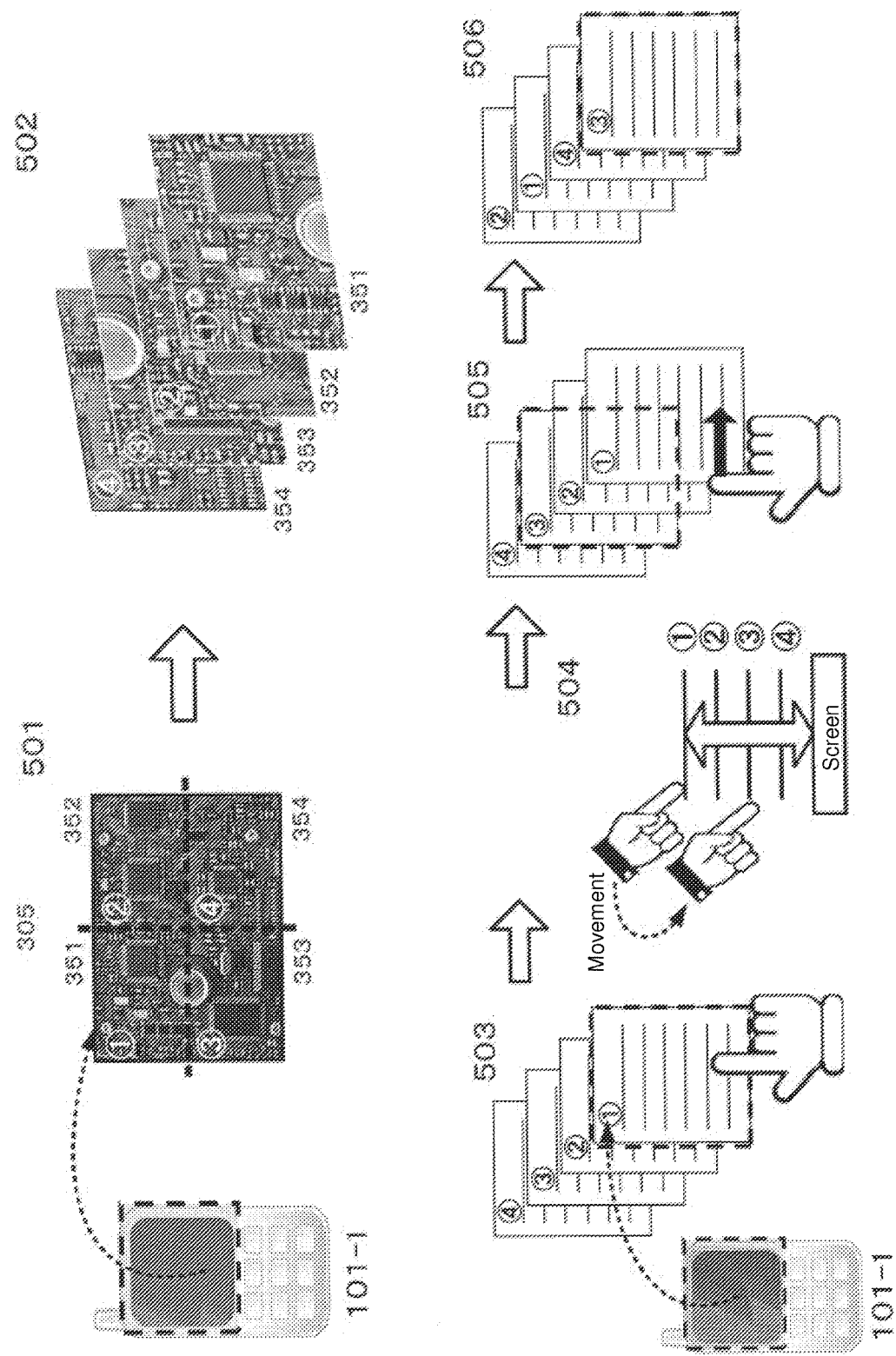
FIG. 5A shows an example of an electronic document with a single unit of display data (an image of an electronic circuit board) that may be used in an embodiment of the present invention in which this electronic document is divided, the divided page data is paginated, and the page data is arranged according to the page number; and shows an example in which pages are selected and fixed using a moving distance-detecting sensor of the pages (for example, a proximity sensor), and the fixed pages are transparently displayed.

FIG. 5A shows an example (upper portion of the drawing) of an electronic document with a single unit of display data (an image of an electronic circuit board) (305) that may be used in an embodiment of the present invention in which the electronic document is divided, the divided page data (351-354) is paginated, and the page data is arranged according to the page number (pages 1-4); and shows an example (lower portion of the drawing) in which pages are selected and fixed using a moving distance-detecting sensor of the pages (for example, a proximity sensor), and the fixed pages are transparently displayed. The electronic document (image of an electronic circuit board) (305) shown in FIG. 5A is the same electronic document (305) shown in FIG. 3E. In other words, the electronic document (305) is a single unit of display data. The display size of the electronic document (305) is greater than the size of the screen in the device (101-1).

In Step 501, the user issues a request to display the electronic document (305) on the device (101-1). The electronic document (305) may be displayed, for example, inside browser software. However, the display size of the single page (single unit of display data) in the electronic document (305) is greater than the size of the screen in the device (101-1), so the device (101-1) may only display a portion of the electronic device (305) (for example, 351) using the default setting. Therefore, the user, for example, triple clicks the screen of the device (101-1). The device (101-1) detects the triple click and calls up the screen selection mode. The device (101-1) then calls up the dividing means (205) in response to the screen mode being called up.

In Step 502, the dividing means (205) compares the display size of the electronic document (305) to the screen resolution of the device (101-1), and decides to divide the electronic document (305) by four so that the user may view the divided data on the screen of the device (101-1). The dividing means (205) then divides the electronic document (305) into four units (see Step 501 in the drawing). Alternatively, the device (101-1) may call up the dividing means (205) when a triple click is detected. The dividing means (205) may then display an interface on the screen for the user to enter a number to divide the document by. In response to an entered number, the dividing means (205) may divide the electronic document (305) by the entered number.

The assignment means (206) in device (101-1) paginates (numbers) the divided data (351-354) from the upper left, and arranges the divided data by page number (pages 1-4) (see Step 502 in the drawing. The device (101-1) initially displays the first page of divided data (351) on the foremost screen. Essentially, the display control means (204) of the device (101-1) displays only divided data (351) on the screen. The display control means (204) may set the point for display of the initial or first page at or near the farthest point at which the moving distance-detecting sensor (202) may detect the user's operating finger, set the point for display of the final or fourth page at the point where the user's operating finger touches the screen, and associate the second and third pages with certain distances from the screen so that the page number of the displayed pages increases as the user's operating finger approaches the screen (see Step 504 in the drawing).

In Step 503, the display control means (204) transitions to the screen selection mode when a message is received from the assigning means (206) that the electronic data (305) has been divided. The user may be alerted to the transition to the screen selection mode, for example, by pop up information displayed on the screen. The user's operating finger (for example, the index finger of the right hand) may then be held over the screen.

In Step 504, the user's operating finger approaches the screen. The sensor (202) detects movement of the operating finger, and sends operating finger movement information to the detecting means (203). The detecting means (203) then determines the distance of the operating finger from the screen. The sensor (202) may also determine the speed of the operating finger. The display control means (204) displays one of the first through fourth pages on the screen (corresponding to data 351-354) in accordance with the distance of the operating finger from the screen (see Step 504 in the drawing). In Step 504 shown in the drawing, the operating finger moves from the distance corresponding to the first page towards the screen to the distance corresponding to the third page. Here, the display control means (204) may display the first and second pages prior to the third page transparently above the third page so that the third page may be viewed. For example, the display control means (204) may set the transparency level of the first page to 50%, and the transparency level of the second page to 25%. The displayed content of each page may become fainter as the transparency level increases. Alternatively, the brightness level of the first page may be set to 60%, and the brightness level of the second page to 30%. The displayed content of each page may become fainter as the brightness level increases. Because the display control means (204) displays the content of the third page while making the content of the first and second pages transparent, the user may see the pages advance in response to movement of the operating finger, and the differences between the current page and the previous pages may be seen.

In Step 505, the display control means (204) currently displays the third page because the current position of the operating hand is at the distance above the screen corresponding to the third page (see Step 505 in the drawing). At this time, the display control means (204) may display the first and second pages prior to the third page transparently on top of the third page.

When a displayed page has been reached, the user may select and fix the page by sliding the operating finger held above the screen in a predetermined horizontal direction relative to the screen (for example, horizontally to the left).

In Step 506, when the detecting means (203) has detected the sliding of the operating finger in the predetermined horizontal direction, the display control means (204) displays a message that the page corresponding to the position of the operating finger immediately before the sliding operation (that is, the third page) has been fixed. The display control means (204) may then arrange the fixed page (the third page shown in Step 505) on the foremost screen, followed by the fourth page shown in Step 505, and optionally the first page shown in Step 505 and the second page shown in Step 505. The device (101-1) then ends the screen selection mode.

By performing the operations and processing shown in Steps 501 through 506, a user may readily view a single unit of display data on the screen of the device (101-1), and may easily reach the intended page using an operating finger.

Figure 5B:
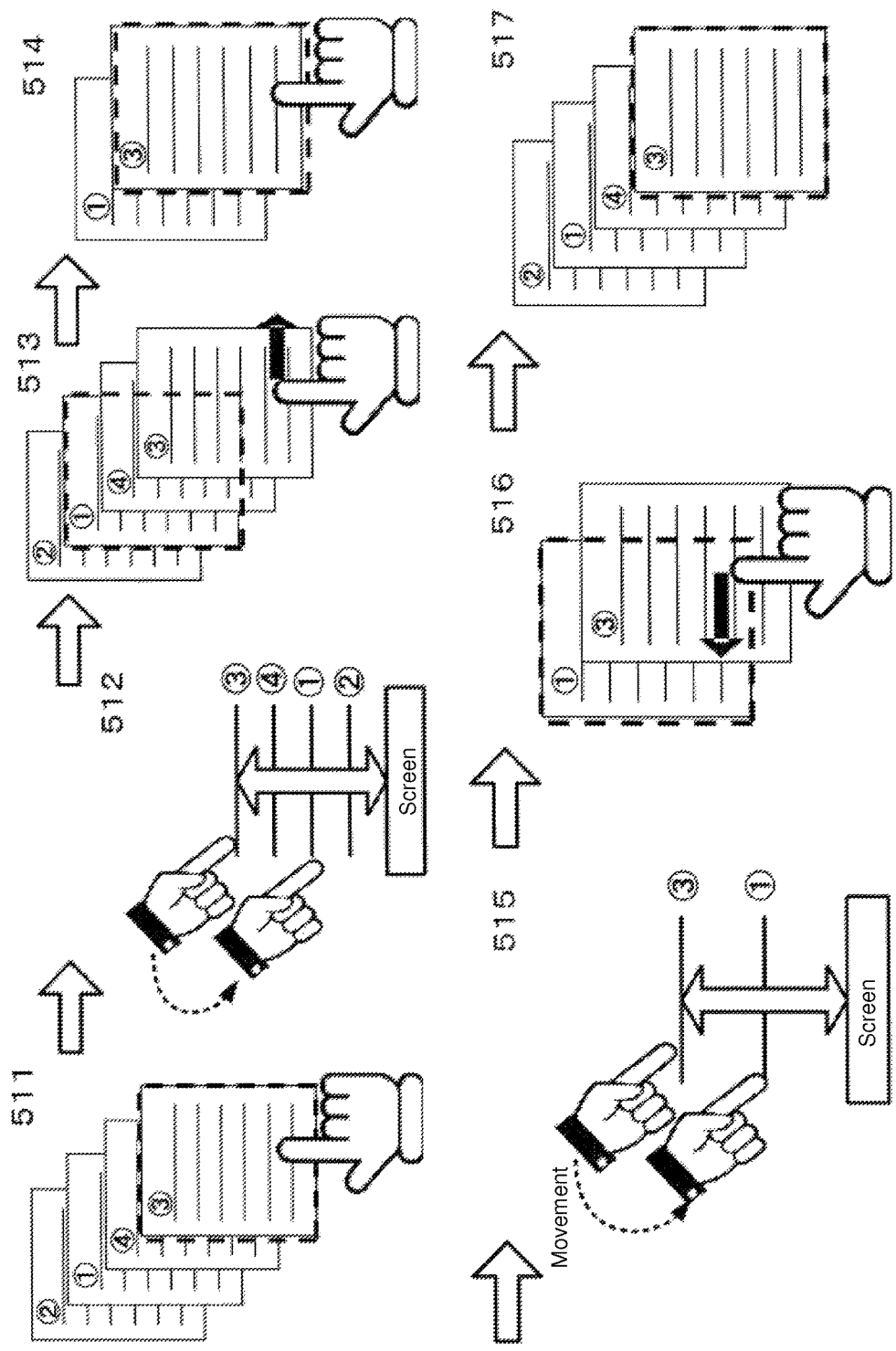
FIG. 5B shows an example in which another page is selected using the moving distance-detecting sensor, and the fixed page is transparently displayed in order to compare the page fixed in FIG. 5A to the other page.

FIG. 5B shows an example in which another page is selected using the moving distance-detecting sensor, and the fixed page is transparently displayed in order to compare the page fixed in FIG. 5A to the other page. In Step 506 of FIG. 5A described above, the display control means (204) may arrange the fixed page (the third page shown in Step 505) on the foremost screen, followed by the fourth page shown in Step 505, and optionally the first page shown in Step 505 and the second page shown in Step 505 (not shown in the drawing). The following is an explanation of the method allowing for comparison of content between pages after Step 506.

In Step 511, the user may, for example, triple click the screen of the device (101-1) and slide an operating finger in a predetermined horizontal direction relative to the screen (for example, horizontally to the left) to call up the screen comparison mode. The user then holds an operating finger above the screen.

In Step 512, the user's operating finger approaches the screen. The sensor (202) detects movement of the operating finger, and sends operating finger movement information to the detecting means (203). The detecting means (203) then determines the distance of the operating finger from the screen. The sensor (202) may also determine the speed of the operating finger. The display control means (204) in device (101-1) displays the third, the fourth and, optionally, the first and second pages on the screen (corresponding to data 353, 354, 351 and 352) in accordance with the distance of the operating finger from the screen (see Step 512 in the drawing). In Step 512 shown in the drawing, the operating finger moves from the distance corresponding to the third page towards the screen to the distance corresponding to the first page. Here, the display control means (204) may display the third and fourth pages prior to the first page transparently above the first page so that the first page may be viewed. For example, the display control means (204) may set the transparency level of the third page to 50%, and the transparency level of the fourth page to 25%. Alternatively, the brightness level of the third page may be set to 60%, and the brightness level of the fourth page to 30%. Because the display control means (204) displays the content of the first page while making the content of the third and fourth pages transparent, the user may see the pages advance in response to movement of the operating finger, and the differences between the current page and the previous pages may be seen.

In Step 513, the display control means (204) currently displays the first page because the current position of the operating hand is at the distance above the screen corresponding to the first page. At this time, the display control means (204) may display the third and fourth pages prior to the first page transparently on top of the first page (in successive order from the highest distance above the screen).

When the comparison page has been reached, the user may select and fix the page by sliding the operating finger held above the screen in a predetermined horizontal direction relative to the screen (for example, horizontally to the left).

In Step 514, when the detecting means (203) has detected the sliding of the operating finger in the predetermined horizontal direction, the display control means (204) displays a message that the page corresponding to the position of the operating finger immediately before the sliding operation (that is, the first page) has been fixed. The display control means (204) then arranges the fixed page (the third page shown in Step 513) on the foremost screen, followed by the comparison page (the first page shown in Step 515). At this time, the display control means (204) may display the third page prior to the first page transparently on top of the first page. Next, the user may optionally adjust the transparency level of the third page in Step 515.

In Step 515, the user's operating finger approaches the screen. The sensor (202) detects movement of the operating finger, and sends operating finger movement information to the detecting means (203). The detecting means (203) then determines the distance of the operating finger from the screen. The sensor (202) may also determine the speed of the operating finger. The display control means (204) changes the transparency level of the third page in accordance with the distance of the operating finger from the screen (see Step 515 in the drawing). For example, in Step 515 shown in the drawing, the operating finger is moved from the distance corresponding to the third page towards the screen to the position corresponding to the first page. As the operating finger approaches the distance corresponding to the first page, the third page is displayed more faintly. Because the display control means (204) displays the content of the first page while making the content of the third page transparent, the user may see the pages advance in response to movement of the operating finger, and the differences between the current page and the previous page may be seen.

In Step 516, when the comparison of the third page to the first page has been completed, the user moves the operating finger held above the screen in a predetermined horizontal direction relative to the screen (for example, horizontally to the left). The detecting means (203) detects the sliding of the operating finger in the predetermined horizontal direction. In response, the device (101-1) ends the screen comparison mode.

When the screen comparison mode is ended in Step 517, the display control means (204) returns to the page display shown in Step 511.

In the explanation of Steps 501 through 517, the electronic document (305) is a single unit of display data. In the explanation, the single unit of display data was divided. For other examples, see electronic document (301) in FIG. 3A, electronic document (302) in FIG. 3B, electronic document (303) in FIG. 3C and electronic document (304) in FIG. 3D.

In another embodiment of the present invention, the electronic document has display data composed of a plurality of pages. Here, the pages do not need to be divided. For examples, see electronic document (306) in FIG. 3F, electronic document (307) in FIG. 3H, electronic document (308) in FIG. 3I and electronic document (309) in FIG. 3K. In these examples, when the device (101-1) has called up the screen selection mode, the dividing means (205) and the assigning means (206) do not perform any processing.

Instead, the process advances directly to the screen selection mode shown in Step 503, and the same processing (503-517) may be performed.

In another embodiment of the present invention, the electronic document (305) has a plurality of pages and sections. Here, when the screen selection mode has been called up, the dividing means (205) extracts the initial page of each section, and the assigning means (206) paginates (or numbers) the initial pages of the extracted sections in ascending order in accordance with their original (pre-extraction) page numbers (see FIG. 3J and FIG. 3L). The process then advances to the screen selection mode, and the same processing (503-517) may be performed.

Figure 6A:
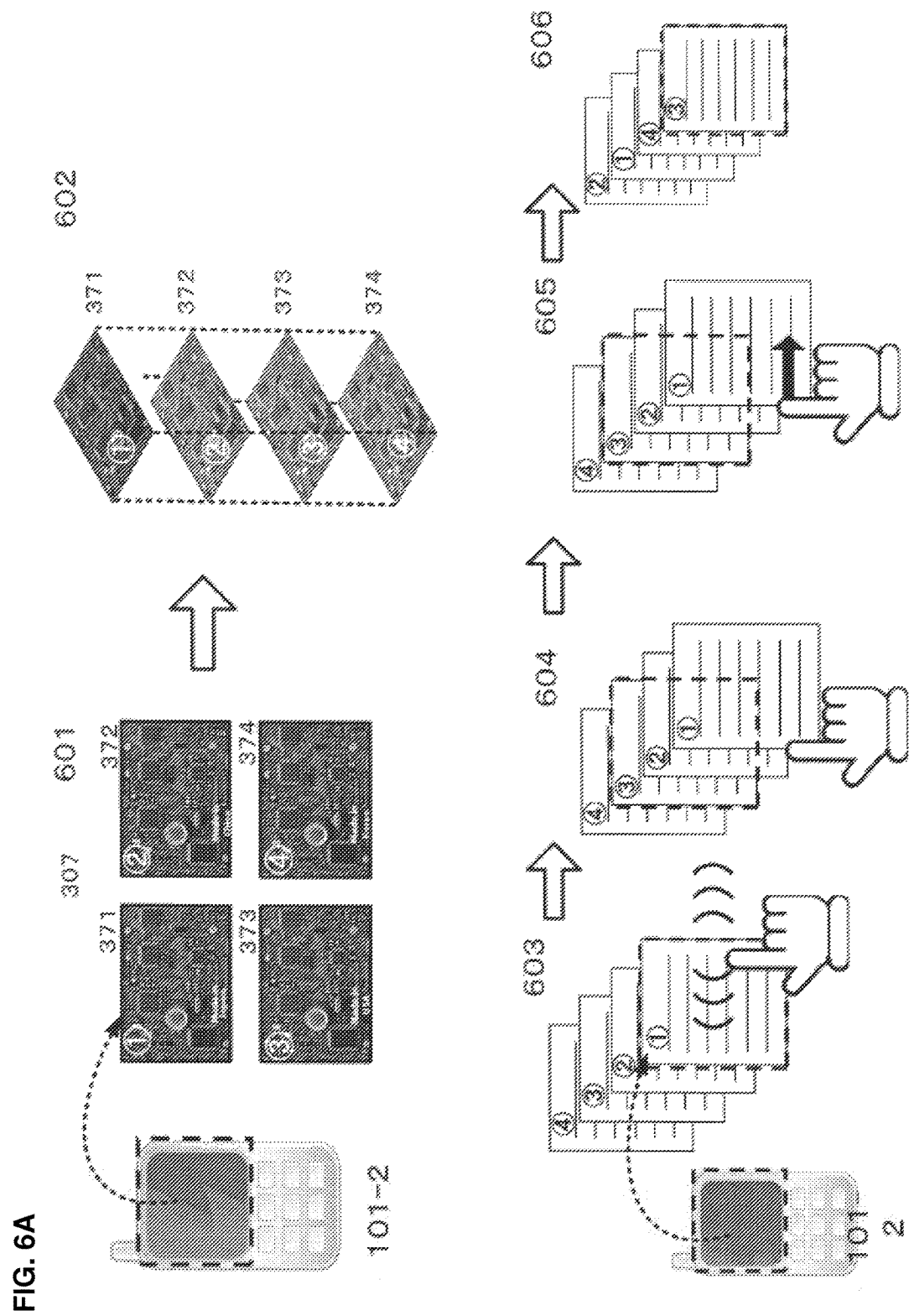
FIG. 6A shows an example of the page data of an electronic document with a plurality of pages (images of an electronic circuit board) in an embodiment of the present invention arranged according to page number; and an example in which screens are selected and fixed using a pressure sensor, and the fixed pages are transparently displayed.

FIG. 6A shows an example (upper portion of the drawing) of the page data of an electronic document with a plurality of pages (images of an electronic circuit board) in an embodiment of the present invention arranged according to page number; and an example (lower portion of the drawing) in which screens are selected and fixed using a pressure sensor (212), and the fixed pages are transparently displayed. The electronic document (images of an electronic circuit board) (307) shown in FIG. 6A is the same electronic document (307) shown in FIG. 3H, and includes a plurality of pages (that is, four pages).

In Step 601, the user issues a request to display the electronic document (307) on the device (101-2). The electronic document (307) may be displayed, for example, inside browser software. The user then triple clicks the screen of the device (101-2). The device (101-2) detects the triple click and calls up the screen selection mode. The device (101-2) then calls up the dividing means (205) in response to the screen mode being called up. However, because the electronic document (307) includes a plurality of pages, the dividing means (215) determines that dividing the electronic document (307) is not required. Therefore, the dividing means (215) sends to the display control means (214) a message that division is not required.

In Step 602, the display control means (214) initially displays on the foremost screen the first page (371) of the electronic document (307). The display control means (214) may set a state of zero pressure (zero pressure state) as detected by the pressure sensor (212) as the point at which the first page is displayed, set a state of maximum pressure (maximum pressure state) as detected by the pressure sensor (212) as the point at which the fourth and final page is displayed, divide the numerical value of the difference between the zero pressure state and the maximum pressure state by three, and associate the second page and third page at the remaining pressure points (two spots). When the display control means (214) receives a message from the dividing means (215) indicating that division of the electronic document (307) is not required, it notifies the user of the transition to the screen selection mode. The user may be alerted to the transition to the screen selection mode, for example, by pop up information displayed on the screen. The user's operating finger (for example, the index finger of the right hand) may then be positioned over the screen.

In Step 603, the user applies pressure to the screen using an operating finger. The pressure sensor (212) detects pressure applied to the screen by the operating finger, and sends pressure information to the detecting means (213). The detecting means (213) then determines the pressure applied to the screen by the operating finger. The pressure sensor (212) may also determine the rate of acceleration of the operating finger pressing down on the screen. The display control means (214) displays one of the first through fourth pages on the screen (corresponding to data 371-374) in accordance with the applied pressure. In Step 604 shown in the drawing, when the operating finger applies pressure corresponding to the third page, the display control means (214) may display the first and second pages prior to the third page transparently above the third page (in successive order from the highest distance above the screen) so that the third page may be viewed. For example, the display control means (214) may set the transparency level of the first page to 50%, and the transparency level of the second page to 25%. The displayed content of each page may become fainter as the transparency level increases. Alternatively, the brightness level of the first page may be set to 60%, and the brightness level of the second page to 30%. The displayed content of each page may become fainter as the brightness level increases. Because the display control means (214) displays the content of the third page while making the content of the first and second pages transparent, the user may see the pages advance in response to pressure applied by the user, and the differences between the current page and the previous pages may be seen.

In Step 604, the display control means (214) currently displays the third page because the pressure applied to the screen by the operating finger corresponds to the third page. At this time, the display control means (214) may display the first and second pages prior to the third page transparently on top of the third page.

In Step 605, when a displayed page has been reached, the user may select and fix the page by sliding the operating finger held above the screen in a predetermined horizontal direction relative to the screen (for example, horizontally to the left).

In Step 606, when the detecting means (213) has detected the sliding of the operating finger in the predetermined horizontal direction, the display control means (214) displays a message that the page corresponding to the applied pressure immediately before the sliding operation (that is, the third page) has been fixed. In response to the received message, the display control means (214) may then arrange the fixed page (the third page shown in Step 605) on the foremost screen, followed by the fourth page shown in Step 605, and optionally the first page shown in Step 605 and the second page shown in Step 605. The device (101-2) then ends the screen selection mode.

By performing the operations and processing shown in Steps 601 through 606, a user may readily view a display data having a plurality of pages on the screen of the device (101-2), and may easily reach the intended page using an operating finger.

Figure 6B:
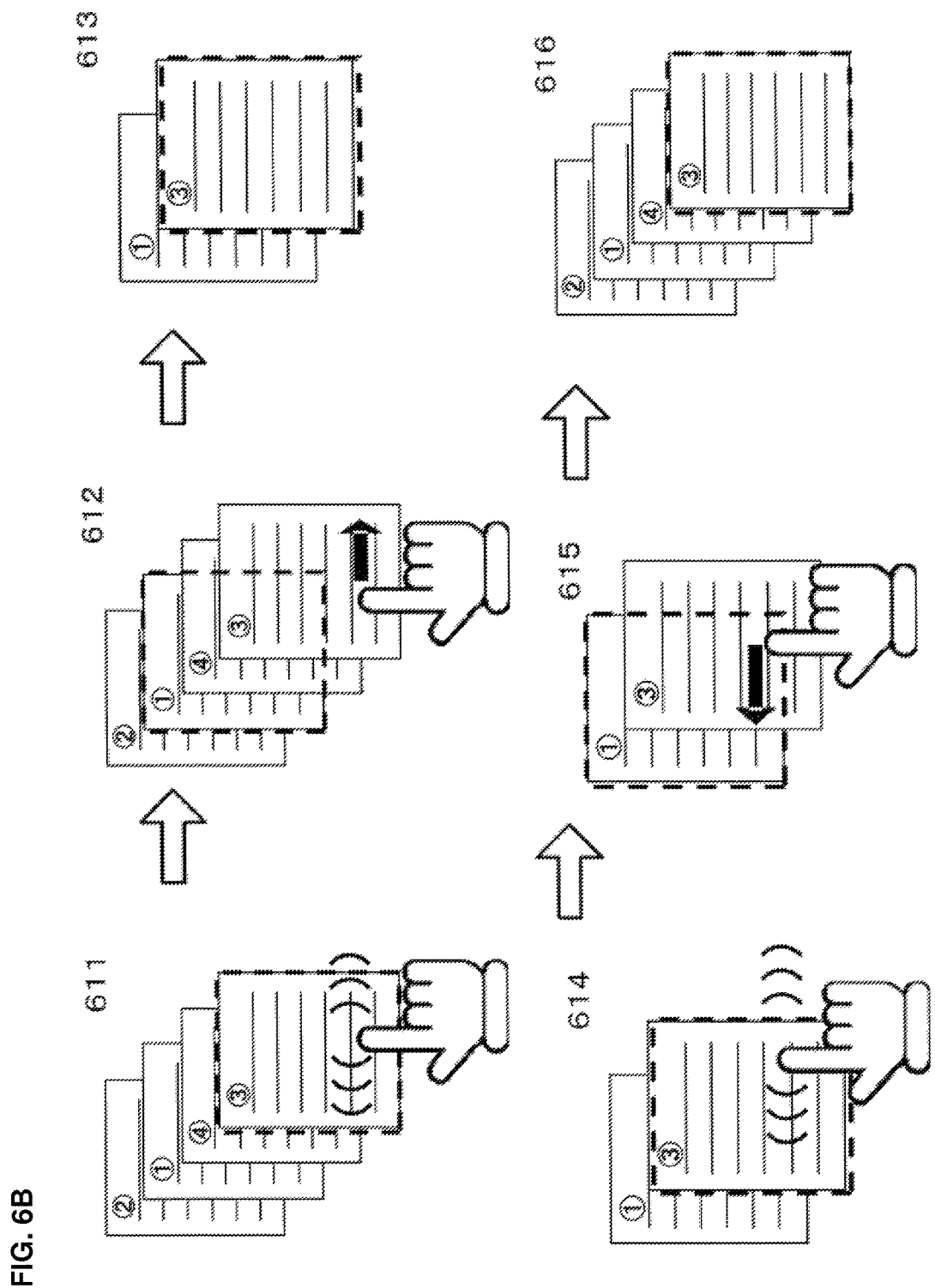
FIG. 6B shows an example in which pages are selected in a transparent state using a pressure sensor after the pages fixed in FIG. 6A have been transparently displayed in an embodiment of the present invention.

FIG. 6B shows an example in another embodiment of the present invention in which another page is selected using the pressure sensor, and the fixed page is transparently displayed in order to compare the page fixed in FIG. 6A to the other page. In Step 606 of FIG. 6A described above, the display control means (214) may arrange the fixed page (the third page shown in Step 605) on the foremost screen, followed by the fourth page shown in Step 605, and optionally the first page shown in Step 605 and the second page shown in Step 605. The following is an explanation of the method allowing for comparison of content between pages after Step 606.

In Step 611, the user may, for example, triple click the screen of the device (101-2) and slide an operating finger in a predetermined horizontal direction relative to the screen (for example, horizontally to the left) to call up the screen comparison mode. Next, the user applies pressure to the screen using an operating finger. The pressure sensor (212) detects pressure applied to the screen by the operating finger, and sends pressure information to the detecting means (213).

The detecting means (213) then determines the pressure applied to the screen by the operating finger. The pressure sensor (212) may also determine the rate of acceleration of the operating finger pressing down on the screen. The display control means (214) displays the third, the fourth and, optionally, the first and second pages on the screen (corresponding to data 373, 374, 371 and 372) in accordance with the pressure applied to the screen. In Step 612 shown in the drawing, the operating finger applies pressure corresponding to the third page. Here, the display control means (214) may display the third and fourth pages prior to the first page transparently above the first page (in successive order from the highest distance above the screen) so that the first page may be viewed. For example, the display control means (214) may set the transparency level of the third page to 50%, and the transparency level of the fourth page to 25%. Alternatively, the brightness level of the third page may be set to 60%, and the brightness level of the fourth page to 30%. Because the display control means (214) displays the content of the first page while making the content of the third and fourth pages transparent (in successive order from the highest distance above the screen), the user may see the pages advance in response to movement of the operating finger, and the differences between the current page and the previous pages may be seen.

In Step 612, the display control means (214) currently displays the first page because the pressure currently applied to the screen by the operating finger corresponds to the first page. At this time, the display control means (214) may display the third page prior to the first page transparently on top of the first page.

When the comparison page has been reached, the user may select and fix the page by sliding the operating finger held above the screen in a predetermined horizontal direction relative to the screen (for example, horizontally to the left).

In Step 613, when the detecting means (213) has detected the sliding of the operating finger in the predetermined horizontal direction, the display control means (214) displays a message that the page corresponding to the position of the operating finger immediately before the sliding operation (that is, the first page) has been fixed. The display control means (214) then arranges the fixed page (the third page shown in Step 612) on the foremost screen, followed by the comparison page (the first page shown in Step 612). At this time, the display control means (214) may display the third page prior to the first page transparently on top of the first page. Next, the user may optionally adjust the transparency level of the third page in Step 614.

In Step 614, the user applies pressure to the screen using an operating finger. The pressure sensor (212) detects pressure applied to the screen by the operating finger, and sends pressure information to the detecting means (213). The detecting means (213) then determines the pressure applied to the screen by the operating finger. The pressure sensor (212) may also determine the rate of acceleration of the operating finger pressing down on the screen. The display control means (214) changes the transparency level of the third page in accordance with the pressure applied by the operating finger to the screen. For example, the operating finger increasingly applies pressure from the pressure corresponding to the third page (zero pressure state) to the pressure corresponding to the first page. As the operating finger applies pressure approaching the pressure corresponding to the first page, the display control means (214) displays the third page more faintly. Because the display control means (214) displays the content of the first page while making the content of the third page transparent, the user may see the pages advance in response to pressure applied by the operating finger, and the differences between the current page and the previous page may be seen.

In Step 615, when the comparison of the third page to the first page has been completed, the user moves the operating finger held above the screen in a predetermined horizontal direction relative to the screen (for example, horizontally to the left). The detecting means (213) detects the sliding of the operating finger in the predetermined horizontal direction. In response, the device (101-2) ends the screen comparison mode.

When the screen comparison mode is ended in Step 616, the display control means (214) returns to the page display shown in Step 611.

In the explanation of Steps 601 through 616, the electronic document (307) is display data having a plurality of pages. In the explanation, division of the display data was not required. For examples, see electronic document (306) in FIG. 3F, electronic document (307) in FIG. 3H, electronic document (308) in FIG. 3I and electronic document (309) in FIG. 3K.

In another embodiment of the present invention, the electronic document has to be divided. For examples, see electronic document (301) in FIG. 3A, electronic document (302) in FIG. 3B, electronic document (303) in FIG. 3C and electronic document (304) in FIG. 3D. In other words, the electronic document is a single unit of display data. When the display size is greater than the size of the screen in the device (101-2), the technique explained in Step 501 and Step 502 of FIG. 5A may be used to divide the electronic document by a predetermined number. The dividing means (215) divides the electronic document, and the assigning means (216) paginates the divided data. Afterwards, the device (101-2) transitions to the screen selection mode, and the same processing described above (603-616) may be performed.

In another embodiment of the present invention, the electronic document has a plurality of pages and sections. For examples, see electronic document (308) in FIG. 3I and electronic document (309) in FIG. 3K. When the screen selection mode has been called up, the dividing means (215) extracts the initial page of each section, and the assigning means (216) paginates (or numbers) the initial pages of the extracted sections in ascending order in accordance with their original (pre-extraction) page numbers (see FIG. 3J and FIG. 3L). The display control means (214) then transitions to the screen selection mode, and the same processing described above (603-616) may be performed.

Figure 7A:
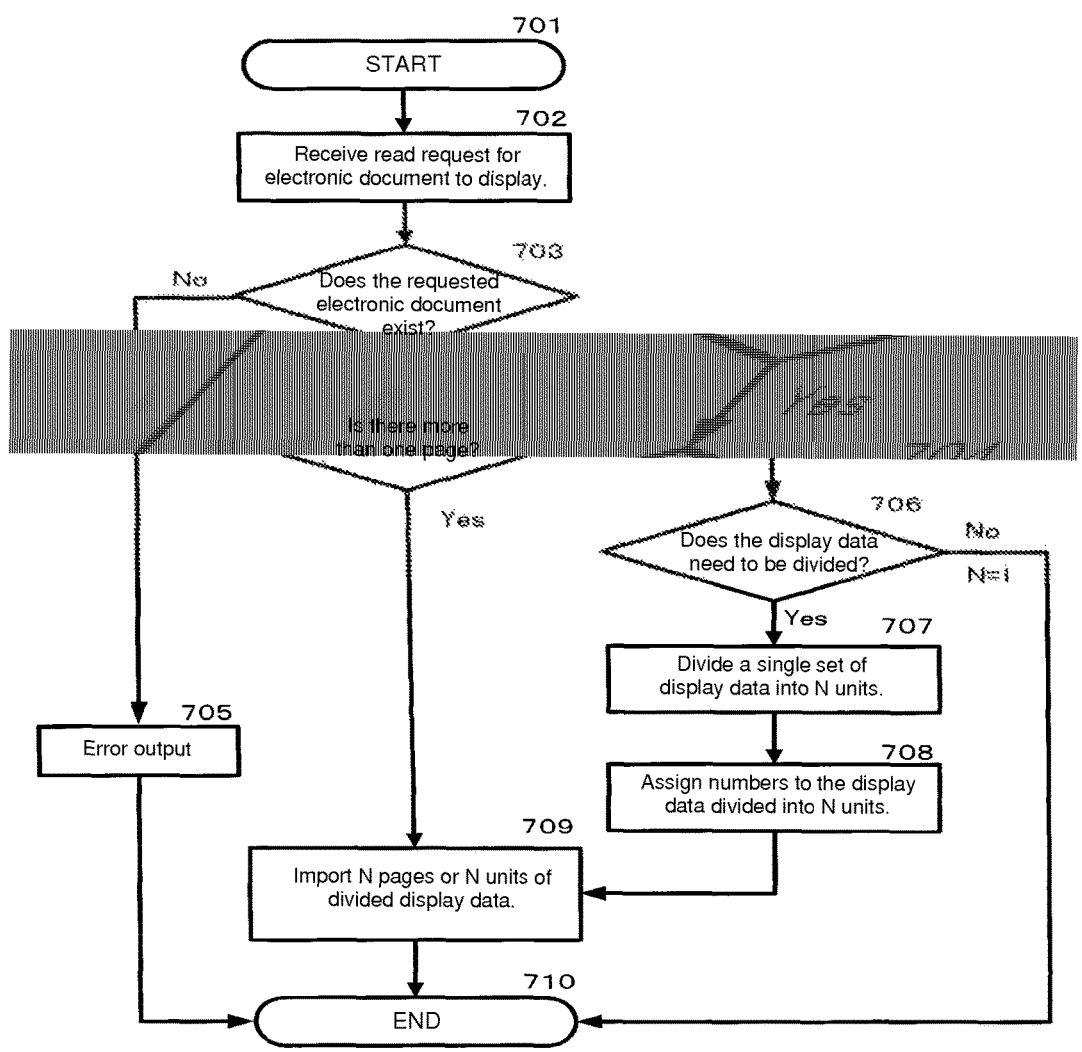
FIG. 7A is a flowchart of an embodiment of the present invention showing the process for dividing an electronic document with a single unit of display data, turning the divisions into page data, arranging the page data according to page number, and importing the page data arranged according to page number; or arranging the page data in an electronic document with a plurality of pages according to page number, and importing the arranged page data.

FIG. 7A is a flowchart of an embodiment of the present invention showing the process for dividing an electronic document with a single unit of display data, turning the divisions into page data, arranging the page data according to page number, and importing the page data arranged according to page number; or arranging the page data in an electronic document with a plurality of pages according to page number, and importing the arranged page data. In Step 701, the device (101-1, 101-2) begins the process of importing an electronic document that may be used in an embodiment of the present invention. In this process, the electronic document may be an electronic document including a single unit of display data, an electronic document in which a single unit of display data has been divided into a plurality of units and paginated (for example, the electronic documents shown in FIG. 3A through FIG. 3E), an electronic document with a plurality of pages (for example, the electronic documents shown in FIG. 3F through FIG. 3H), or an electronic document with sections in which the first page of each section has been paginated (for example, the electronic documents shown in FIG. 3I through FIG. 3L).

In Step 702, the device (101-1, 101-2) receives a read request from the user to display an electronic document on the screen. The electronic document may be automatically retrieved, for example, from, data stored in the storage means (108) of the device (101-1, 101-2), or data stored in the storage means of a computer or network storage (NAS) connected to the device (101-1, 101-2) via the communication interface (114).

In Step 703, the device (101-1, 101-2) determines whether or not the electronic document in the read request is available. When the electronic document is available, the device (101-1, 101-2) advances the process to Step 704. When the electronic document is not available, the device (101-1, 101-2) advances the process to Step 705 for error processing.

In Step 704, when the electronic document is available, the device (101-1, 101-2) hands over the process to the dividing means (205, 215). The dividing means (205, 215) determines whether or not the electronic document has more than one page. When the electronic document has more than one page, the dividing means (205, 215) advances the process to Step 709. When the electronic document does not have more than one page (that is, the electronic document only has one page), the dividing means (205, 215) advances the process to Step 706.

In Step 705, when the electronic document is not available, the device (101-1, 101-2) displays an error message on the screen of the device (101-1, 101-2) and/or generates an error tone to notify the user that the requested electronic document is unavailable.

In Step 706, the dividing means (205, 215) determines whether it is necessary to divide the single unit of data into a plurality of data units in accordance with the size of the screen in the device (101-1, 101-2). When division is necessary, the dividing means (205, 215) advances the process to Step 707. When division is unnecessary, the dividing means (205, 215) advances to Step 710 where the process is ended. When the process advances to Step 710, the dividing means (205, 215) may issue a request to the display control means (204, 214) to import the single unit of data to the memory.

In Step 707, the dividing means (205, 215) may divide the single unit of data into N units of data in response to the need for division.

In Step 708, the assigning means (206, 216) assigns fixed page numbers (pages 1-$n$, where n is an integer) to the N units of data divided in Step 707.

In Step 709, the display control means (204, 214) imports the N pages with page numbers (N) in the electronic document to the memory in sequential order. Alternatively, the display control means (204, 214) imports data assigned page numbers 1-$n$ in Step 708 to the memory in sequential order.

In Step 710, the device (101-1, 101-2) ends the process of importing the electronic document. Next, in a device (101-1) with a moving distance-detecting sensor (202), the processing shown in any one of FIG. 8A through FIG. 8D is started on the basis of a user instruction. In a device (101-2) with a pressure sensor (212) the processing shown in any one of FIG. 9A through FIG. 9D is started on the basis of a user instruction.

Figure 7B:
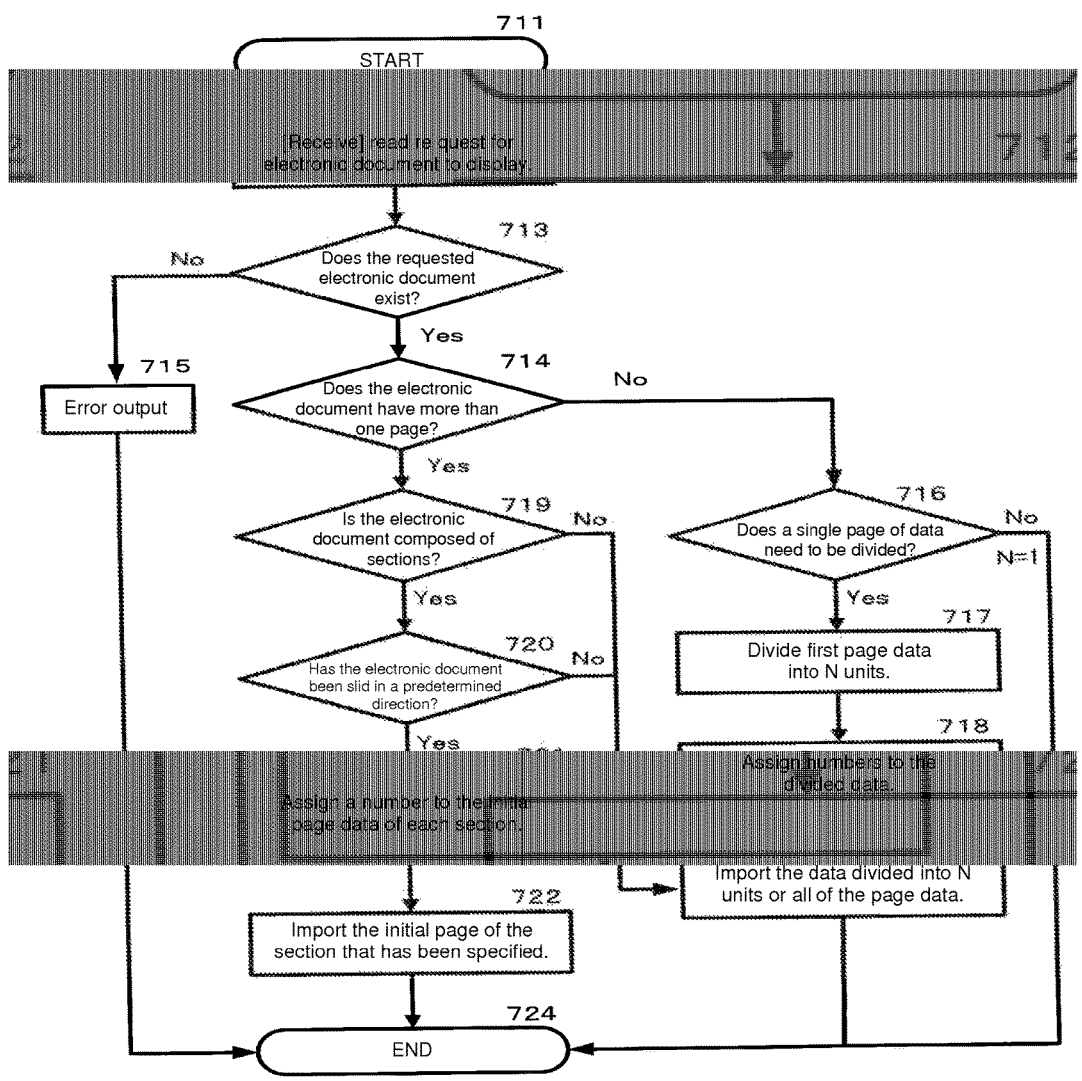
FIG. 7B is a flowchart of an embodiment of the present invention showing the process for importing the initial page data of each section in an electronic document composed of a plurality of sections.

FIG. 7B is a flowchart of an embodiment of the present invention showing the process for importing the initial page data of each section in an electronic document composed of a plurality of sections. In Step 711, the device (101-1, 101-2) starts the importing of an electronic document composed of sections which may be used in an embodiment of the present invention.

In Step 712, the device (101-1, 101-2) receives a read request from the user to display an electronic document on the screen. The electronic document may be automatically retrieved, for example, from, data stored in the storage means (108) of the device (101-1, 101-2), or data stored in the storage means of a computer or network storage (NAS) connected to the device (101-1, 101-2) via the communication interface (114).

In Step 713, the device (101-1, 101-2) determines whether or not the electronic document in the read request is available. When the electronic document is available, the device (101-1, 101-2) advances the process to Step 714. When the electronic document is not available, the device (101-1, 101-2) advances the process to Step 715 for error processing.

In Step 714, when the electronic document is available, the device (101-1, 101-2) hands over the process to the dividing means (205, 215). The dividing means (205, 215) determines whether or not the electronic document has more than one page. When the electronic document has more than one page, the dividing means (205, 215) advances the process to Step 719. When the electronic document does not have more than one page (that is, the electronic document only has one page), the dividing means (205, 215) advances the process to Step 716.

In Step 715, when the electronic document is not available, the device (101-1, 101-2) displays an error message on the screen of the device (101-1, 101-2) and/or generates an error tone to notify the user that the requested electronic document is unavailable.

In Step 716, the dividing means (205, 215) determines whether it is necessary to divide the single unit of data into a plurality of data units in accordance with the size of the screen in the device (101-1, 101-2). When division is necessary, the dividing means (205, 215) advances the process to Step 717. When division is unnecessary, the dividing means (205, 215) advances to Step 724 where the process is ended. When the process advances to Step 724, the dividing means (205, 215) may issue a request to the display control means (204, 214) to import the single unit of data to the memory.

In Step 717, the dividing means (205, 215) may divide the single unit of data into N units of data in response to the need for division.

In Step 718, the assigning means (206, 216) assigns fixed page numbers (pages 1-$n$) to the N units of data divided in Step 717.

In Step 723, the display control means (204, 214) imports data assigned page numbers 1-$n$ in Step 718 to the memory (103) in sequential order.

In Step 719, when there is more than one page in the electronic document, the display control means (204, 214) determines whether or not the electronic document is composed of sections. When the electronic document is composed of sections, the display control means (204, 214) advances the process to Step 720. When the electronic document is not composed of sections, the display control means (204, 214) advances the process to Step 723. In Step 723, when it has been determined in Step 719 that the electronic document is not composed of sections, the display control means (204, 214) imports all of the pages of the electronic document to the memory (103) in sequential order.

In Step 720, the detecting means (203, 213) determines whether or not the operating finger of the user has been slid in a predetermined direction. When the operating finger of the user has been slid in a predetermined direction, the detecting means (203, 213) advances the process to Step 721. When the operating finger of the user has not been slid in a predetermined direction, the detecting means (203, 213) advances the process to Step 723. The operation performed when the finger is not slid in a predetermined direction may also be performed when an instruction has not been received from the operating finger of the user after a predetermined period of time. Alternatively, the detecting means (203, 213) may display a message on the screen indicating that the finger has not been slid in a predetermined direction, or a message that all of the pages of the electronic document will be displayed.

In Step 721, the assigning means (206, 216) extracts the initial page data for each section from the electronic document, and assigns a fixed page number (pages 1-$n$) to the extracted initial page data. The assigning means (206, 216) creates a table, associates the fixed pages numbers with the original page numbers of the extracted initial page data, and registers the associations in the table, and stores the table in the memory (103). The page number assignment in Step 721 is optional. The extracted initial page data may be used with the original page numbers.

In Step 722, the display control means (204, 214), the initial page data assigned page numbers 1-$n$ in Step 721 is imported in sequential order to the memory (103). Alternatively, the display control means (204, 214) may import all of the extracted initial page data to the memory (103) in sequential order when fixed page numbers (pages 1-$n$) have not been assigned by the assigning means (206, 216) in Step 721.

When it has been determined in Step 720 that the operating finger of the user has not been slid in a predetermined direction, the display control means (204, 214) in Step 723 imports all of the pages of the electronic document to the memory (103) in successive order.

In Step 724, the device (101-1, 101-2) ends the process of importing an electronic document composed of sections. A device (101-1) with a moving distance-detecting sensor (202) then starts any one of the flowcharts in FIG. 8A through FIG. 8D in response to a user instruction. A device (101-2) with a pressure sensor (212) then starts any one of the flowcharts in FIG. 9A through FIG. 9D in response to a user instruction.

Figure 8A:
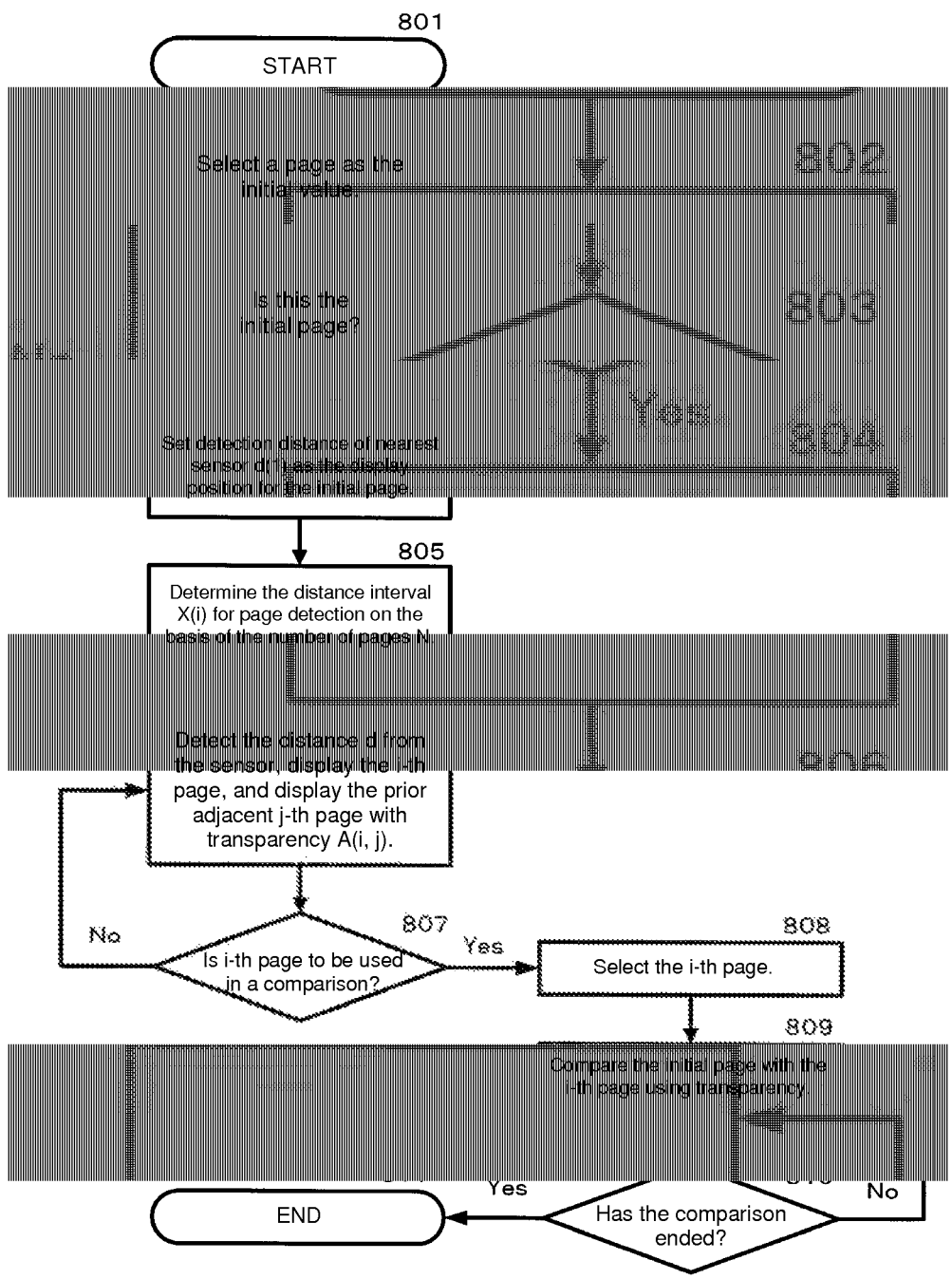
FIG. 8A is a flowchart of an embodiment of the present invention showing a process for comparing a page fixed using the moving distance-detecting sensor to a bookmarked page in a transparent state.

FIG. 8A is a flowchart of an embodiment of the present invention showing a process for comparing a page fixed using the moving distance-detecting sensor (202) to a bookmarked page in a transparent state. In Step 801, the device (101-1) starts the process of comparing a fixed page of the electronic document to a bookmarked page in a transparent state. In this process, the electronic document may be an electronic document in which a single unit of display data has been divided and paginated (for example, an electronic document shown in FIG. 3A through FIG. 3E), an electronic document with a plurality of pages (for example, an electronic document shown in FIG. 3F through FIG. 3H), or an electronic document composed of sections in which the initial page of each section has been paginated (for example, an electronic document shown in FIG. 3I through FIG. 3L). In this flowchart, the number of pages in the electronic document is N pages (where N is an integer greater than one).

In Step 802, the device (101-1) allows the user to select the page with the initial value. The page with the initial value may be selected and fixed by the user. As the user's operating finger approaches the screen, the sensor (202) detects movement of the operating finger, and information on the movement of the operating finger is sent to the detecting means (203). The detecting means (203) determines the distance d from the operating finger to the screen. The display control means (204) of the device (101-1) displays the page corresponding to distance d in response to distance d between the operating finger and the screen. In order for the user to select and fix this page, the operating finger held over the screen is slid, for example, in a predetermined horizontal direction relative to the screen (for example, horizontally to the left).

In Step 803, when the detecting means (203) detects the sliding of an operating finger in the predetermined horizontal direction, a request is issued to the display control means (204) to confirm whether the page corresponding to the distance d between the operating finger and the screen prior to the horizontal sliding movement is to be set as the initial page. When the user has entered confirmation that the page corresponding to distance d between the operating finger and the screen is to be the initial page, the display control means (204) advances the process to Step 804. When the user has not entered confirmation that the page corresponding to distance d between the operating finger and the screen is to be the initial page, the display control means (204) returns the process to Step 802 to allow the user to again select the page with the initial value. Step 803 is included so that the user does not make any entry mistakes in Step 802. An entry mistake may occur when the user does not make a smooth movement with the operating finger and another page is displayed on the screen.

In Step 804, when the user has entered confirmation that the page corresponding to distance d between the operating finger and the screen is to be the initial page, the detecting means (203) fixes the farthest detectable distance d(1) within the detection range of the sensor (202) as the display position for the initial page (see Step 504 in FIG. 5A).

In Step 805, the detecting means (203) determines the distance interval x(i) for detecting pages with the operating finger so that N pages in the electronic document may be associated at these distance intervals between the detection distance d(1) and the screen (that is, the point at which the screen is touched). The detecting means (203) may divide the detection distance d(1) so that the number of pages N corresponds to the number of intervals x(i) between the detection distance d(1) and the screen, and may set the detection distance d(1) for page association so that the page turning speed decelerates as an operating finger moves towards the mid-point between the detection distance d(1) and the screen and then accelerates as the operating finger moves from the mid-point to the screen.

In Step 806, the detecting means (203) detects the distance d from the user's operating finger to the screen via the sensor (202). The display control means (204) then displays the i-th page corresponding to distance d on the screen. Also, the display control means (204) transparently displays the j-th page between the initial page and the i-th page (where j is an integer equal to or greater than 1) on top of the i-th page. The display control means (204) may determine the level of transparency A(i, j) based on the distance d between the user's operating finger and the screen (see Step 515 in FIG. 5B).

In Step 807, the display control means (204) allows the user to determine whether or not the i-th page data is to be selected as a comparison page. The display control means (204) may, for example, display a pop up window that allows the user to select or not select the page by clicking a button. When the user has indicated that the i-th page has been selected as a comparison page, the display control means (204) advances the process to Step 808. When the user has indicated that the i-th page is not to be selected as a comparison page, the display control means (204) returns the process to Step 806. In Step 806, the process stands by to select a new i-th page based on movement of the user's operating finger. It returns to Step 806 until an i-th page has been selected as a comparison page.

In Step 808, the display control means (204) selects as the i-th page as the comparison page in response to an instruction from the user selecting the i-th page as the comparison page.

In Step 809, the display control means (204) transparently displays the initial page on top of the i-th page so that the initial page fixed in Step 804 may be compared to the i-th page selected in Step 808. The user may compare the content of the initial page to the content of the i-th page because the i-th page is visible from above via the transparent initial page.

In Step 810, the user ends the comparison by sliding an operating finger held above the screen in a predetermined horizontal direction relative to the screen (for example, horizontally to the left). The detecting means (203) detects the sliding of an operating finger in the predetermined horizontal direction. The device (101-1) then ends the comparison in response to detection of an operating finger sliding in the predetermined horizontal direction.

Figure 8B:
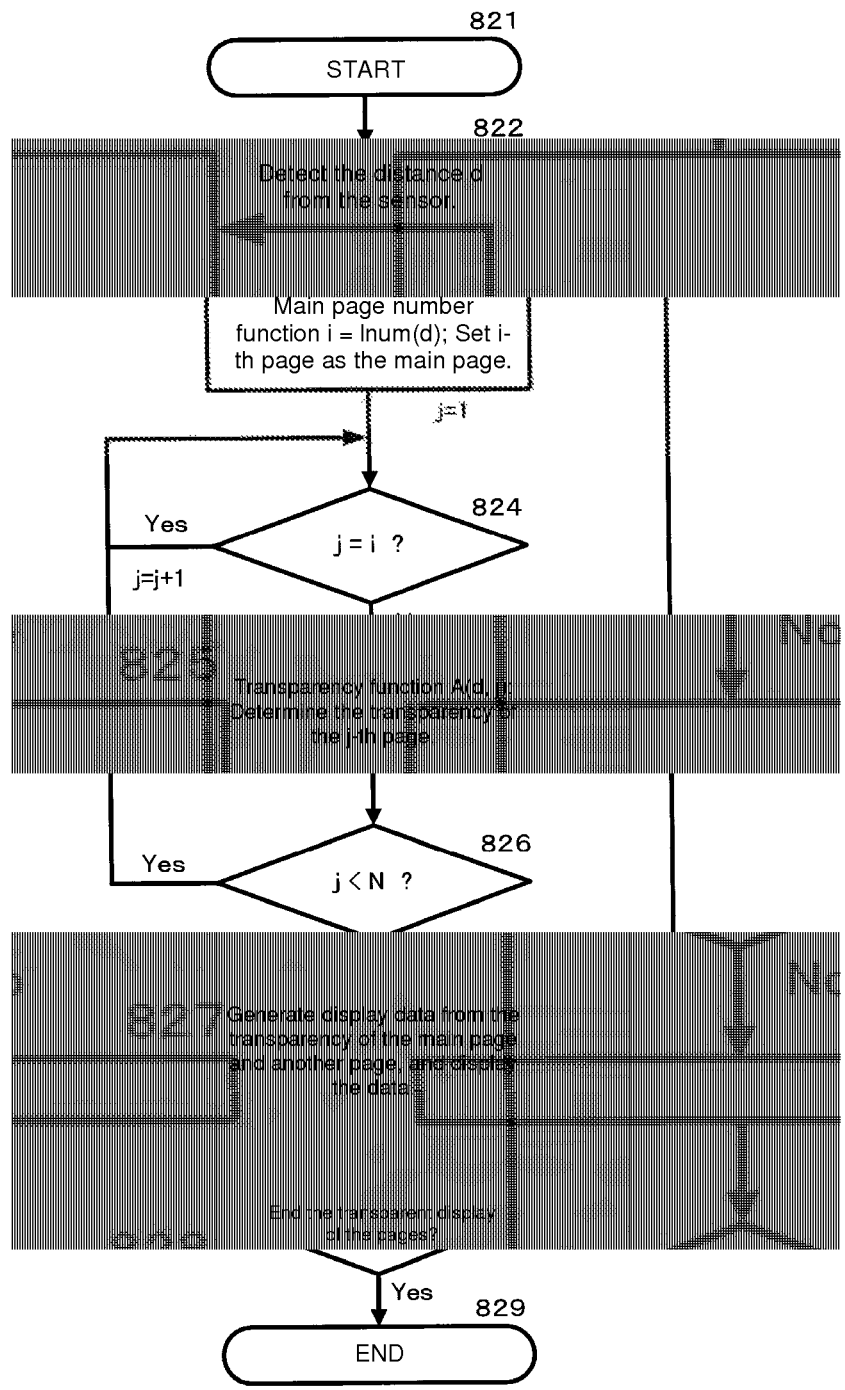
FIG. 8B is a flowchart of an embodiment of the present invention used to explain in detail the transparent display in the flowchart shown in FIG. 8A.

FIG. 8B is a flowchart used to explain in detail the transparent display in the flowchart indicated in Step 806 and Step 809 of FIG. 8A. In Step 821, the device (101-1) starts the process for transparent display of pages in the electronic document (screen comparison mode). In the process for transparent display of pages, the display control means (204) calculates the level of transparency $A(n, j)$ for all of the pages (1, 2, 3, . . . , j, j+1, . . . , N−1, N) when an operating finger has been used to select the i-th page of the electronic document. Finally, the pages are displayed on the screen based on these levels of transparency. The i-th page selected with an operating finger is referred to as the main page. In the flowchart shown in FIG. 8B, the main page is the page indicated as the main page by an operating finger at a certain time. In this flowchart, the j-th page is a page in front of the i-th page (that is, in the positive direction along an axis passing through the screen from behind according to the so-called right-handed coordinates). In Step 826 below, the display control means (204) also calculates the degree of transparency for all pages behind the i-th image (in the negative direction according to the right-handed coordinates). However, for any j-th page behind the i-th page here, the transparency level is set to 0% (that is, non-transparent). Because the i-th page is not transparent, no page behind the i-th page may be viewed transparently.

In Step 822, the user moves an operating finger towards the screen to select the main page for transparent display. The sensor (202) detects movement of an operating finger, and sends operating finger movement information to the detecting means (203). The detecting means (203) determines the distance d between the operating finger and the screen. Distance d in Step 822 corresponds to distance d in Step 806 of FIG. 8A.

In Step 823, the display control means (204) sets as the main page the i-th page corresponding to the distance d between the operating finger and the screen just before the operating finger is slid horizontally. The main page number function is expressed as $i=1\text{num}(d)$. Here, (d) is the detection distance from the screen. The process in Step 823 corresponds to the distance d detected by the sensor in Step 806 of the flowchart in FIG. 8A, and the main page number function is used in the processing for Step 806 for display of the i-th page.

In Step 824, the display control means (204) determines whether or not page number j for the j-th page in the electronic document is the same as page number i for the i-th page. Here, j is the page number of a page whose transparency level is to be determined. The display control means (204) performs the processing shown in FIG. 8B on all pages to be displayed on the screen (where j=1-N). When j does not equal 1 (that is, when page number j is not the same as page number i), the display control means (204) advances the process to Step 825. When j equals 1 (that is, when page number j is the same as page number i), the display control means (204) returns the process to Step 824. This is because the processing in Step 825 below is not required when page number j is the same as page number i. The display control means (204) introduces the value j+1 to j to sequentially increase j (that is, increase the page number). In this way, the display control means (204) performs transparency processing on all of the pages to be displayed on the screen (where j=1-N).

In Step 825, when page number j is not the same as page number i, the display control means (204) determines the transparency level of the j-th page. The transparency function is expressed by $A(d, j)$. Here, (d) is the detection distance from the screen. This transparency function $A(d, j)$ is the same as the level of transparency $A(i, j)$ indicated in Step 806 of FIG. 8A, and the transparency function $A(d, j)$ determined in Step 825 may be used in Step 806.

In Step 826, the display control means (204) determines whether the page number j is smaller than the total number of pages N in the electronic document. When j is not less than N, the display control means (204) advances the process to Step 827. When j is less than N, the display control means (204) returns the process to Step 824. When j is equal to N, the transparency level is set to 0%. The processing in Step 826 essentially may be performed in any step. Because the transparency level of the i-th page is 0%, any page j between the i-th page and the Nth page (i≤j<N) is usually not displayed. However, the transparency level may still be set for all pages. In this situation, the level of transparency $A(d, j)$ is set to 0%. When j=N, the transparency level of the j-th page is 0%.

In Step 827, the display control means (204) displays the i-th page, which is the main page, at a transparency level of 0%, and displays the transparently processed j-th page on top of the i-th page.

In Step 828, the display control means (204) determines whether or not there is an instruction to end the transparent display of pages.

In Step 829, when there is an instruction to end the transparent display of pages (see Step 516 in FIG. 5B), the device (101-1) ends the transparent display of pages from the electronic document (screen comparison mode).

Figure 8C:
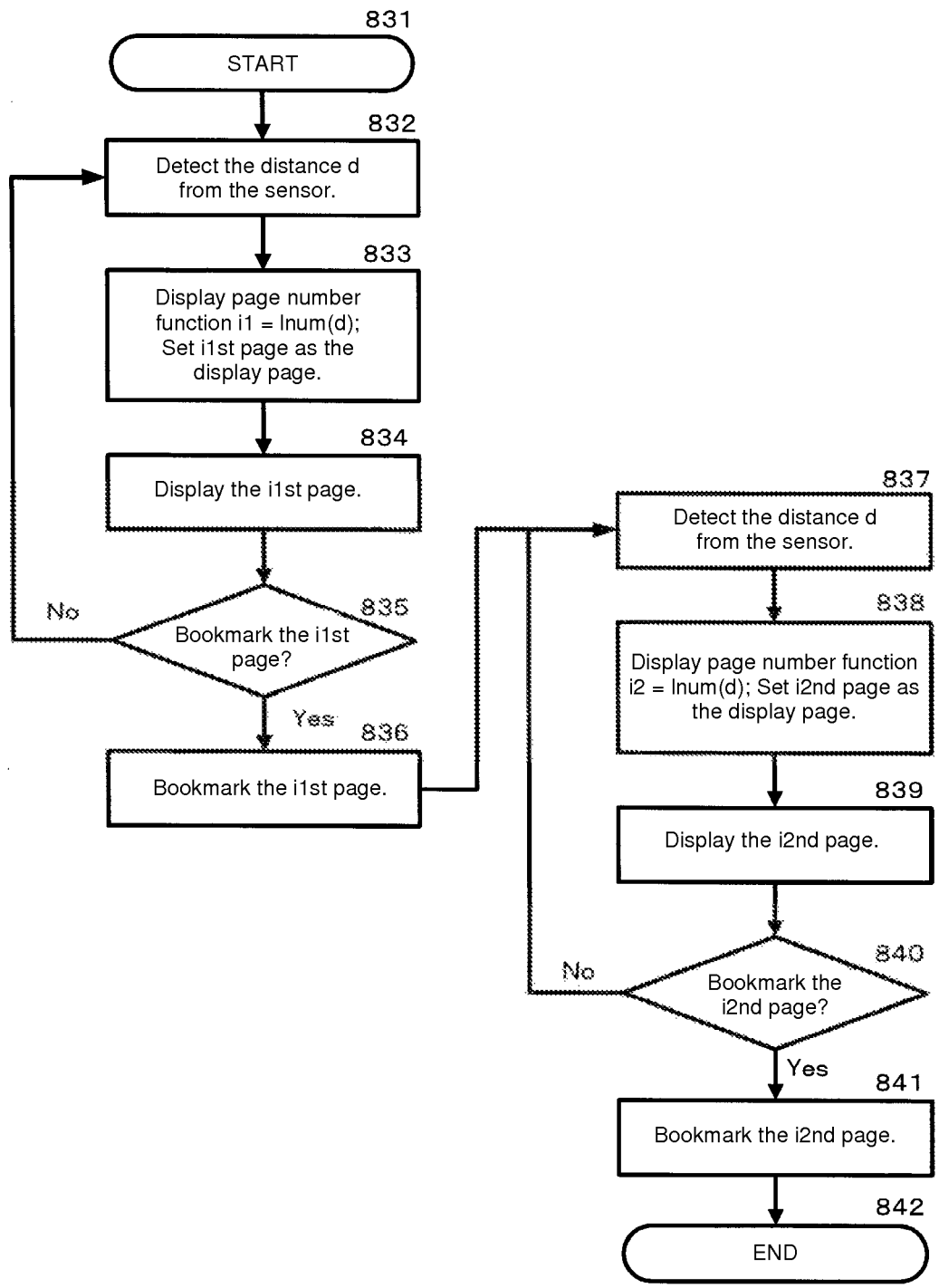
FIG. 8C is a flowchart of an embodiment of the present invention that may be used in the flowchart in FIG. 8A showing a process in which two pages are bookmarked using the moving distance-detecting sensor.

FIG. 8C is a flowchart of the process for bookmarking two pages which may be executed in Step 806 of the flowchart shown in FIG. 8A. In Step 831, the device (101-1) starts the process for bookmarking pages in the electronic document.

In Step 832, the user's operating finger approaches the screen in order to select the first page (i=i1) to be bookmarked. The sensor (202) detects movement of an operating finger, and operating finger movement information is sent to the detecting means (203). The detecting means (203) determines the distance d between the operating finger and the screen. The process in Step 832 corresponds to the detection of distance d by the sensor in Step 806 shown in FIG. 8A.

In Step 833, the display control means (204) determines the page number in the electronic document that corresponds to distance d between the operating finger and the screen. In other words, the display control means (204) determines the page number corresponding to distance d is page number i1. The display page number function is expressed by i1=1num(d). Here, (d) is the detection distance from the screen.

In Step 834, the display control means (204) displays the i1-th page determined in Step 833 on the screen. The process in Step 834 corresponds to the display of the i-th page in Step 806 shown in FIG. 8A. Here, i=i1.

In Step 835, the display control means (204) receives a decision from the user whether or not the i1-th page is to be bookmarked. When the user decides to bookmark the i1-th page, the user, for example, slides an operating finger horizontally in a predetermined direction. When the user decides not to bookmark the i1-th page, the user, for example, slides an operating finger horizontally in the direction opposite that of the predetermined direction. When the i1-th page has been bookmarked, the display control means (204) advances the process to Step 836. When the i1-th page is not to be bookmarked, the display control means (204) returns the process to Step 832, movement of the user's operating finger is detected, and Steps 832 through 835 are repeated.

In Step 836, when an instruction to bookmark the i1-th page is received, the display control means (204) bookmarks the i1-th page. The display control means (204) may place an icon (such as a bookmark), a mark or a symbol on the bookmarked page (for example, in the upper right-hand corner) to indicate that the page has been bookmarked. The display control means (204) writes information on the bookmarked page (for example, the page number) in, for example, a table. This table may be referenced when bookmarked pages are to be displayed transparently. The display control means (204) then advances the process to Step 837 in order to bookmark another page.

In Step 837, the user's operating finger approaches the screen in order to select the second page (i=i2) to be bookmarked. The sensor (202) detects movement of an operating finger, and operating finger movement information is sent to the detecting means (203). The detecting means (203) determines the distance d between the operating finger and the screen. The process in Step 837 corresponds to the detection of distance d by the sensor in Step 806 shown in FIG. 8A.

In Step 838, the display control means (204) determines the page number in the electronic document that corresponds to distance d between the operating finger and the screen. In other words, the display control means (204) determines the page number corresponding to distance d is page number i2. The display page number function is expressed by i2=1num(d). Here, (d) is the detection distance from the screen.

In Step 839, the display control means (204) displays the i2-th page determined in Step 838 on the screen. The process in Step 839 corresponds to the display of the i-th page in Step 806 shown in FIG. 8A. Here, i=i2.

In Step 840, the display control means (204) receives a decision from the user whether or not the i2-th page is to be bookmarked. When the user decides to bookmark the i2-th page, the user, for example, slides an operating finger horizontally in a predetermined direction. When the user decides not to bookmark the i2-th page, the user, for example, slides an operating finger horizontally in the direction opposite that of the predetermined direction. The i2-th page is not bookmarked when i2=i1. When the i2-th page has been bookmarked, the display control means (204) advances the process to Step 841. When the i2-th page is not to be bookmarked, the display control means (204) returns the process to Step 837, movement of the user's operating finger is detected, and Steps 837 through 840 are repeated.

In Step 841, when an instruction to bookmark the i2-th page is received, the display control means (204) bookmarks the i2-th page. As in Step 836, the display control means (204) may place a mark on the bookmarked page to indicate that the page has been bookmarked.

In Step 842, the device (101-1) ends the process of bookmarking pages in the electronic document when the two pages shown in Step 836 and Step 841 have been bookmarked.

In Step 834, the processing for transparent display shown in FIG. 8B may be applied to transparently display the pages in front of the i1-th page. Similarly, in Step 839, the processing for transparent display shown in FIG. 8B may be applied to transparently display the pages in front of the i2-th page.

In the flowchart shown in FIG. 8C, two pages were bookmarked. These two bookmarked pages may be displayed so that the i1-th page bookmarked first is displayed on the screen farthest from the i2-th page bookmarked next.

By repeating Steps 832 through 836 shown in FIG. 8C, this flowchart may be used even when the number of pages in the electronic document is N (where N is an integer). When the number of pages in the electronic document is N, Steps 832 through Step 835 may be repeated until i equals N in Step 835. Here, a step may be added after Step 836 to determine whether the bookmarking process has been completed.

Figure 8D:
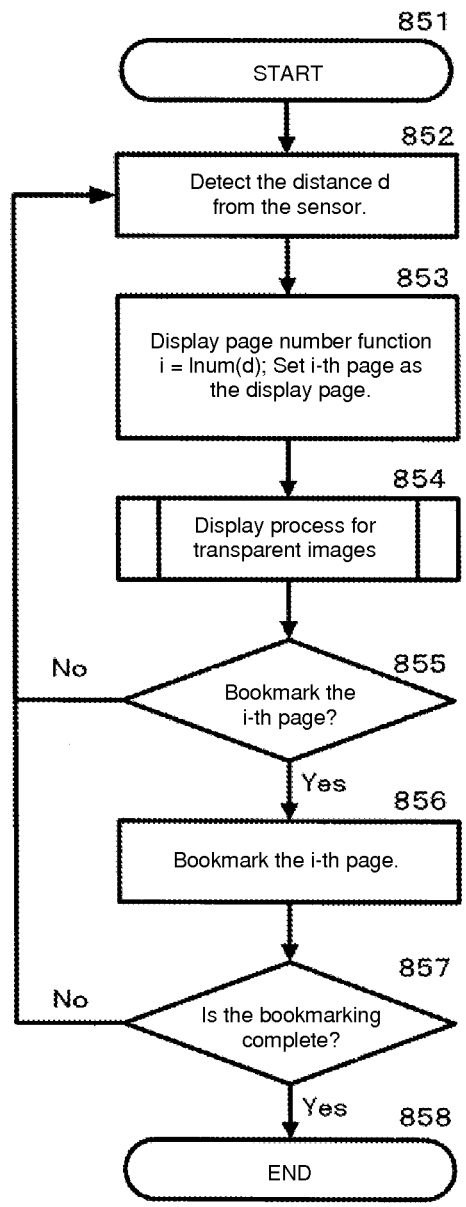
FIG. 8D is a flowchart of an embodiment of the present invention that may be used in the flowchart in FIG. 8A showing a process in which n pages are bookmarked using the moving distance-detecting sensor.

FIG. 8D is a flowchart of the process for bookmarking n pages (where n is an integer equal to or greater than 2) which may be executed in Step 806 of the flowchart shown in FIG. 8A. In Step 851, the device (101-1) starts the process for bookmarking pages in the electronic document. This process is performed in Step 806 of the flowchart shown in FIG. 8A.

In Step 852, the user's operating finger approaches the screen in order to select the first page to be bookmarked. The sensor (202) detects movement of an operating finger, and operating finger movement information is sent to the detecting means (203). The detecting means (203) determines the distance d between the operating finger and the screen. The process in Step 852 corresponds to the detection of distance d by the sensor in Step 806 of the flowchart shown in FIG. 8A.

In Step 853, the display control means (204) determines the page number in the electronic document that corresponds to distance d between the operating finger and the screen. In other words, the display control means (204) determines the page number corresponding to distance d is page number i. The display page number function is expressed by i=1num(d). Here, (d) is the detection distance from the screen. The process in Step 853 corresponds to the detection of distance d by the sensor in Step 806 of the flowchart shown in FIG. 8A.

In Step 854, the transparent image display processing shown in FIG. 8B is performed. For more details, refer to the explanation of each step in FIG. 8B. The i-th page shown in FIG. 853 corresponds to the main page shown in Step 823 of FIG. 8B.

In Step 855, the display control means (204) receives a decision from the user whether or not the i-th page is to be bookmarked. When the user decides to bookmark the i-th page, the user, for example, slides an operating finger horizontally in a predetermined direction. When the user decides not to bookmark the i-th page, the user, for example, slides an operating finger horizontally in the direction opposite that of the predetermined direction. When the i-th page has been bookmarked, the display control means (204) advances the process to Step 856. When the i-th page is not to be bookmarked, the display control means (204) returns the process to Step 852, movement of the user's operating finger is detected, and Steps 852 through 855 are repeated.

In Step 856, when an instruction to bookmark the i-th page is received, the display control means (204) bookmarks the i-th page. The display control means (204) may place an icon (such as a bookmark), a mark or a symbol on the bookmarked page (for example, in the upper right-hand corner) to indicate that the page has been bookmarked. The display control means (204) writes information on the bookmarked page (for example, the page number) in, for example, a table. This table may be referenced when bookmarked pages are to be displayed transparently.

When the bookmarking shown in Step 856 has been completed, the process waits for a decision from the user in Step 857 as to whether the bookmarking is complete. When the user has completed the bookmarking process, an operating finger is slid, for example, horizontally in a predetermined direction, or the screen is double- or triple-clicked. Alternatively, the display control means (204) may display a pop up window on the screen when the bookmarking shown in Step 856 has been completed so the user may select to continue or end the bookmarking process. When the bookmarking process has not been completed, the display control means (204) returns the process to Step 852. When a completion operation has not been received from the user after a predetermined amount of time, the display control means (204) may determine that the bookmarking operation has not been completed. The display control means (204) repeats Steps 852 through 856, and the page bookmarking process is repeated until the bookmarking process has been completed for a plurality of pages.

In Step 858, the device (101-1) ends the process for bookmarking pages of the electronic document when bookmarking has been completed.

Figure 8E:
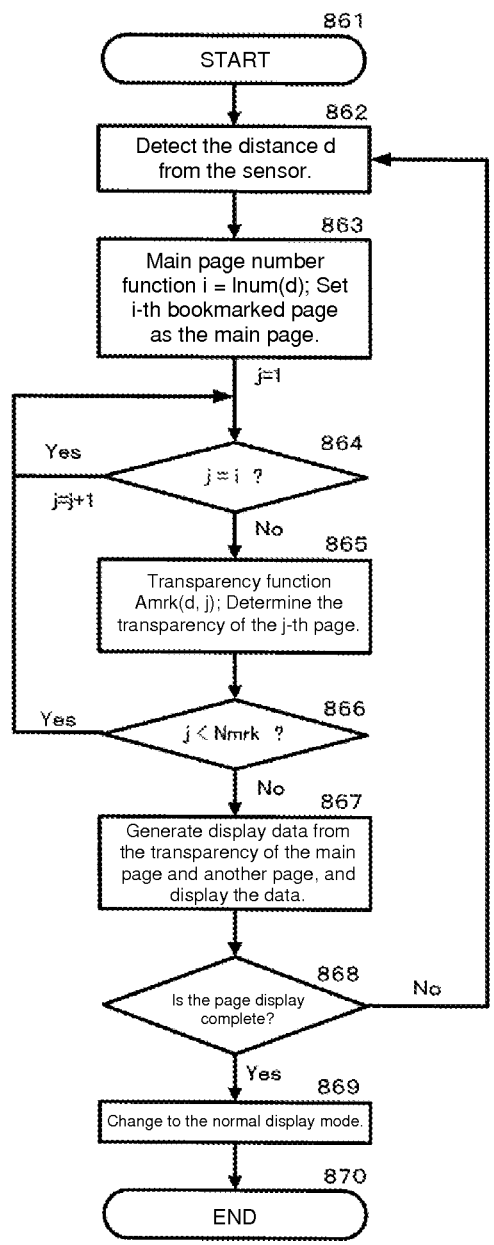
FIG. 8E is a flowchart showing the process for displaying in a transparent state pages that were bookmarked in the flowchart shown in FIG. 8C or FIG. 8D.

FIG. 8E is a flowchart showing the process for displaying in a transparent state pages that were bookmarked in the flowchart shown in FIG. 8C or FIG. 8D. In Step 861, the device (101-1) starts the process of comparison using the transparent state. More specifically, the process may be started when the bookmarking process shown in FIG. 8C or the bookmarking process shown in FIG. 8D has been completed. The electronic documents used in FIG. 8E include only bookmarked documents obtained in the flowcharts shown in FIG. 8C and FIG. 8D. Alternatively, it may be arranged so that electronic documents used in FIG. 8E may only be selected from among those bookmarked in the flowcharts shown in FIG. 8C and FIG. 8D.

In Step 862, the operating finger of the user approaches the screen. The sensor (202) detects movement of an operating finger, and operating finger movement information is sent to the detecting means (203). The detecting means (203) determines the distance d from the operating finger to the screen. The detecting means (203) then sends the determined distance d to the display control means (204).

In Step 863, the display control means (204) determines the page number of the bookmarked page corresponding to the distance d between the operating finger and the screen. In other words, the display control means (204) determines that the bookmarked page corresponding to distance d is the i-th page. The display page number function is expressed as i=1num(d). Here, (d) is the detection distance from the screen. When the determined distance d has been received, the display control means (204) performs internally the processing performed by the display control means (204) shown in Step 864 through Step 867.

In Step 864, the display control means (204) determines whether or not page number j for the j-th page in the electronic document is the same as page number i for the i-th page. Here, j is the page number of a page whose transparency level is to be determined. The display control means (204) performs the processing shown in FIG. 8E on all pages to be displayed on the screen (where j=1-N). When j does not equal 1 (that is, when page number j is not the same as page number i), the display control means (204) advances the process to Step 865. When j equals 1 (that is, when page number j is the same as page number i), the display control means (204) returns the process to Step 864. This is because the processing in Step 865 below is not required when page number j is the same as page number i. The display control means (204) introduces the value j+1 to j to sequentially increase j (that is, increase the page number). In this way, the display control means (204) performs transparency processing on all of the pages to be displayed on the screen (where j=1-N).

In Step 865, when page number j is not the same as page number i, the display control means (204) determines the transparency level of the j-th page. The transparency function is expressed by Amrk(d, j). This transparency function Amrk(d, j) is the same as the level of transparency Amrk(i, j) indicated in Step 806 of FIG. 8A, and the transparency function Amrk(d, j) determined in Step 865 may be used in Step 806.

In Step 866, the display control means (204) determines whether page number j is smaller than the total number of pages N bookmarked in FIG. 8C or FIG. 8D (that is, N equals the number of bookmarks). When j is not less than Nmrk (where Nmrk is the number of bookmarks), the display control means (204) advances the process to Step 867. When j is less than Nmrk, the display control means (204) returns the process to Step 864. When j is equal to Nmrk, the transparency level is set to 0%. The processing in Step 866 essentially may be performed in any step. Because the transparency level of the i-th page is 0%, any page j between the i-th page and the Nth page (i≤j<N) is usually not displayed. However, the transparency level may still be set for all pages. In this situation, the level of transparency Amrk(d, j) is set to 0%. When j=Nmrk, the transparency level of the j-th page is 0%.

In Step 867, the display control means (204) displays the i-th page, which is the main page, at a transparency level of 0%, and displays the transparently processed j-th page on top of the i-th page.

In Step 868, the display control means (204) determines whether or not there is an instruction to end the transparent display of pages.

In Step 869, when there is an instruction to end the transparent display of pages (see Step 516 in FIG. 5B), the display control means (204) ends the transparent display of pages from the electronic document (screen comparison mode) and returns to the normal display mode (that is, the display mode prior to the screen comparison mode).

In Step 870, when the screen has changed to the normal display mode, the device (101-1) ends the process of comparison using the transparent state.

Figure 9A:
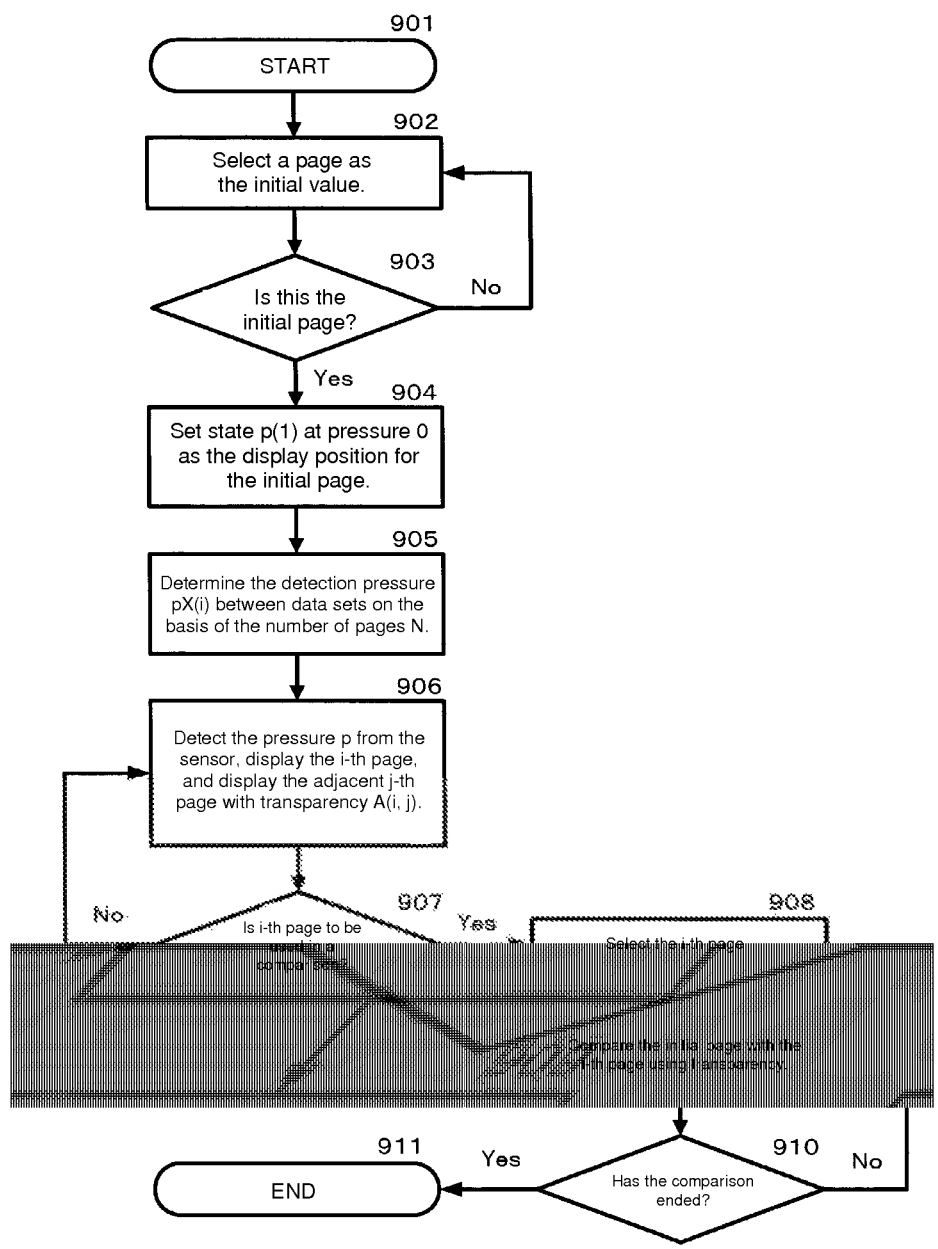
FIG. 9A is a flowchart of an embodiment of the present invention showing a process for comparing a page fixed using the pressure sensor to a bookmarked page in a transparent state.

FIG. 9A is a flowchart of an embodiment of the present invention showing a process for comparing a page fixed using the pressure sensor (212) to a bookmarked page in a transparent state. In Step 901, the device (101-2) starts the process of comparing a fixed page of the electronic document to a bookmarked page in a transparent state. In this process, the electronic document may be an electronic document in which a single unit of display data has been divided and paginated (for example, an electronic document shown in FIG. 3A through FIG. 3E), an electronic document with a plurality of pages (for example, an electronic document shown in FIG. 3F through FIG. 3H), or an electronic document composed of sections in which the initial page of each section has been paginated (for example, an electronic document shown in FIG. 3I through FIG. 3L). In this flowchart, the number of pages in the electronic document is N pages (where N is an integer greater than one).

In Step 902, the device (101-2) allows the user to select the page with the initial value. The page with the initial value may be selected and fixed by the user. As the user's operating finger approaches the screen, the pressure sensor (212) detects pressure p applied to the screen by the operating finger, and pressure p information is sent to the detecting means (213). The detecting means (213) determines the amount of pressure p applied by the operating finger to the screen. The display control means (214) of the device (101-2) displays the page corresponding to the amount of pressure p. In order for the user to select and fix this page, the operating finger held over the screen is slid, for example, in a predetermined horizontal direction relative to the screen (for example, horizontally to the left).

In Step 903, when the detecting means (213) detects the sliding of an operating finger in the predetermined horizontal direction, a request is issued to the display control means (214) to confirm whether the page corresponding to the amount of pressure p prior to the horizontal sliding movement is to be set as the initial page. When the user has entered confirmation that the page corresponding to the amount of pressure p is to be the initial page, the display control means (214) advances the process to Step 904. When the user has not entered confirmation that the page corresponding to the amount of pressure p is to be the initial page, the display control means (214) returns the process to Step 902 to allow the user to again select the page with the initial value. Step 903 is included so that the user does not make any entry mistakes in Step 902. An entry mistake may occur when the user does not make a smooth movement with the operating finger and another page is displayed on the screen.

In Step 904, when the user has entered confirmation that the page corresponding to the amount of pressure p is to be the initial page, the detecting means (213) fixes the state at which the pressure sensor (212) detects zero pressure (the zero pressure state) p(1) as the display position for the initial page.

In Step 905, the detecting means (213) determines the pressure px(i) corresponding to each page between the zero pressure state and a state exceeding a predetermined numerical value detected by the pressure sensor (212) (the maximum pressure state) so that all N pages in the electronic document may be associated. The detecting means (213) divides the pressure from the zero pressure state to the maximum pressure state equally by N, which is the corresponding number of pages. Alternatively, the detecting means may set the pressure for page association so that the page turning speed decelerates as the mid-point between the zero pressure state and maximum pressure state is approached, and then accelerates as the pressure approaches the maximum pressure state from the mid-point.

In Step 906, the detecting means (213) detects the amount of pressure p applied by the user's operating finger to the screen via the pressure sensor (212). The display control means (214) then displays the i-th page corresponding to amount of pressure p applied to the screen. Also, the display control means (214) transparently displays the j-th page between the initial page and the i-th page (where j is an integer equal to or greater than 1) on top of the i-th page. The display control means (214) may determine the level of transparency A(i, j) based on the amount of pressure p (see Step 614 in FIG. 6B).

In Step 907, the display control means (214) allows the user to determine whether or not the i-th page data is to be selected as a comparison page. The display control means (214) may, for example, display a pop up window that allows the user to select or not select the page by clicking a button. When the user has indicated that the i-th page has been selected as a comparison page, the display control means (214) advances the process to Step 908. When the user has indicated that the i-th page is not to be selected as a comparison page, the display control means (214) returns the process to Step 906. In Step 906, the process stands by to select a new i-th page based on movement of the user's operating finger. It returns to Step 906 until an i-th page has been selected as a comparison page.

In Step 908, the display control means (214) selects as the i-th page as the comparison page in response to an instruction from the user selecting the i-th page as the comparison page.

In Step 909, the display control means (214) transparently displays the initial page on top of the i-th page so that the initial page fixed in Step 904 may be compared to the i-th page selected in Step 908. The user may compare the content of the initial page to the content of the i-th page because the i-th page is visible from above via the transparent initial page.

In Step 910, the user ends the comparison by sliding an operating finger held above the screen in a predetermined horizontal direction relative to the screen (for example, horizontally to the left). The detecting means (213) detects the sliding of an operating finger in the predetermined horizontal direction. The device (101-2) then ends the comparison in response to detection of an operating finger sliding in the predetermined horizontal direction.

Figure 9B:
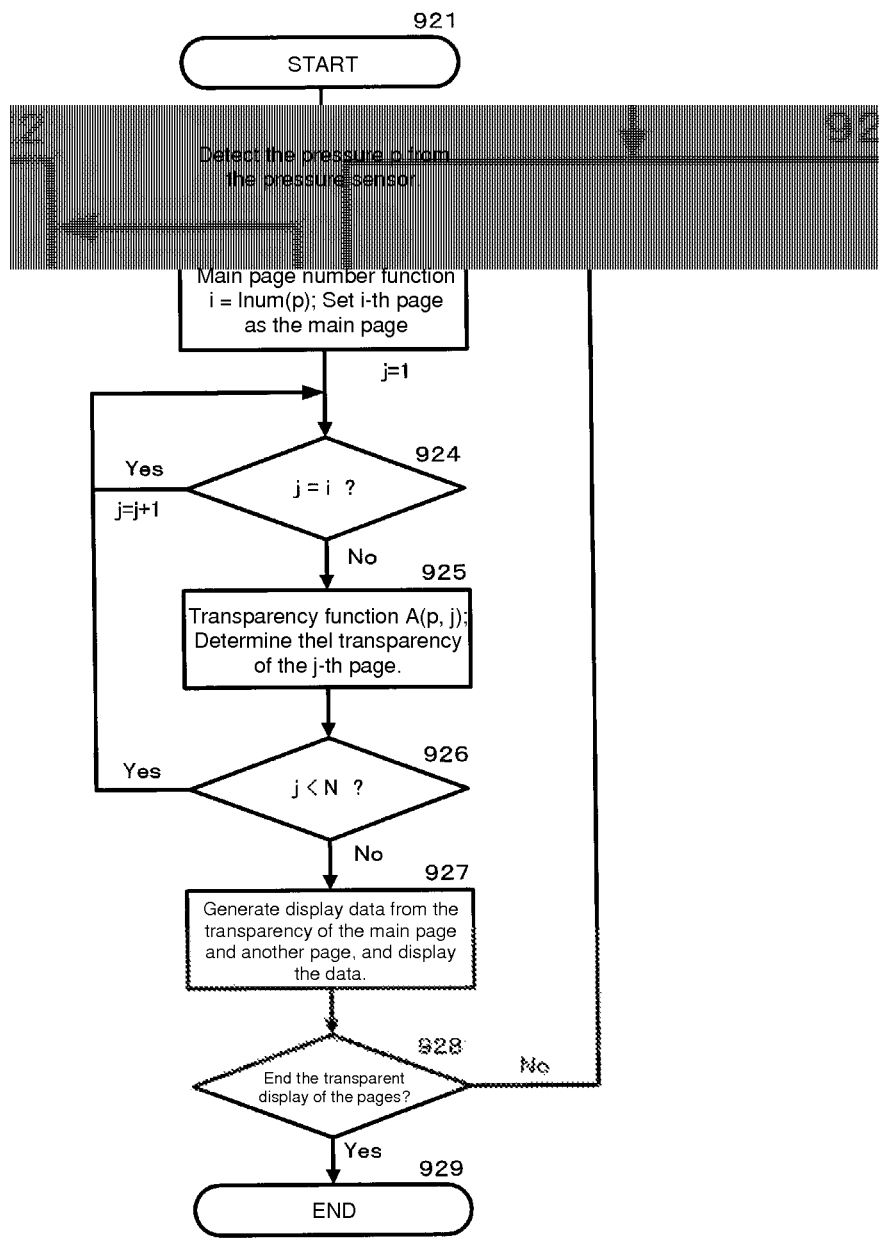
FIG. 9B is a flowchart of an embodiment of the present invention used to explain in detail the transparent display in the flowchart shown in FIG. 9A.

FIG. 9B is a flowchart used to explain in detail the transparent display in the flowchart indicated in Step 906 and Step 909 of FIG. 9A. In Step 921, the device (101-2) starts the process for transparent display of pages in the electronic document (screen comparison mode). In the process for transparent display of pages, the display control means (214) calculates the level of transparency A(n, j) for all of the pages (1, 2, 3, . . . , j, j+1, . . . , N−1, N) when an operating finger has been used to select the i-th page of the electronic document. Finally, the pages are displayed on the screen based on these levels of transparency. The i-th page selected with an operating finger is referred to as the main page. In the flowchart shown in FIG. 9B, the main page is the page indicated as the main page by an operating finger at a certain time. In this flowchart, the j-th page is a page in front of the i-th page (that is, in the positive direction along an axis passing through the screen from behind according to the so-called right-handed coordinates). In Step 926 below, the display control means (214) also calculates the degree of transparency for all pages behind the i-th image (in the negative direction according to the right-handed coordinates). However, for any j-th page behind the i-th page here, the transparency level is set to 0% (that is, non-transparent). Because the i-th page is not transparent, no page behind the i-th page may be viewed transparently.

In Step 922, the user moves an operating finger towards the screen to select the main page for transparent display. The pressure sensor (212) detects pressure applied by an operating finger, and sends pressure information to the detecting means (213). The detecting means (213) determines the amount of pressure p. The pressure in Step 922 corresponds to the pressure in Step 806 of FIG. 8A.

In Step 923, the display control means (214) sets as the main page the i-th page corresponding to the pressure p just before the operating finger is slid horizontally. The main page number function is expressed as i=1num(p). Here, (p) is the amount of pressure applied to the screen. The process in Step 923 corresponds to the pressure p detected by the sensor in Step 906 of the flowchart in FIG. 9A, and the main page number function is used in the processing for Step 906 for display of the i-th page.

In Step 924, the display control means (214) determines whether or not page number j for the j-th page in the electronic document is the same as page number i for the i-th page. Here, j is the page number of a page whose transparency level is to be determined. The display control means (214) performs the processing shown in FIG. 9B on all pages to be displayed on the screen (where j=1-N). When j does not equal 1 (that is, when page number j is not the same as page number i), the display control means (214) advances the process to Step 925. When j equals i (that is, when page number j is the same as page number i), the display control means (214) returns the process to Step 924. This is because the processing in Step 925 below is not required when page number j is the same as page number i. The display control means (214) introduces the value j+1 to j to sequentially increase j (that is, increase the page number). In this way, the display control means (214) performs transparency processing on all of the pages to be displayed on the screen (where j=1-N).

In Step 925, when page number j is not the same as page number i, the display control means (214) determines the transparency level of the j-th page. The transparency function is expressed by $A(p, j)$. Here, (p) is the pressure applied to the screen. This transparency function $A(p, j)$ is the same as the level of transparency $A(i, j)$ indicated in Step 906 of FIG. 9A, and the transparency function $A(p, j)$ determined in Step 925 may be used in Step 906.

In Step 926, the display control means (214) determines whether page number j is smaller than the total number of pages N in the electronic document. When j is not less than N, the display control means (214) advances the process to Step 927. When j is less than N, the display control means (214) returns the process to Step 924. When j is equal to N, the transparency level is set to 0%. The processing in Step 926 essentially may be performed in any step. Because the transparency level of the i-th page is 0%, any page j between the i-th page and the Nth page ($i \leq j < N$) is usually not displayed. However, the transparency level may still be set for all pages. In this situation, the level of transparency $A(p, j)$ is set to 0%. When j=N, the transparency level of the j-th page is 0%.

In Step 927, the display control means (214) displays the i-th page, which is the main page, at a transparency level of 0%, and displays the transparently processed j-th page on top of the i-th page.

In Step 928, the display control means (214) determines whether or not there is an instruction to end the transparent display of pages.

In Step 929, when there is an instruction to end the transparent display of pages (see Step 615 in FIG. 6B), the device (101-2) ends the transparent display of pages from the electronic document (screen comparison mode).

Figure 9C:
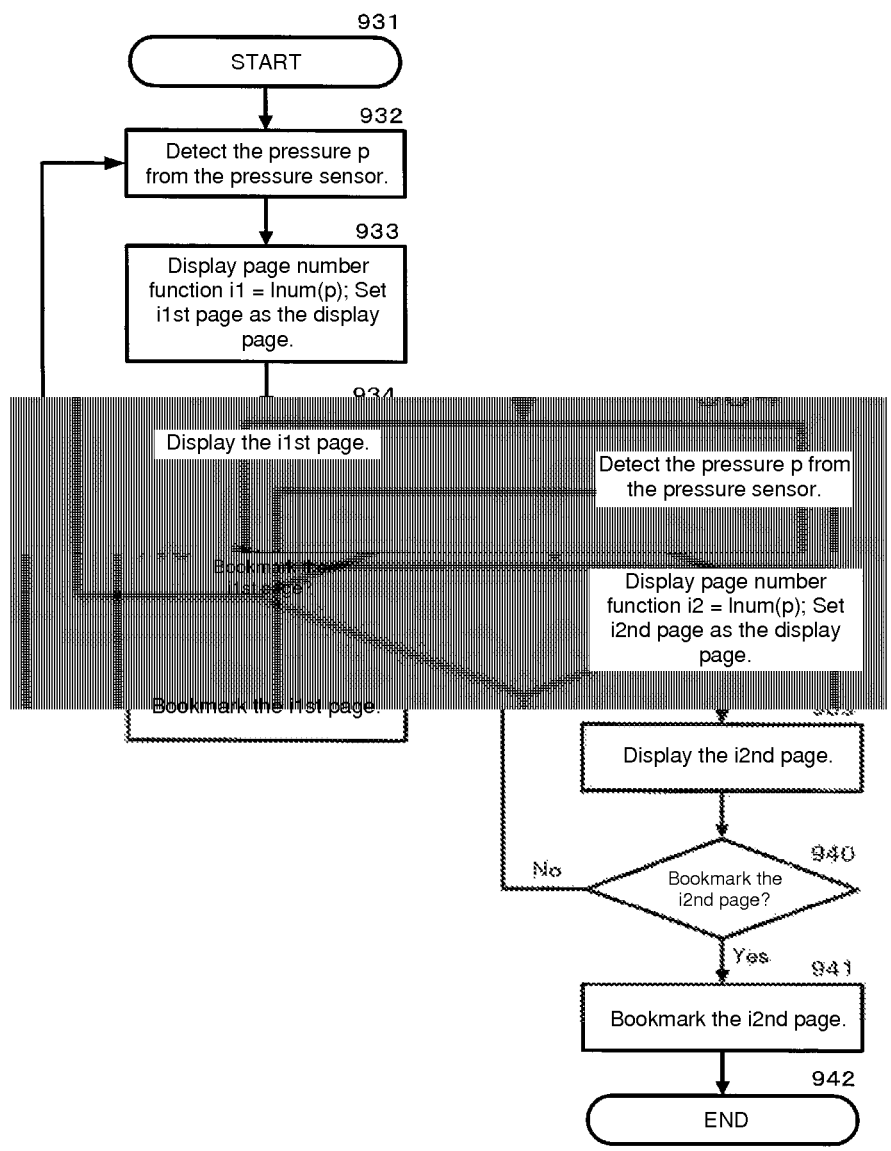
FIG. 9C is a flowchart of an embodiment of the present invention that may be used in the flowchart in FIG. 9A showing a process in which two pages are bookmarked using the pressure sensor.

FIG. 9C is a flowchart of the process for bookmarking two pages which may be executed in Step 906 of the flowchart shown in FIG. 9A. In Step 931, the device (101-2) starts the process for bookmarking pages in the electronic document.

In Step 932, the user's operating finger approaches the screen in order to select the first page (i=i1) to be bookmarked. The pressure sensor (212) detects the pressure p applied by the operating finger to the screen, and pressure information is sent to the detecting means (213). The detecting means (213) determines the amount of pressure p. The process in Step 932 corresponds to the amount of pressure p detected by the sensor in Step 906 shown in FIG. 9A.

In Step 933, the display control means (214) determines the page number in the electronic document that corresponds to the amount of pressure p. In other words, the display control means (214) determines the page number corresponding to the pressure p is page number i1. The display page number function is expressed by i1=1num(p). Here, (p) is the pressure applied to the screen.

In Step 934, the display control means (214) displays the i1-th page determined in Step 933 on the screen. This process corresponds to the display of the i-th page in Step 906 shown in FIG. 9A. Here, i=i1.

In Step 935, the display control means (214) receives a decision from the user whether or not the i1-th page is to be bookmarked. When the user decides to bookmark the i1-th page, the user, for example, slides an operating finger horizontally in a predetermined direction. When the user decides not to bookmark the i1-th page, the user, for example, slides an operating finger horizontally in the direction opposite that of the predetermined direction. When the i1-th page has been bookmarked, the display control means (214) advances the process to Step 936. When the i1-th page is not to be bookmarked, the display control means (214) returns the process to Step 932, amount of pressure p applied to the screen by the user's operating finger is detected, and Steps 932 through 935 are repeated.

In Step 936, when an instruction to bookmark the i1-th page is received, the display control means (214) bookmarks the i1-th page. The display control means (214) may place an icon (such as a bookmark), a mark or a symbol on the bookmarked page (for example, in the upper right-hand corner) to indicate that the page has been bookmarked. The display control means (214) writes information on the bookmarked page (for example, the page number) in, for example, a table. This table may be referenced when bookmarked pages are to be displayed transparently. The display control means (214) then advances the process to Step 937 in order to bookmark another page.

In Step 937, the user's operating finger approaches the screen in order to select the second page (i=i2) to be bookmarked. The pressure sensor (212) detects the amount of pressure applied by the operating finger to the screen, and pressure information is sent to the detecting means (213). The detecting means (213) determines the amount of pressure p applied by the operating finger to the screen. The process in Step 932 corresponds to the detection of pressure p by the sensor in Step 906 shown in FIG. 9A.

In Step 938, the display control means (214) determines the page number in the electronic document that corresponds to amount of pressure p applied by the operating finger to the screen. In other words, the display control means (214) determines the page number corresponding to pressure p is page number i2. The display page number function is expressed by i2=1num(p). Here, (p) is the amount of pressure p applied to the screen.

In Step 939, the display control means (214) displays the i2-th page determined in Step 938 on the screen. The process in Step 939 corresponds to the display of the i-th page in Step 906 shown in FIG. 9A. Here, i=i2.

In Step 940, the display control means (214) receives a decision from the user whether or not the i2-th page is to be bookmarked. When the user decides to bookmark the i2-th page, the user, for example, slides an operating finger horizontally in a predetermined direction. When the user decides not to bookmark the i2-th page, the user, for example, slides an operating finger horizontally in the direction opposite that of the predetermined direction. The i2-th page is not bookmarked when i2=i1. When the i2-th page has been bookmarked, the display control means (214) advances the process to Step 941. When the i2-th page is not to be bookmarked, the display control means (204) returns the process to Step 937, the amount of pressure p applied by the user's operating finger to the screen is detected, and Steps 937 through 940 are repeated.

In Step 941, when an instruction to bookmark the i2-th page is received, the display control means (214) bookmarks the i2-th page. As in Step 936, the display control means (214) may place a mark on the bookmarked page to indicate that the page has been bookmarked.

In Step 942, the device (101-2) ends the process of bookmarking pages in the electronic document when the two pages shown in Step 936 and Step 941 have been bookmarked.

In Step 934, the processing for transparent display shown in FIG. 9B may be applied to transparently display the pages in front of the i1-th page. Similarly, in Step 939, the processing for transparent display shown in FIG. 9B may be applied to transparently display the pages in front of the i2-th page.

In the flowchart shown in FIG. 9C, two pages were bookmarked. These two bookmarked pages may be displayed so that the i1-th page bookmarked first is displayed on the screen farthest from the i2-th page bookmarked next.

By repeating Steps 932 through 936 shown in FIG. 9C, this flowchart may be used even when the number of pages in the electronic document is N (where N is an integer). When the number of pages in the electronic document is N, Steps 932 through Step 935 may be repeated until i equals N in Step 935. Here, a step may be added after Step 936 to determine whether the bookmarking process has been completed.

Figure 9D:
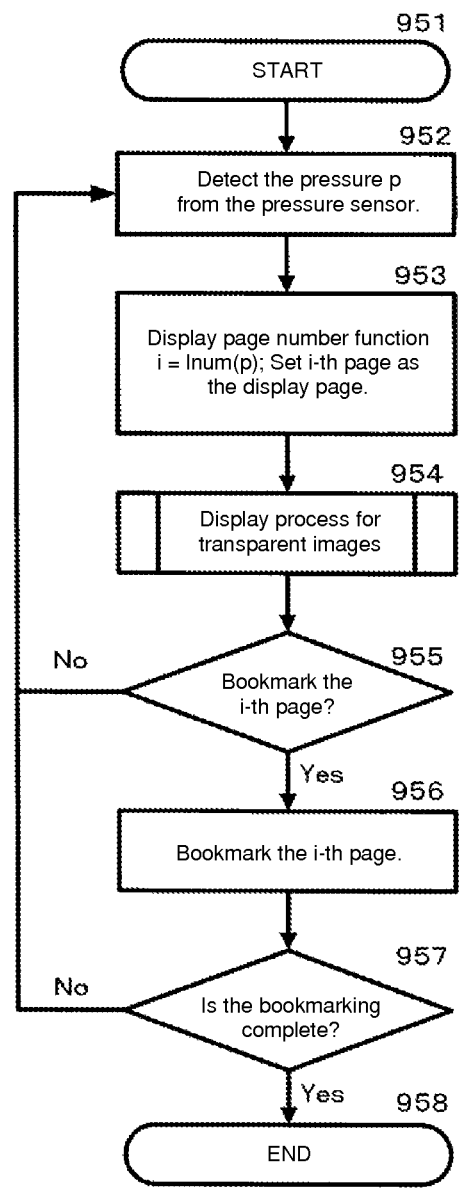
FIG. 9D is a flowchart of an embodiment of the present invention that may be used in the flowchart in FIG. 9A showing a process in which n pages are bookmarked using the pressure sensor.

FIG. 9D is a flowchart of the process for bookmarking n pages (where n is an integer equal to or greater than 2) which may be executed in Step 806 of the flowchart shown in FIG. 8A. In Step 951, the device (101-2) starts the process for bookmarking pages in the electronic document. This process is performed in Step 906 of the flowchart shown in FIG. 9A.

In Step 952, the user applies pressure to the screen with an operating finger in order to select the first page to be bookmarked. The pressure sensor (212) detects the pressure p applied to the screen by the operating finger, and pressure information is sent to the detecting means (213). The detecting means (213) determines the amount of pressure p. The process in Step 952 corresponds to the detection of pressure p by the sensor in Step 906 of the flowchart shown in FIG. 9A.

In Step 953, the display control means (214) determines the page number in the electronic document that corresponds to the pressure p. In other words, the display control means (214) determines that the page number corresponding to pressure p is page number i. The display page number function is expressed by i=1num(p). Here, (p) is the amount of pressure applied to the screen. The process in Step 953 corresponds to the detection of pressure p by the sensor in Step 906 of the flowchart shown in FIG. 9A.

In Step 954, the transparent image display processing shown in FIG. 9B is performed. For more details, refer to the explanation of each step in FIG. 9B. The i-th page shown in FIG. 953 corresponds to the main page shown in Step 823 of FIG. 8B.

In Step 955, the display control means (214) receives a decision from the user whether or not the i-th page is to be bookmarked. When the user decides to bookmark the i-th page, the user, for example, slides an operating finger horizontally in a predetermined direction. When the user decides not to bookmark the i-th page, the user, for example, slides an operating finger horizontally in the direction opposite that of the predetermined direction. When the i-th page has been bookmarked, the display control means (214) advances the process to Step 956. When the i-th page is not to be bookmarked, the display control means (214) returns the process to Step 952, amount of pressure applied to the screen by the user's operating finger is detected, and Steps 952 through 955 are repeated.

In Step 956, when an instruction to bookmark the i-th page is received, the display control means (214) bookmarks the i-th page. The display control means (214) may place an icon (such as a bookmark), a mark or a symbol on the bookmarked page (for example, in the upper right-hand corner) to indicate that the page has been bookmarked. The display control means (214) writes information on the bookmarked page (for example, the page number) in, for example, a table. This table may be referenced when bookmarked pages are to be displayed transparently.

When the bookmarking shown in Step 956 has been completed, the process waits for a decision from the user in Step 957 as to whether the bookmarking is complete. When the user has completed the bookmarking process, an operating finger is slid, for example, horizontally in a predetermined direction, or the screen is double- or triple-clicked. Alternatively, the display control means (214) may display a pop up window on the screen when the bookmarking shown in Step 956 has been completed so the user may select to continue or end the bookmarking process. When the bookmarking process has not been completed, the display control means (214) returns the process to Step 952. When a completion operation has not been received from the user after a predetermined amount of time, the display control means (214) may determine that the bookmarking operation has not been completed. The display control means (214) repeats Steps 952 through 956, and the page bookmarking process is repeated until the bookmarking process has been completed for a plurality of pages.

In Step 958, the device (101-2) ends the process for bookmarking pages of the electronic document when bookmarking has been completed.

Figure 9E:
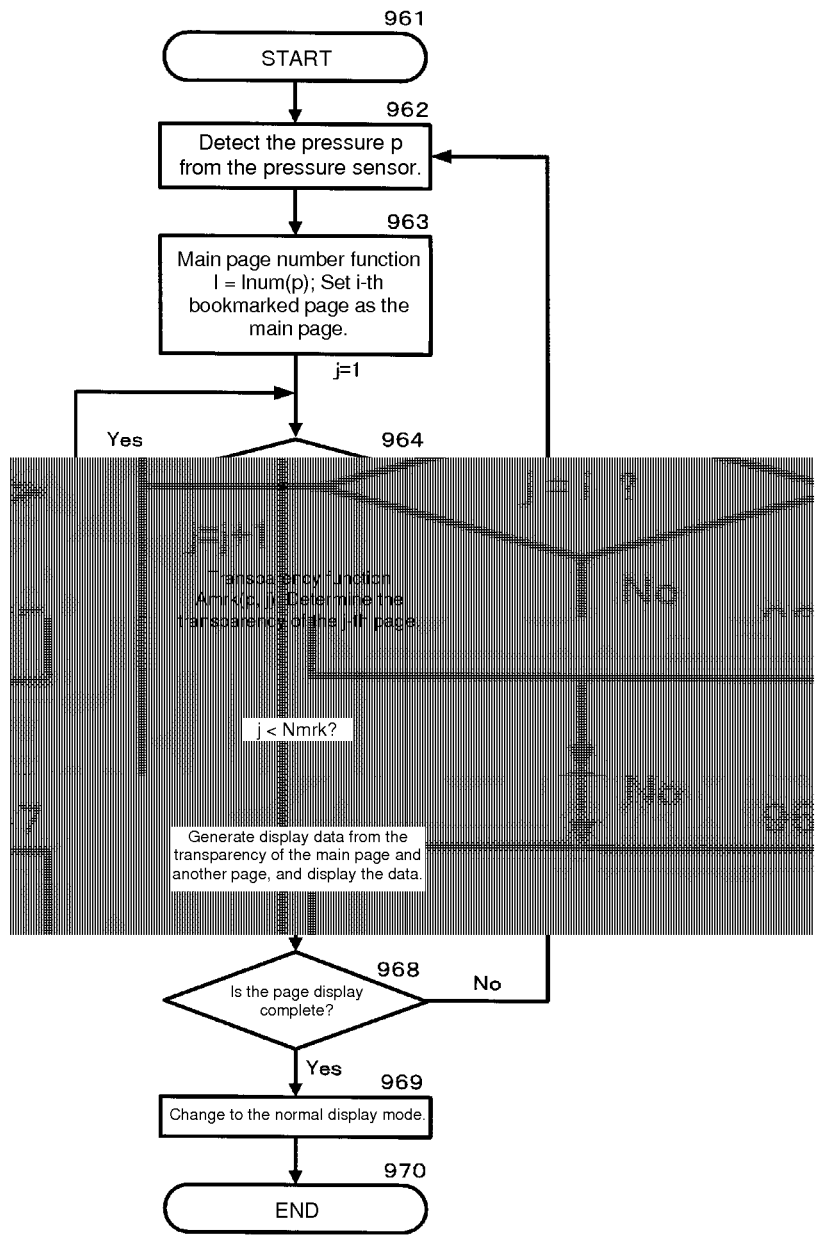
FIG. 9E is a flowchart showing the process for displaying in a transparent state pages that were bookmarked in the flowchart shown in FIG. 9C or FIG. 9D.

FIG. 9E is a flowchart showing the process for displaying in a transparent state pages that were bookmarked in the flowchart shown in FIG. 9C or FIG. 9D. In Step 961, the device (101-2) starts the process of comparison using the transparent state. More specifically, the process may be started when the bookmarking process shown in FIG. 9C or the bookmarking process shown in FIG. 9D has been completed. The electronic documents used in FIG. 9E include only bookmarked documents obtained in the flowcharts shown in FIG. 9C and FIG. 9D. Alternatively, it may be arranged so that electronic documents used in FIG. 9E may only be selected from among those bookmarked in the flowcharts shown in FIG. 9C and FIG. 9D.

In Step 962, the user applies pressure to the screen with an operating finger. The pressure sensor (212) pressure p applied to the screen by an operating finger, and pressure movement information is sent to the detecting means (213). The detecting means (213) determines the amount of pressure p. The detecting means (213) then sends the determined pressure p to the display control means (214).

In Step 963, the display control means (214) determines the page number of the bookmarked page corresponding to the amount of pressure p. In other words, the display control means (214) determines that the bookmarked page corresponding to pressure p is the i-th page. The display page number function is expressed as i=1num(p). Here, (p) is the amount of pressure applied to the screen. When the determined pressure p has been received, the display control means (214) performs internally the processing performed by the display control means (214) shown in Step 964 through Step 967.

In Step 964, the display control means (214) determines whether or not page number j for the j-th page in the electronic document is the same as page number i for the i-th page. Here, j is the page number of a page whose transparency level is to be determined. The display control means (214) performs the processing shown in FIG. 9E on all pages to be displayed on the screen (where j=1-N). When j does not equal 1 (that is, when page number j is not the same as page number i), the display control means (214) advances the process to Step 965. When j equals (that is, when page number j is the same as page number i), the display control means (214) returns the process to Step 964. This is because the processing in Step 965 below is not required when page number j is the same as page number i. The display control means (214) introduces the value j+1 to j to sequentially increase j (that is, increase the page number). In this way, the display control means (214) performs transparency processing on all of the pages to be displayed on the screen (where j=1-N).

In Step 965, when page number j is not the same as page number i, the transparency level of the j-th page is determined. The transparency function is expressed by Amrk(p, j). Here, Amrk(p) is the amount of pressure applied to the screen. This transparency function Amrk(p, j) is the same as the level of transparency Amrk(i, j) indicated in Step 906 of FIG. 9A, and the transparency function Amrk(p, j) determined in Step 965 may be used in Step 906.

In Step 966, the display control means (214) determines whether page number j is smaller than the total number of pages N bookmarked in FIG. 9C or FIG. 9D (that is, N equals the number of bookmarks). When j is not less than Nmrk (where Nmrk is the number of bookmarks), the display control means (214) advances the process to Step 967. When j is less than Nmrk, the display control means (214) returns the process to Step 964. When j is less than Nmrk (sic), the transparency level is set to 0%. Because the transparency level of the i-th page is 0%, any page j between the i-th page and the Nth page (i≤j<N) is usually not displayed. However, the transparency level may still be set for all pages. In this situation, the level of transparency Amrk(p, j) is set to 0%. When j=Nmrk, the transparency level of the j-th page is 0%.

In Step 967, the display control means (214) displays the i-th page, which is the main page, at a transparency level of 0%, and displays the transparently processed j-th page on top of the i-th page.

In Step 968, the display control means (214) determines whether or not there is an instruction to end the transparent display of pages.

In Step 969, when there is an instruction to end the transparent display of pages (see Step 615 in FIG. 6B), the display control means (214) ends the transparent display of pages from the electronic document (screen comparison mode) and returns to the normal display mode (that is, the display mode prior to the screen comparison mode).

In Step 970, when the screen has changed to the normal display mode, the device (101-2) ends the process of comparison using the transparent state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for displaying an electronic document, comprising:
    obtaining the electronic document as a single unit of display data divided by a display size of a screen into a plurality of page data sets;
    using a display configured to sense movement of a movable object in a vertical direction relative to the screen and with the display configured such that each of the plurality of page data sets of the electronic document is associated in a sequence with a respective different one of a plurality of detection levels within a movement detection range of the display, where the display is configured by:
        dividing a distance from a farthest extent of the movement detection range of the display to a surface of the screen into a plurality of sequential equal detection distance intervals equal in number to a number of the divided plurality of page data sets;
        establishing each of the plurality of sequential equal detection distance intervals as a respective different one of the plurality of detection levels within the movement detection range of the display with which a respective one of the plurality of page data sets of the electronic document is associated in the sequence; and configuring the display such that sensing a movement from the farthest extent of the movement detection range of the display closer to a mid-point of the plurality of sequential equal detection distance intervals causes acceleration of display of different respective assigned ones of the divided plurality of page data sets and sensing a movement from the mid-point of the plurality of sequential equal detection distance intervals closer to the surface of the display causes deceleration of the display of different respective assigned ones of the divided plurality of page data sets;

the method further comprising:

displaying on the screen, in response to sensing movement via the display, a page data set corresponding to a detection level in the movement detection range in accordance with the sensed movement; and automatically adjusting display speed changes while displaying different ones of the plurality of page data sets in accordance with a moving speed of the sensed movement.

2. The method of claim 1, where the sensing of movement in the vertical direction is performed by a sensor configured to detect movement in the vertical direction of an object in close proximity to the screen, where the display is equipped with the sensor, and where displaying the page data set on the screen comprises displaying the page data set corresponding to a moving distance of the object in the vertical direction when the object is within the movement detection range of the sensor.

3. The method of claim 2, where the plurality of page data sets comprise a plurality of paginated units that are each extracted from the electronic document to fit within a display area of the screen.

4. The method of claim 3, further comprising:

dividing the single unit of display data by the display size of the screen into the plurality of page data sets in accordance with reception of an instruction to divide the single unit of display data; and assigning page numbers to the plurality of divided page data sets.

5. The method of claim 2, where displaying on the screen, in response to sensing the movement via the display, the page data set corresponding to the detection level in the movement detection range in accordance with the sensed movement comprises fixing a display of the page data set being displayed on the screen in accordance with a sliding of the object in a predetermined direction within the movement detection range of the sensor.

6. The method of claim 5, where displaying on the screen, in response to sensing the movement via the display, the page data set corresponding to the detection level in the movement detection range in accordance with the sensed movement comprises one of:

(i) displaying, as a transparent display on top of the fixed page data set display, one of a selectable set of transparent page options comprising:

one or more page data sets prior to a page number of the fixed page data set display;

one or more page data sets subsequent to the page number of the fixed page data set display; and a group of page data sets including a combination of the one or more page data sets; or (ii) displaying, as the transparent display, the fixed page data set display on top of one of the selectable set of transparent page options comprising:

the one or more page data sets prior to the page number of the fixed page data set display:

the one or more page data sets subsequent to the page number of the fixed page data set display; and the group of page data sets including the combination of the one or more page data sets.

7. The method of claim 5, where displaying on the screen, in response to sensing the movement via the display, the page data set corresponding to the detection level in the movement detection range in accordance with the sensed movement further comprises, after fixing the display of the page data set, one of:

transparently displaying a bookmarked page data set on top of the fixed page data set; or transparently displaying the fixed page data set display on top of the bookmarked page data set.

8. The method of claim 5, where displaying on the screen, in response to sensing the movement via the display, the page data set corresponding to the detection level in the movement detection range in accordance with the sensed movement further comprises, after fixing the display of the page data set, releasing the fixed page data set display.

9. The method of claim 2, where the farthest extent of the movement detection range of the display comprises one of a farthest point in the movement detection range of the sensor in the vertical direction or a point at a predetermined distance from the surface of the screen within the movement detection range of the sensor in the vertical direction at which the object may be present, and the farthest extent of the movement detection range of the display is set as an initial page data set, and page data sets with a larger page number relative to the set initial page data set are displayed as the object approaches the screen.

10. The method of claim 9, where displaying on the screen, in response to sensing movement via the display, the page data set corresponding to the detection level in the movement detection range in accordance with the sensed movement further comprises displaying sequential page data sets that one of gradually accelerate at a constant acceleration rate or gradually decelerate at a constant deceleration rate while advancing through page numbers.

11. The method of claim 1, where the sensing of the movement in the vertical direction is performed by a sensor configured to detect movement in the vertical direction of an object in close proximity to the screen, where the display is equipped with the sensor, and where the electronic document comprises a plurality of sections, and further comprising detecting a presence of the object in the movement detection range of the sensor, and where displaying the page data set on the screen comprises displaying on the screen an initial page data set of a section corresponding to the electronic document in accordance with a moving distance of the object in the vertical direction when the object is within the movement detection range of the sensor.

12. The method of claim 11, where displaying on the screen the initial page data set of the section comprises displaying the initial page data set of the section displayed on the screen immediately before sliding of the object within the movement detection range of the sensor in a predetermined direction.

13. The method of claim 12, further comprising, after displaying the initial page data set of the section, displaying on the screen an additional page data set corresponding to the section in accordance with the moving distance in the vertical direction of the object.

14. The method of claim 1, where the sensing of the movement in the vertical direction is performed by a pressure sensor configured to detect a pressure applied by an object in close proximity to the screen, where the display is equipped with the pressure sensor and the movement detection range comprises a range of applied pressures, and where displaying the page data set on the screen comprises displaying on the screen the corresponding page data set of the electronic document in accordance with the pressure of the object on the screen.

15. The method of claim 14, where the plurality of page data sets comprise a plurality of paginated units that are each extracted from the electronic document to fit within a display area of the screen.

16. The method of claim 14, further comprising dividing the single unit of display data by the display size of the screen into the plurality of page data sets in accordance with reception of an instruction to divide the single unit of displayable data, and assigning page numbers to the plurality of divided page data sets.

17. A device for displaying an electronic document, comprising:
 a memory configured to store the electronic document as a single unit of display data divided by a display size of a screen into a plurality of page data sets; and
 a processor programmed to:
  use a display configured to sense movement of a movable object in a vertical direction relative to the screen and with the display configured such that each of the plurality of page data sets of the electronic document is associated in a sequence with a respective different one of a plurality of detection levels within a movement detection range of the display, where the display is configured by the processor being programmed to:
   divide a distance from a farthest extent of the movement detection range of the display to a surface of the screen into a plurality of sequential equal detection distance intervals equal in number to a number of the divided plurality of page data sets;
   establish each of the plurality of sequential equal detection distance intervals as a respective different one of the plurality of detection levels within the movement detection range of the display with which a respective one of the plurality of page data sets of the electronic document is associated in the sequence; and
   configure the display such that sensing a movement from the farthest extent of the movement detection range of the display closer to a mid-point of the plurality of sequential equal detection distance intervals causes acceleration of display of different respective assigned ones of the divided plurality of page data sets and sensing a movement from the mid-point of the plurality of sequential equal detection distance intervals closer to the surface of the display causes deceleration of the display of different respective assigned ones of the divided plurality of page data sets;
 where the processor is further programmed to:
  display on the screen, in response to sensing movement via the display, a page data set corresponding to a detection level in the movement detection range in accordance with the sensed movement; and
  automatically adjust display speed changes while displaying different ones of the plurality of page data sets in accordance with a moving speed of the sensed movement.

18. A computer program product for displaying an electronic document, comprising:
 a computer readable storage medium having computer readable program code embodied therewith, the computer readable program code comprising:
 computer readable program code configured to:
  obtain the electronic document as a single unit of display data divided by a display size of a screen into a plurality of page data sets;
  use a display configured to sense movement of a movable object in a vertical direction relative to the screen and with the display configured such that each of the plurality of page data sets of the electronic document is associated in a sequence with a respective different one of a plurality of detection levels within a movement detection range of the display, where the display is configured by the computer readable program code being configured to:
   divide a distance from a farthest extent of the movement detection range of the display to a surface of the screen into a plurality of sequential equal detection distance intervals equal in number to a number of the divided plurality of page data sets;
   establish each of the plurality of sequential equal detection distance intervals as a respective different one of the plurality of detection levels within the movement detection range of the display with which a respective one of the plurality of page data sets of the electronic document is associated in the sequence; and
   configure the display such that sensing a movement from the farthest extent of the movement detection range of the display closer to a mid-point of the plurality of sequential equal detection distance intervals causes acceleration of display of different respective assigned ones of the divided plurality of page data sets and sensing a movement from the mid-point of the plurality of sequential equal detection distance intervals closer to the surface of the display causes deceleration of the display of different respective assigned ones of the divided plurality of page data sets;
 where the computer readable program code is further configured to:
  display on the screen, in response to sensing movement via the display, a page data set corresponding to a detection level in the movement detection range in accordance with the sensed movement; and
  automatically adjust display speed changes while displaying different ones of the plurality of page data sets in accordance with a moving speed of the sensed movement.

* * * * *